PARALLEL OPERATIONS IN A VECTOR ARITHMETIC COMPUTING SYSTEM

Filed Jan. 14, 1966 Sheet 1 of 45

INVENTORS
ADIN D. FALKOFF
DONALD N. SENZIG

BY [signature]
ATTORNEY

PARALLEL OPERATIONS IN A VECTOR ARITHMETIC COMPUTING SYSTEM

Filed Jan. 14, 1966 Sheet 11 of 45

April 22, 1969 A. D. FALKOFF ET AL 3,440,611

PARALLEL OPERATIONS IN A VECTOR ARITHMETIC COMPUTING SYSTEM

Filed Jan. 14, 1966 Sheet 14 of 45

SINGLE WORD FETCH CLOCK

TEST X' FRACTION & Si

United States Patent Office 3,440,611

Patented Apr. 22, 1969

3,440,611

PARALLEL OPERATIONS IN A VECTOR ARITHMETIC COMPUTING SYSTEM

Adin D. Falkoff, Croton-on-Hudson, N.Y., and Donald N. Senzig, San Jose, Calif., assignors to International Business Machines Corporation, Armonk, N.Y., a corporation of New York Filed Jan. 14, 1966, Ser. No. 520,553
Int. Cl. G11b *13/00;* G06f *7/38*
U.S. Cl. 340—172.5 14 Claims

ABSTRACT OF THE DISCLOSURE

A vector arithmetic multiprocessor computing system for performing multiword-parallel vector operations such as sum reduction, search for largest and search for smallest. Means are included for performing such operations in a parallel-by-bit fashion rather proceeding with such operations in pairs of complete operands as in conventional systems. Control and storage means are provided for storing plural operands in special registers which can be utilized for parallel-by-bit access and also for radix point alignment.

TABLE OF CONTENTS

| | Column |
|---|---|
| Section 1 | 1 |
| Preamble and Objects | 1 |
| Section 2 | 5 |
| Introduction to System | 5 |
| Section 3 | 8 |
| Multiword-Parallel Vector Operations | 8 |
| Sum Reduction | 8 |
| Search for Largest | 8 |
| Search for Smallest | 9 |
| Section 4 | 10 |
| Instruction Word Format | 10 |
| Section 5 | 11 |
| General Description of Drawings | 11 |
| Section 6 | 27 |
| Timing Sequence Charts | 27 |
| Section 7 | 31 |
| Detailed Description of System Operations | 31 |
| Section 8 | 50 |
| Summary | 50 |

SECTION 1

*Preamble and objects*

The present invention relates to a computing system capable of performing specialized word-parallel bit-serial operations on large numbers of data words. More particularly, it relates to such a system having the necessary storage, control and logic circuitry for performing certain searching and computational operations in said word-parallel bit-serial fashion.

Copending U.S. patent application Ser. No. 468,437, filed June 30, 1965, entitled "Vector Arithmetic Multiprocessor Computing System," of Donald N. Senzig, discloses a multiprocessor computing system especially adapted for performing simultaneous operations on arrays or vectors of data. Said copending application discloses but does not claim the special circuitry and controls for performing the above word-parallel bit-serial operations on multiple data words as it is believed that such disclosure optimumly places the present invention in an operating environment and demonstrates its utility.

Recent advances in computer design have led to vast improvements in both speed of computing circuitry and also in speed of various storage organs within a computer. Concurrent advances in the art of programming have also led to vast improvements in both the speeds of computing certain types of problems and also the adaptability of computers for solving wide varieties of problems. However, the majority of existing computing systems are quite limited in that they normally must proceed through various programs in a serial or step-by-step method. A number of computers recently placed on the commercial market actually have multiple arithmetic units which may be operated simultaneously, however, these numbers of multiarithmetic units or multiprocessors have been relatively small, i.e., three or four units in a given system.

As indicated by this recent approach in the computer arts towards providing faster and more powerful computers providing a lower cost per computation factor, the concept of multiprocessing is definitely in existence in the computer industry. However, most of these systems must be programmed in a high degree of detail, assigning various operations to various ones of the process units in such a multiprocessor system which places very rigorous requirements on a programmer to even partially optimize the utilization of the computer. The alternative is to rely on hardware to find the parallelism, which solution is inadequate in terms of cost. It may thus be seen that although the concept of having a computing system with more than one process unit is known in the art, the optimum utilization of such a computer has been limited by the demands on programming and hardware.

In those mathematical problems where computation is being done on arrays of data, usually the same mathematical operation is being carried out on each member of the array. It will be understood that a vector would be a specific interrelated group of numbers within a much larger array, which array is organized in a particular configuration or order such as a matrix, as is well known in the mathematical arts.

Before proceeding further, it is desirable to specifically define some terms. A vector $\underline{x}$ is the ordered array of elements $(\underline{x}_1, \underline{x}_2, \ldots, \underline{x}_i, \ldots)$ wherein the variable $\underline{x}_i$ is called the $i^{th}$ component of the vector $\underline{x}$. A matrix is an ordered two-dimension array of variables.

$$\begin{array}{c} \underline{A}_1^1, \underline{A}_2^1, \ldots, \underline{A}_n^1 \\ \underline{A}_1^2, \underline{A}_2^2, \ldots, \underline{A}_n^2 \\ \cdot \\ \cdot \\ \cdot \\ \underline{A}_1^m, \underline{A}_2^m, \ldots, \underline{A}_n^m \end{array}$$

The vector $(\underline{A}_1^i, \underline{A}_2^i, \ldots, \underline{A}_n^i)$ is called the $i^{th}$ row vector of $\underline{A}$ and is denoted by $\underline{A}^i$. The vector $(\underline{A}_j^1, \underline{A}_j^2, \ldots, \underline{A}_j^m)$ is called the $j^{th}$ column vector of $\underline{A}$ and is denoted by $\underline{A}_j$.

It will be evident that such operations or computations involving vector mathematics would be well suited to a multiprocessor type of computer. There are no known commercially available computers on the market capable of performing more than two or three operations simultaneously, which power falls far short of that desirable for optimumly performing most vector problems.

However, perhaps the most important shortcoming of present day systems is the inadequacy of available memory organizations to access a plurality of storage locations within a computing memory organization simultaneously to bring out all of the desired operands for a plurality of arithmetic units in a substantially simultaneous manner. Further, no known system provides for the flexible simultaneous accessing of a plurality of memory storage locations. This latter feature is most necessary for the satisfactory and efficient handling of vector problems.

The need for a computing system capable of handling such array or vector problems at increased speeds is quite pressing in the scientific community. There are many areas wherein the solution of problems makes the development of such a vector multi-processing computer quite attractive. For example, in the area of global weather prediction, a three dimensional grid covering the entire world must be stepped along through relatively short periods of simulated time to produce a forecast of weather occurrences within a reasonable amount of real time in order that proper weather precautions may be taken where indicated. This type of problem with its demand for increased speed in processing large arrays of data illustrates the applicability of a computer designed specifically for array processing. Another example is in the field of atomic energy wherein the control of certain operations requires the extremely high speed computation of thermonuclear energies which must be fed into control locations all within a short period of time from the obtaining of raw data. The above two problems are only typical of the many areas in which a computing system capable of performing multiple operations on arrays of numbers is needed. Many other scientific problems similarly require calculations on large arrays of data.

The above-identified copending application discloses a greatly improved multiprocessor computer including a memory system wherein plural operands may be accessed simultaneously and plural operations performed simultaneously in a suitable plurality of arithmetic units. The system is arranged for all of the arithmetic units to be performing the same operation and, therefore, a single control unit is provided for the entire system. Further, flexibility is obtained by providing for selective masking of certain of the arithmetic units for particular operations therein and highly flexible accessing means for said machine storage is provided in order to obtain various vectors from a particular array for processing operations.

It has now been found that certain searching and computational operations to be performed on N operands or data words, where $N>2$, may optimumly be accomplished in a system utilizing word-parallel bit-serial processing. Thus, such operations proceed through an array of N words in parallel, however, the system logic circuitry actually sequentially processes successive equal weight sub-groups of said words. These sub-groups are bits in the disclosed embodiment. This system has particular application to a vector processor such as disclosed in said copending application but is not limited thereto.

It is accordingly a primary object to provide such a system capable of performing a variety of word-parallel bit-serial operations on a vector of mathematical quantities provided to the system.

It is another object to provide a system caapble of performing novel vector operations on a vector or array of data supplied thereto.

It is a further object to provide such a system capable of simultaneously operating on all of the members of said vector in parallel but performing said parallel operation serially within each element of said vector.

It is another object to provide such a system capable of selectively inhibiting a given operation on selected members of said vector.

It is another object to provide such a system capable of performing both searching and computational operations on such vectors of data in said parallel-serial manner.

It is yet another object to provide such a system capable of performing a search for the largest or smallest member of a plurality of data words in said parallel-serial manner.

It is a still further object to provide such a system capable of summing a plurality of data words in said parallel-serial manner.

The foregoing and other objects, features and advantages of the invention will be apparent from the following more particular description of a preferred embodiment of the invention as illustrated in the accompanying drawings.

In the drawings:

FIGURE 1 is a logical schematic diagram of the Z Register and its associated Input and Output controls.

FIGURE 1*a* is a basic block diagram illustrating the overall machine organization.

FIGURE 1*b* is a block diagram of an individual Arithmetic Unit illustrating how certain Shifting operations are performed.

FIGURE 1*c* is a block diagram illustrating the principle working Data Registers and Control Registers of the instant system.

FIGURES 2 through 2*d* comprise a logical schematic diagram of the Address Generation portion of the present system.

Figures 5, 5A:
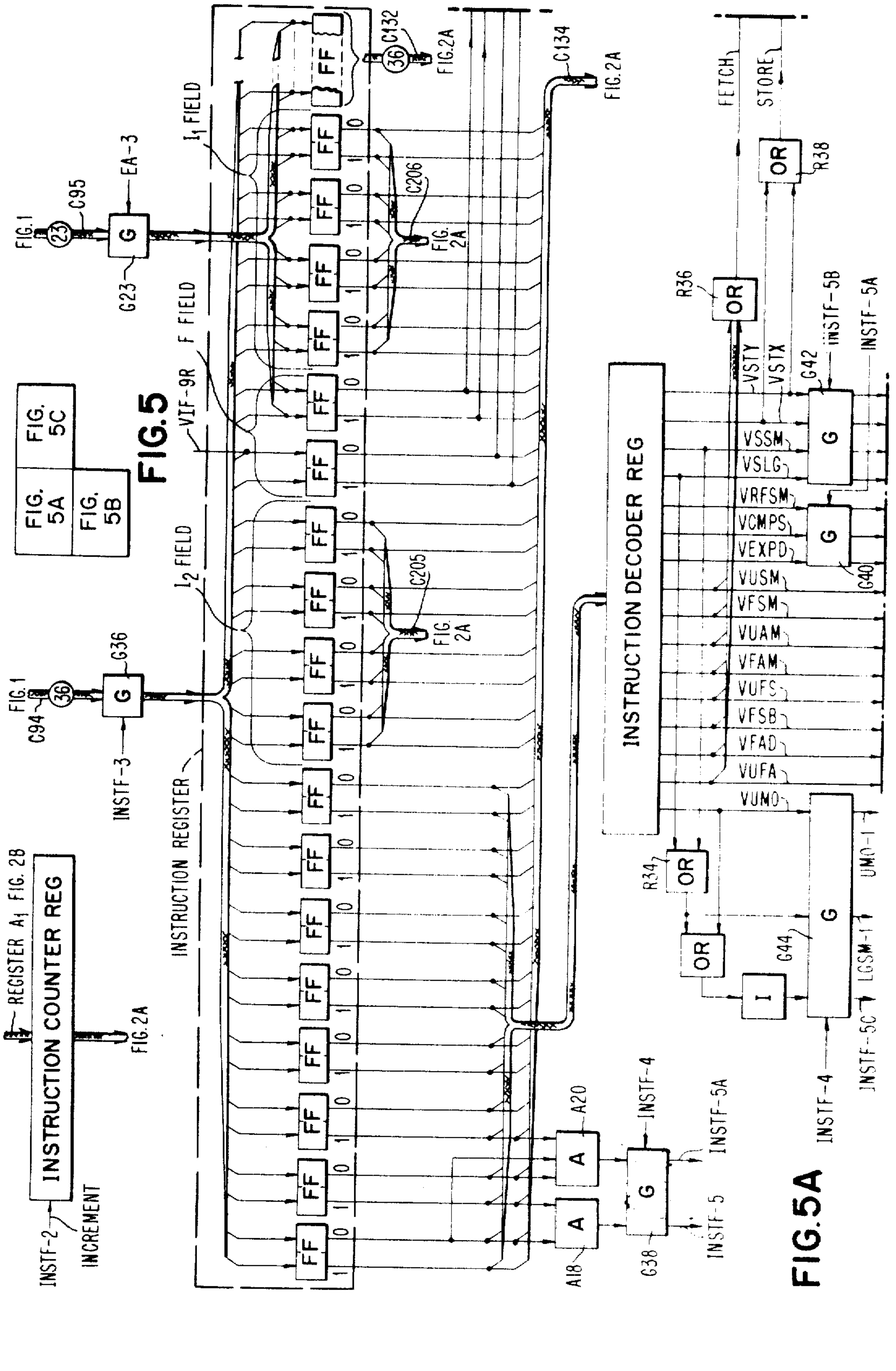
Figure 5B:
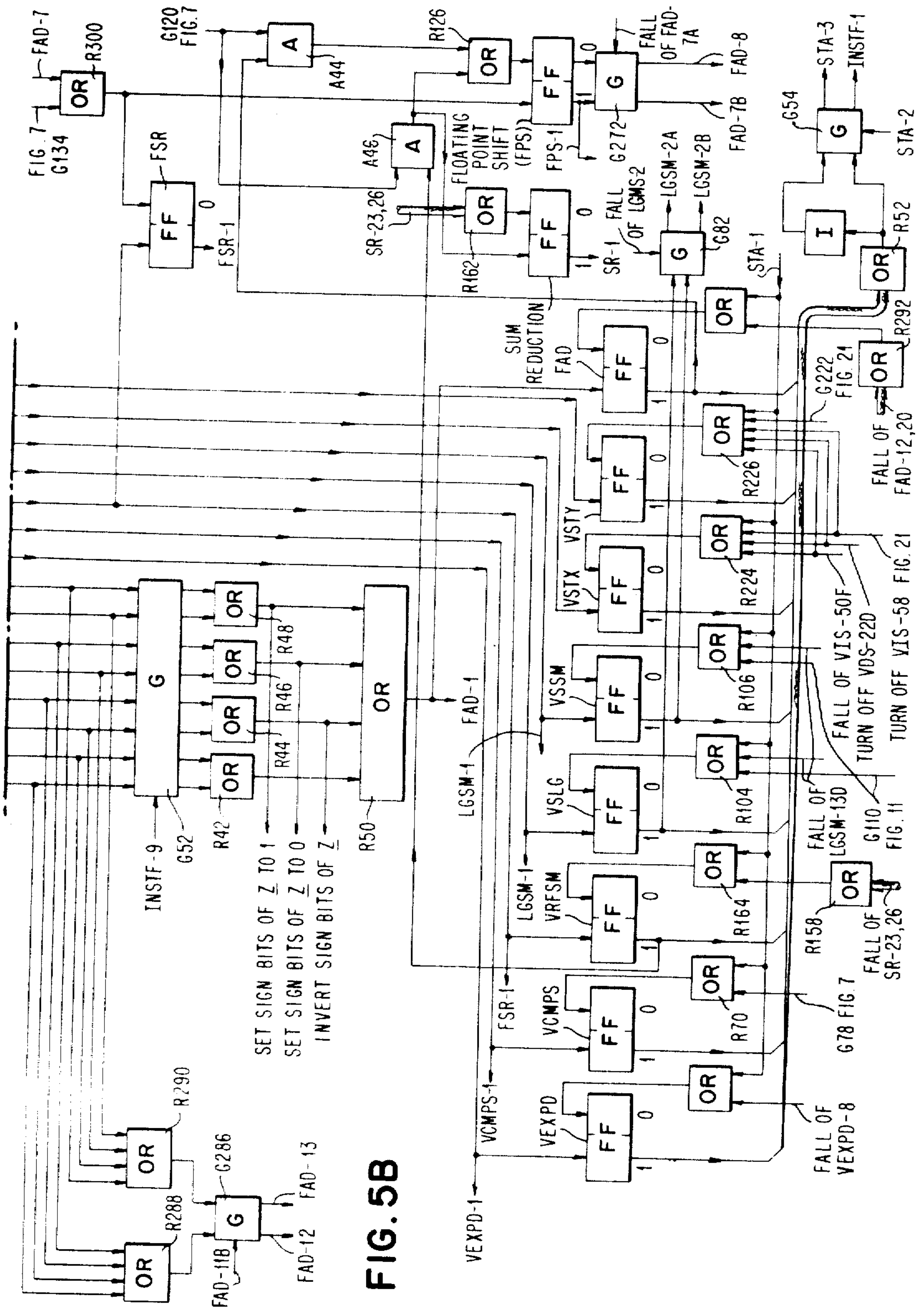
Figure 5C:
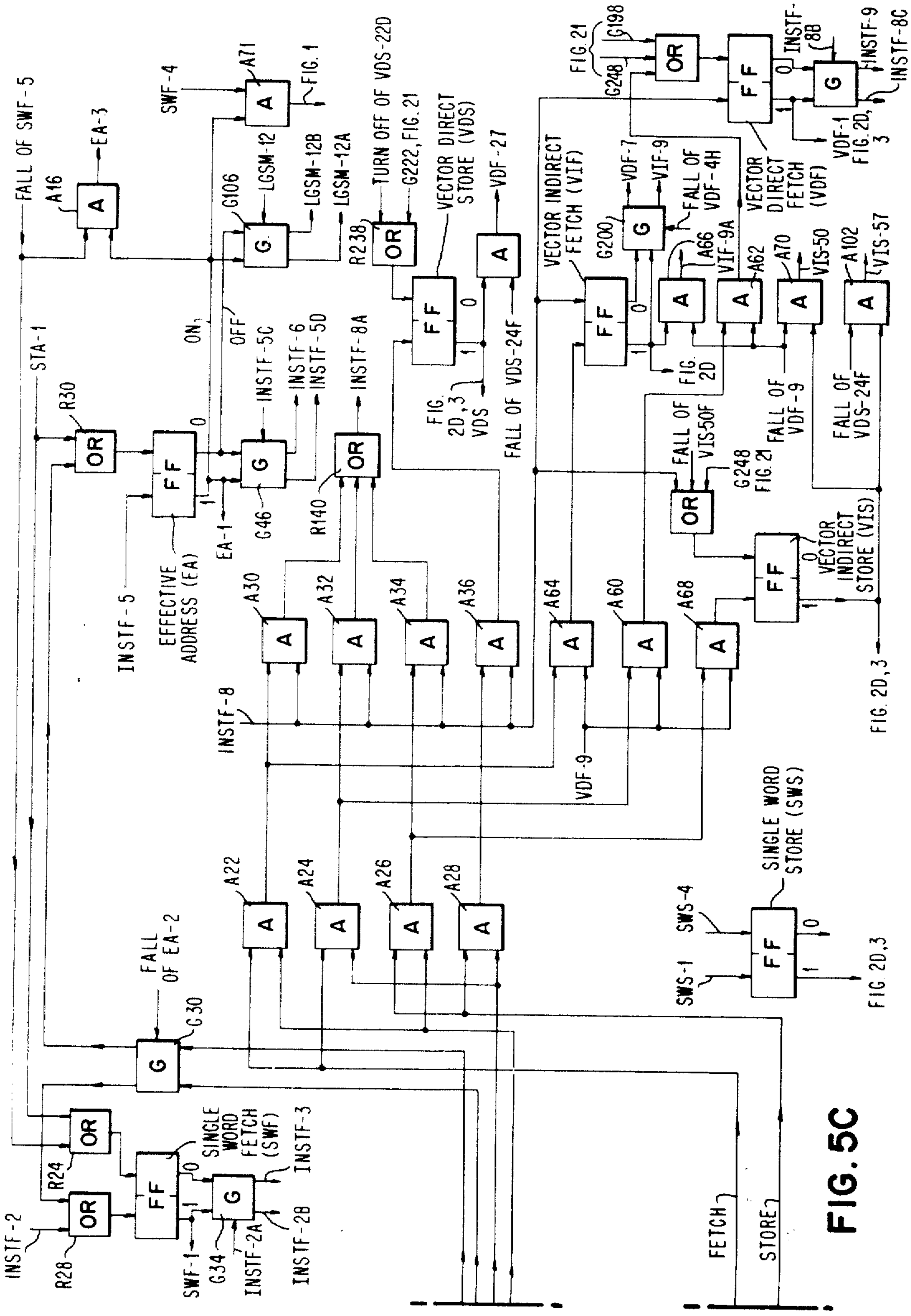

FIGURES 5 through 5*c* comprise a logical schematic diagram of the Instruction Register, its associated Decoder and a large number of the control elements which determine the branching of the system in performing various operations.

Figure 6:
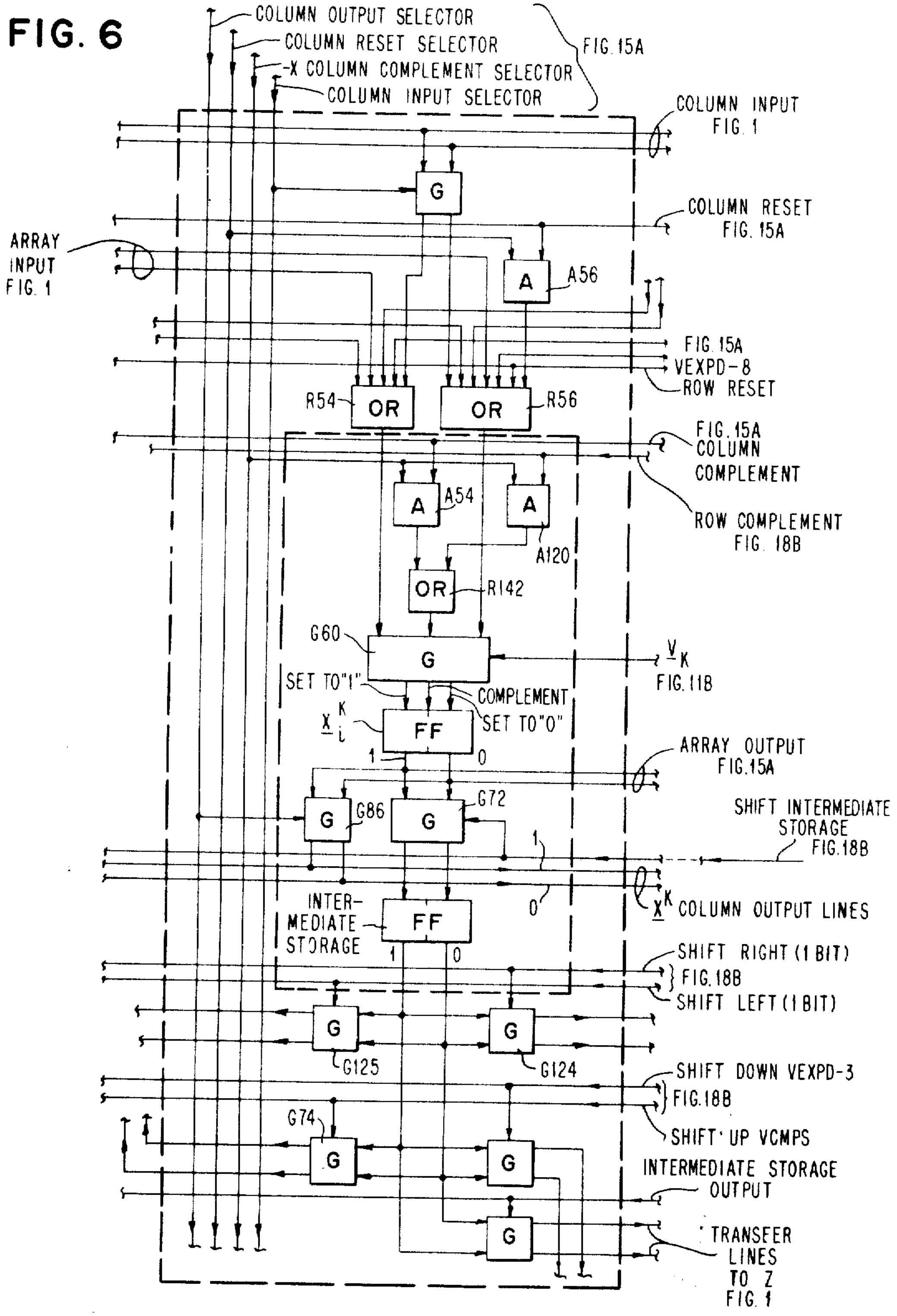

FIGURE 6 is a logical schematic diagram of a single bit storage position in one row of the X Register.

Figure 6A:
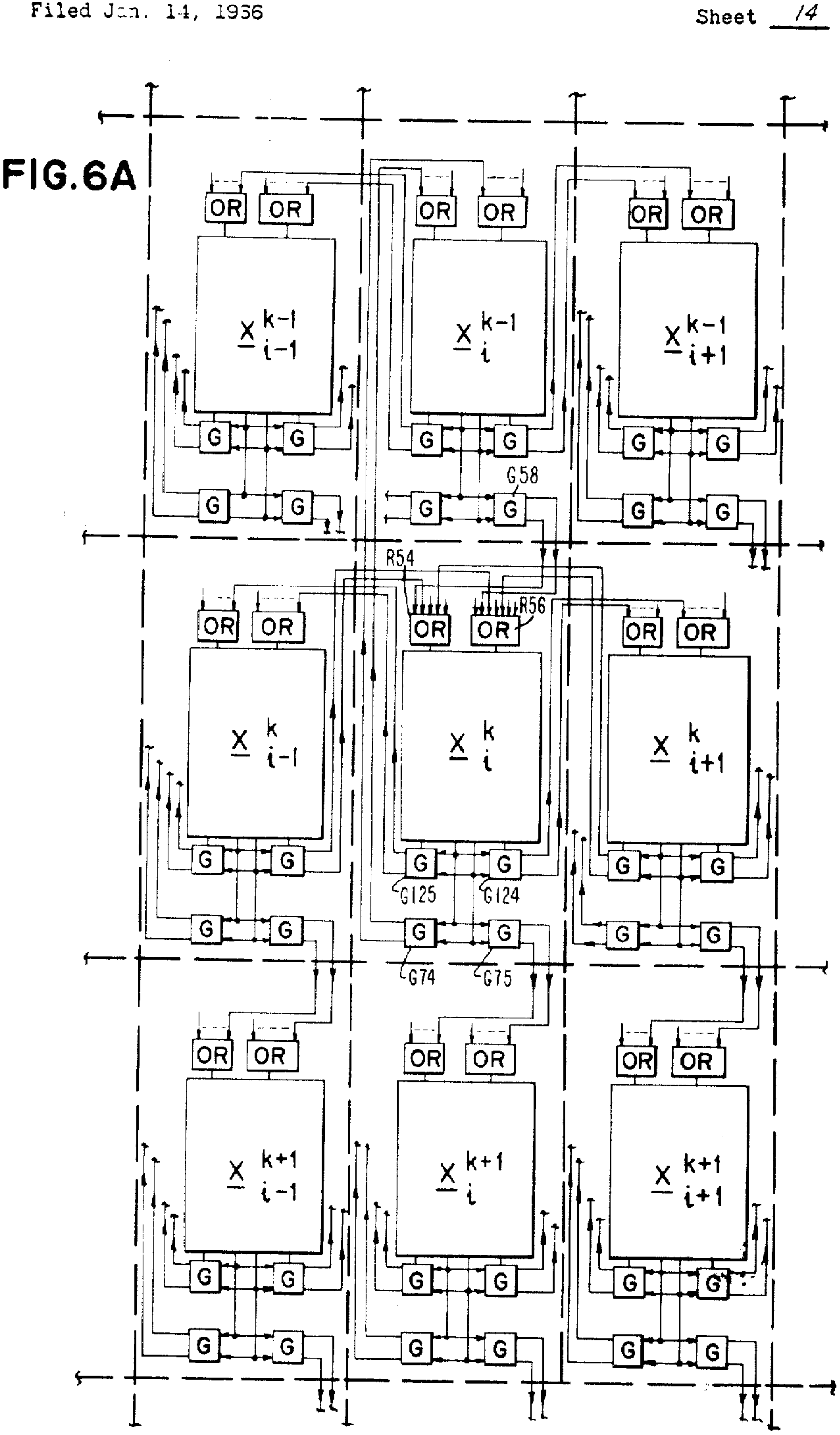

FIGURE 6*a* is a block diagram illustrating 9 bit storage positions in the X Register and illustrates generally how various shifting operations are accomplished.

Figure 7:
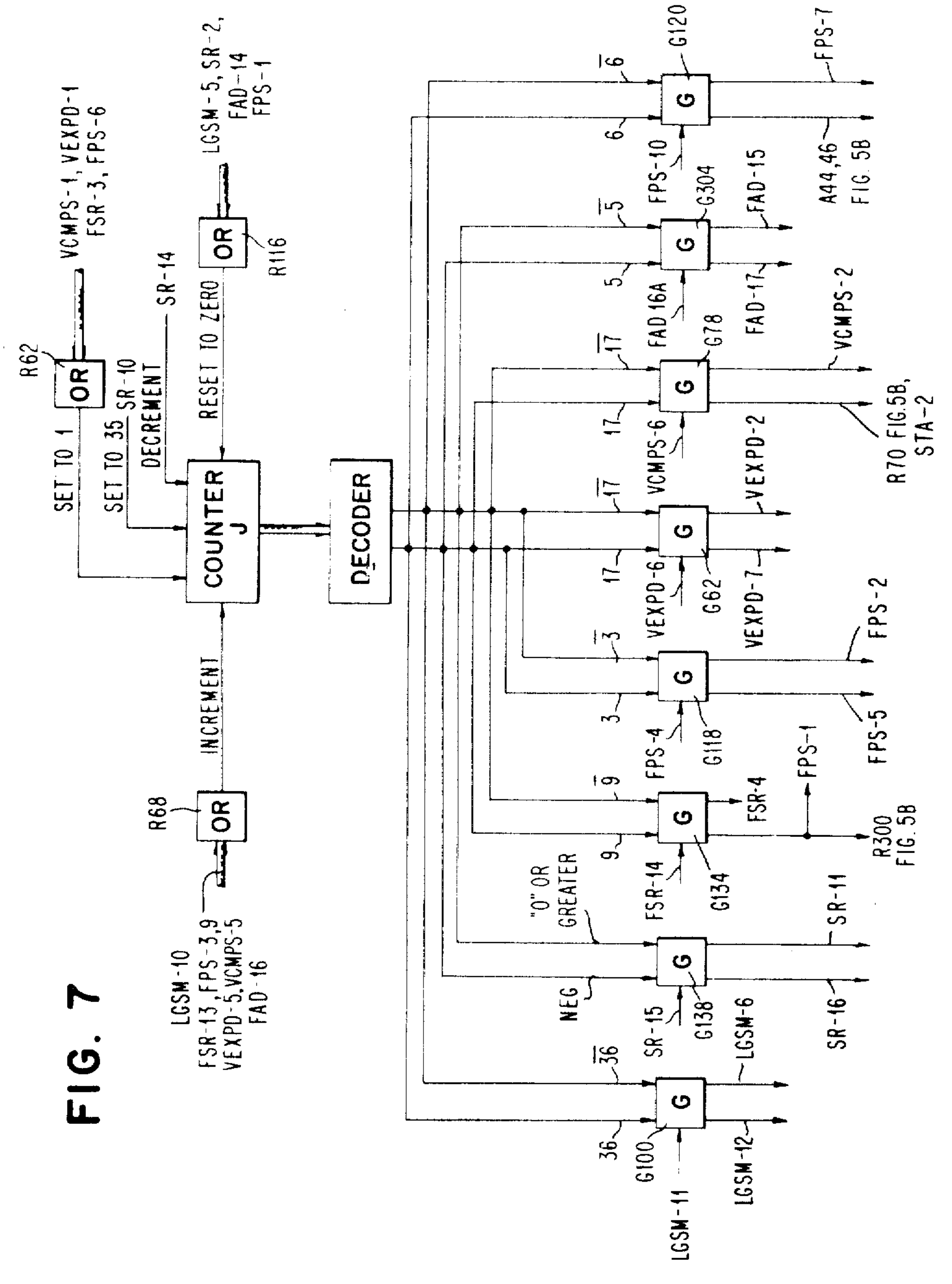

FIGURE 7 is a logical schematic diagram of the Counter J and its associated controls.

Figure 8:
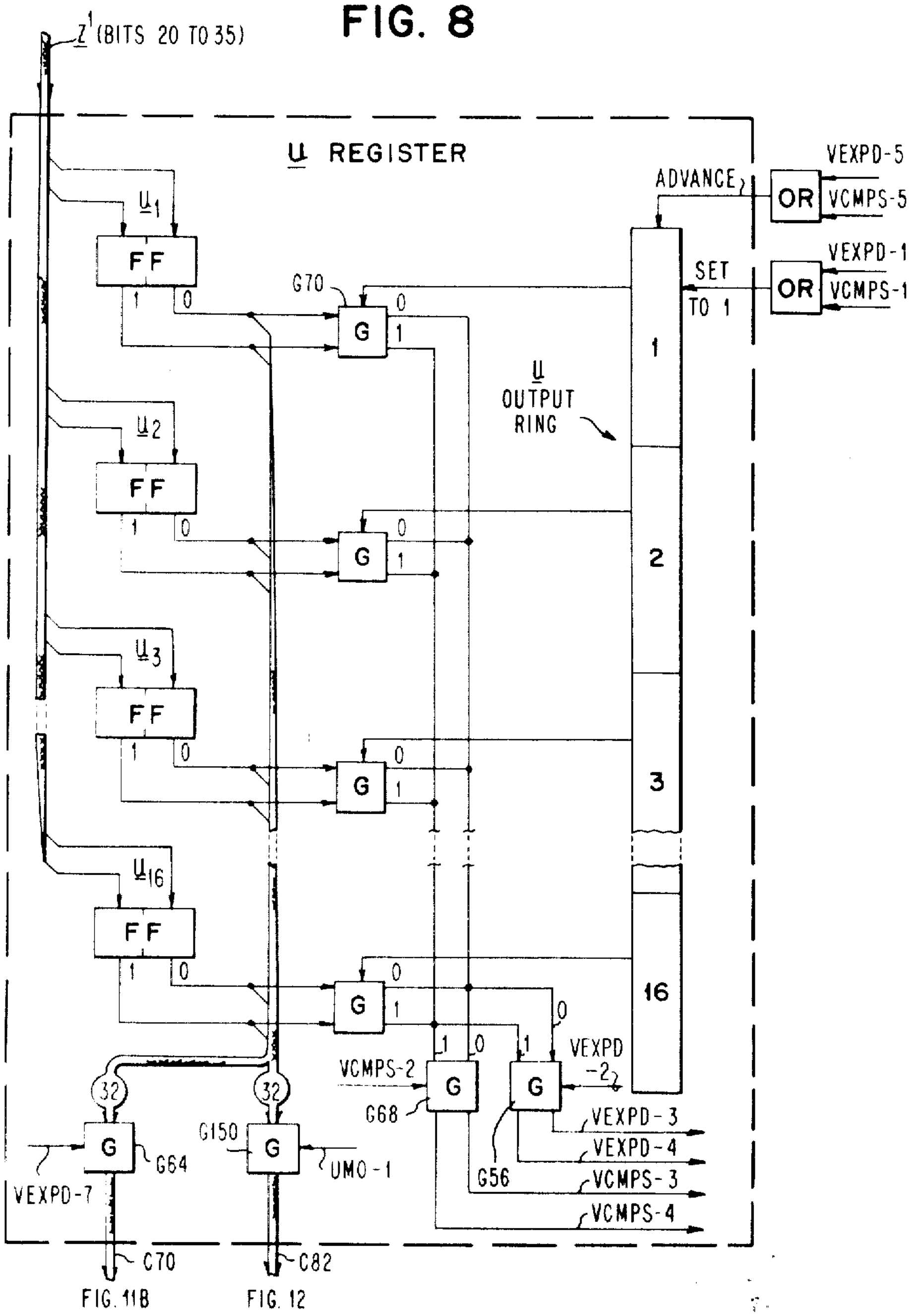

FIGURE 8 is a logical schematic diagram of the u Register and its associated controls.

Figure 9:
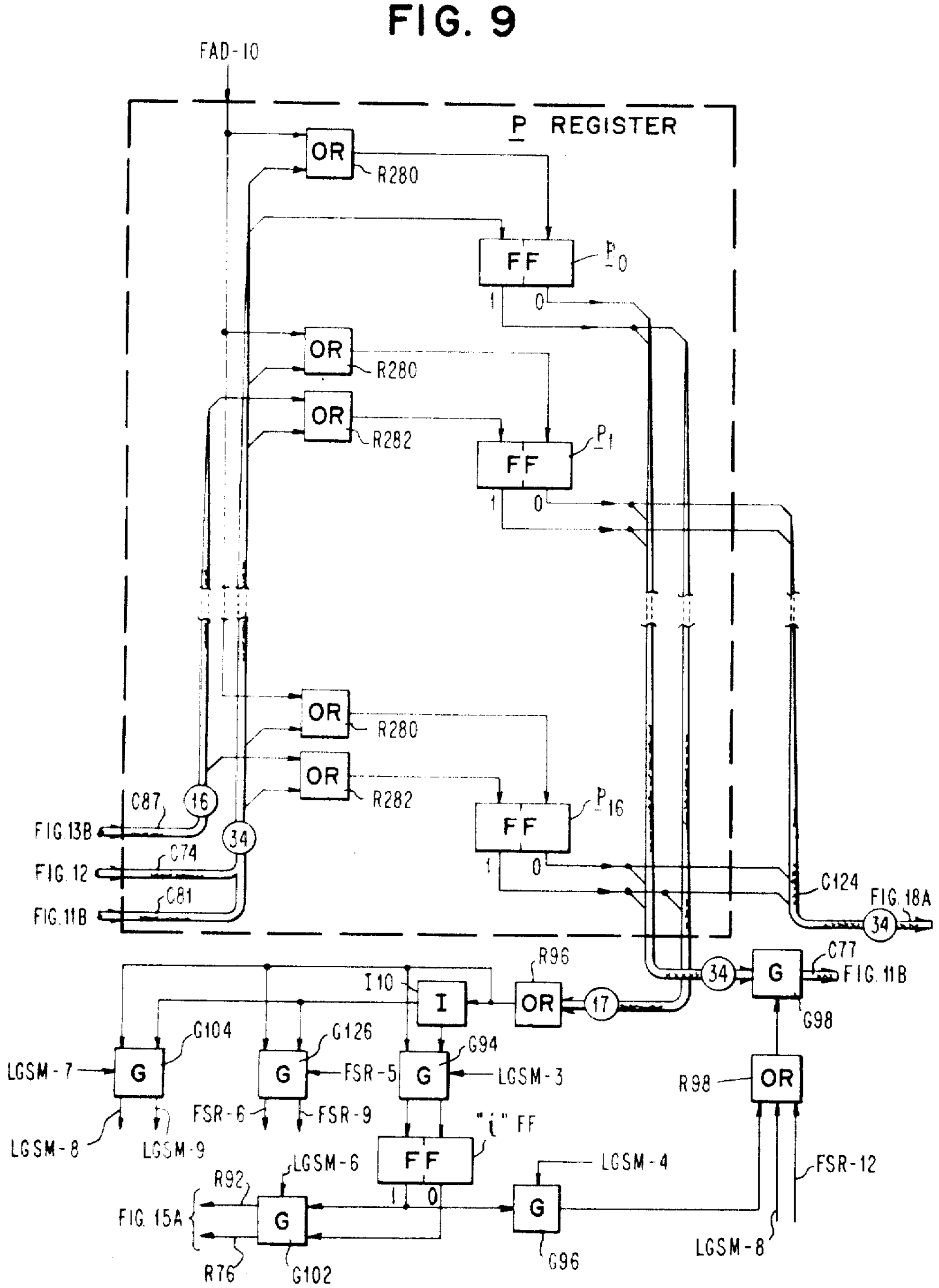

FIGURE 9 is a logical schematic diagram of the p Register and its associated controls.

Figure 10:
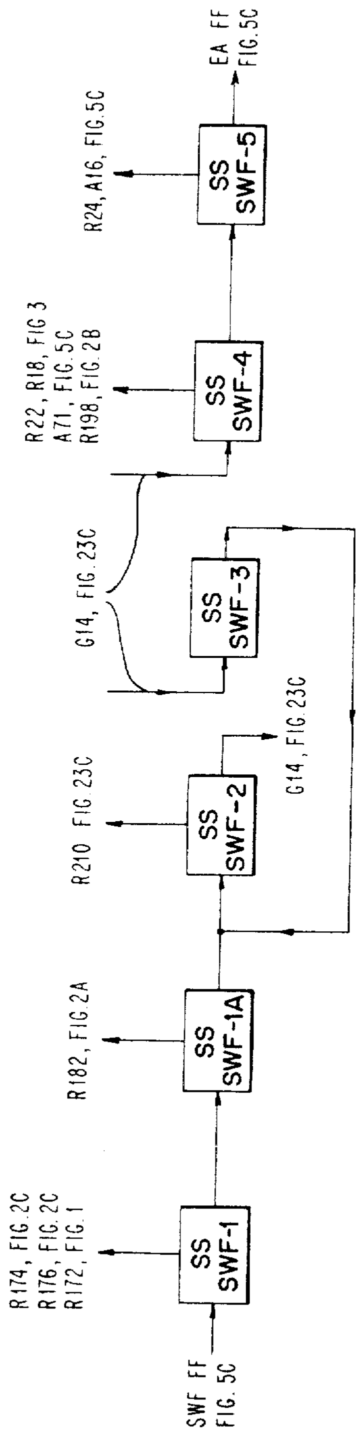

FIGURE 10 is a logical schematic diagram which illustrates the manner in which the Timing controls for the present system may be embodied and specifically, shows a Timing Clock for performing the Single Word Fetch instruction.

Figure 10A:
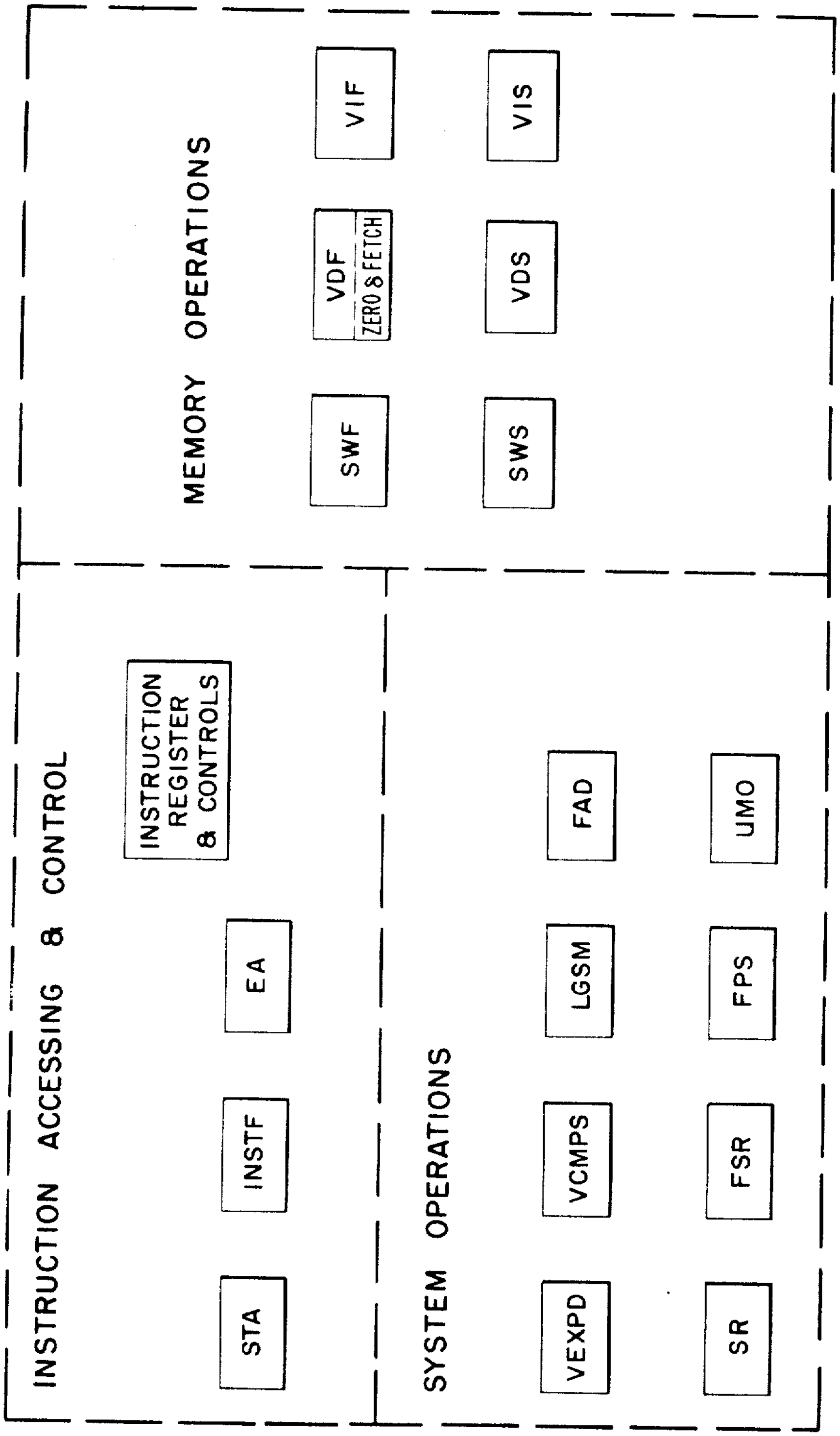

FIGURE 10*a* is a block diagram showing the various system clocks as blocks generally indicating their functional relationship.

Figure 11A:
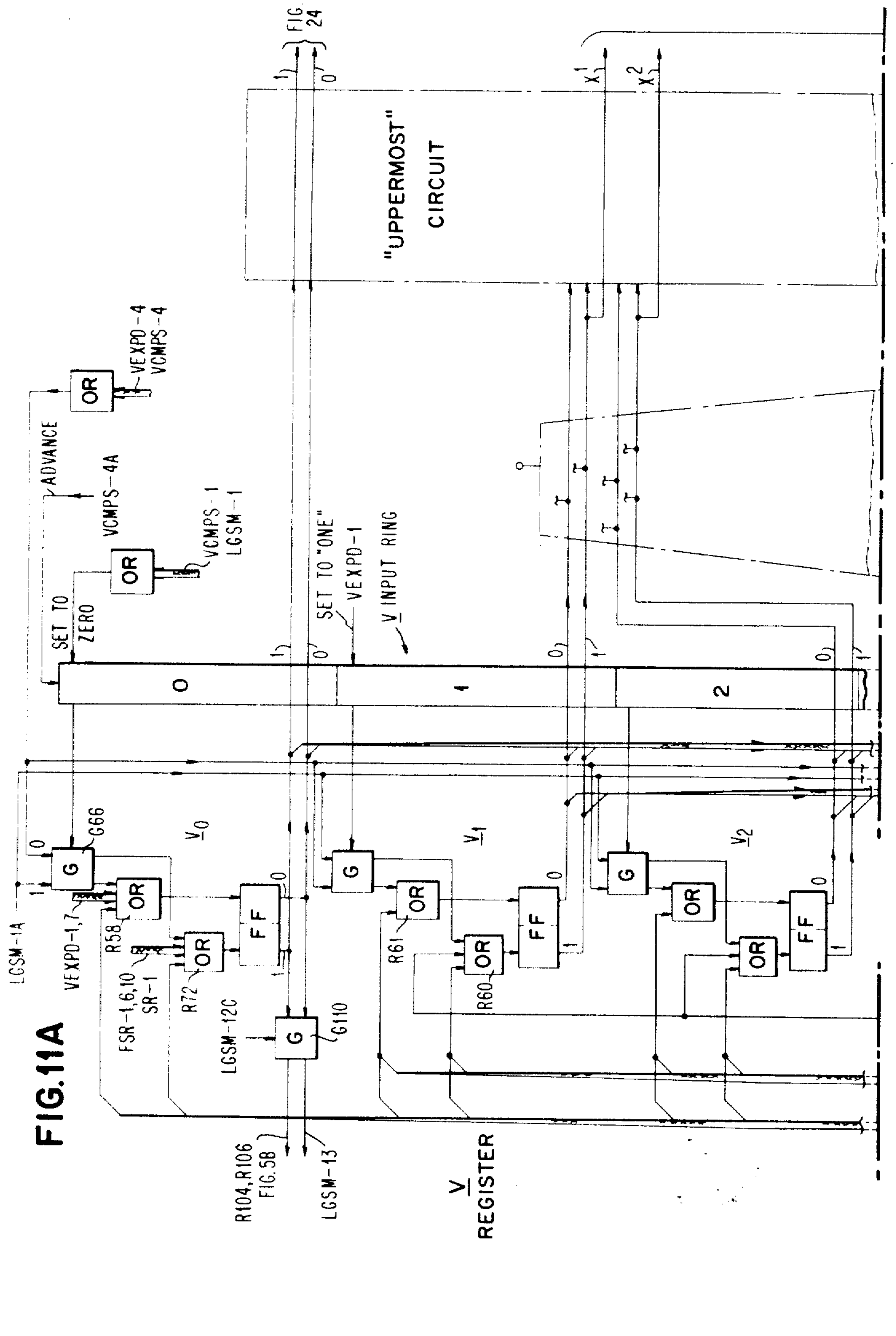
Figure 11B:
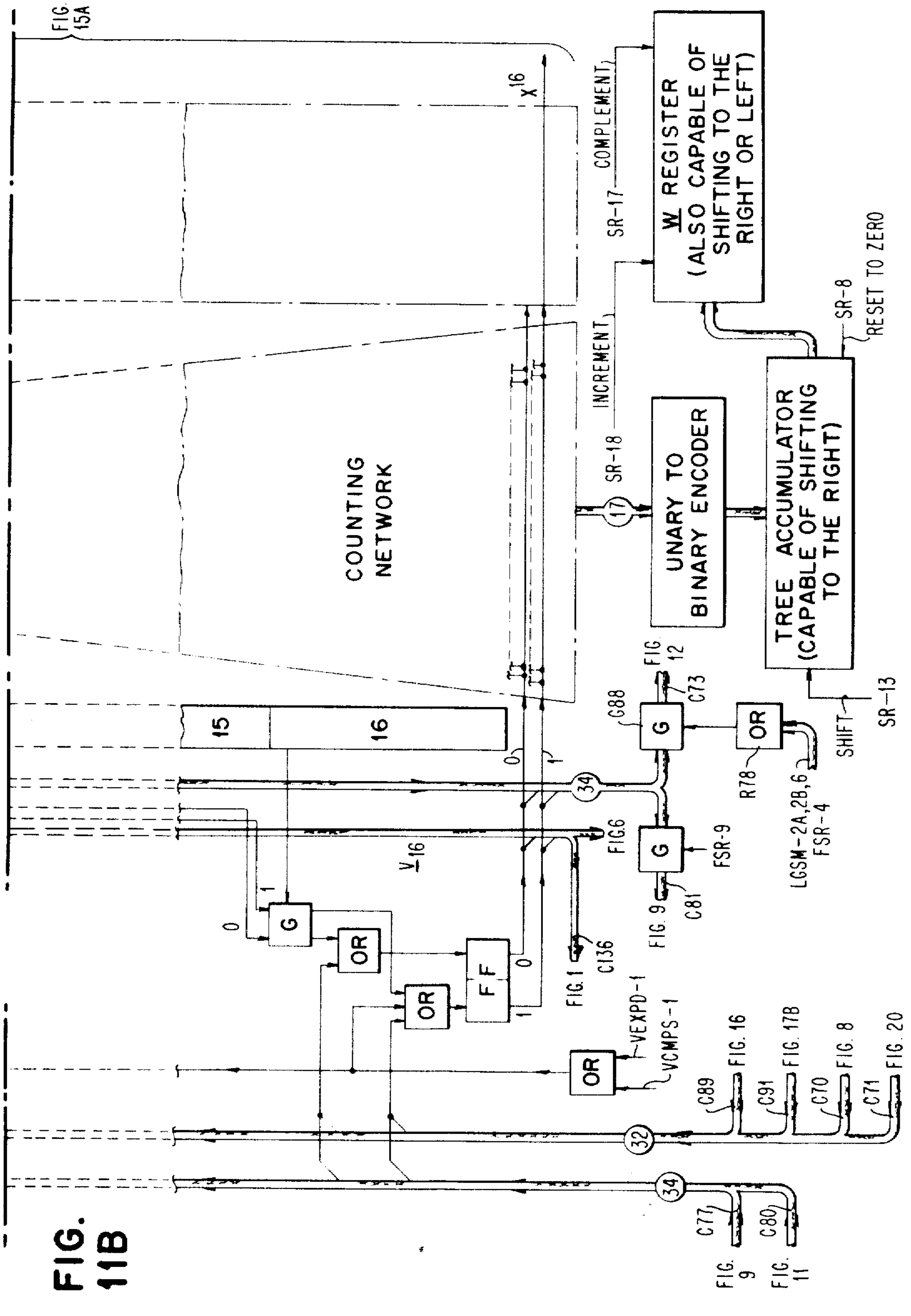

FIGURES 11*a* and 11*b* comprise a logical schematic diagram of the v Register and indicate the general connections between this register to the Counting Network and the Uppermost Circuits.

Figure 12:
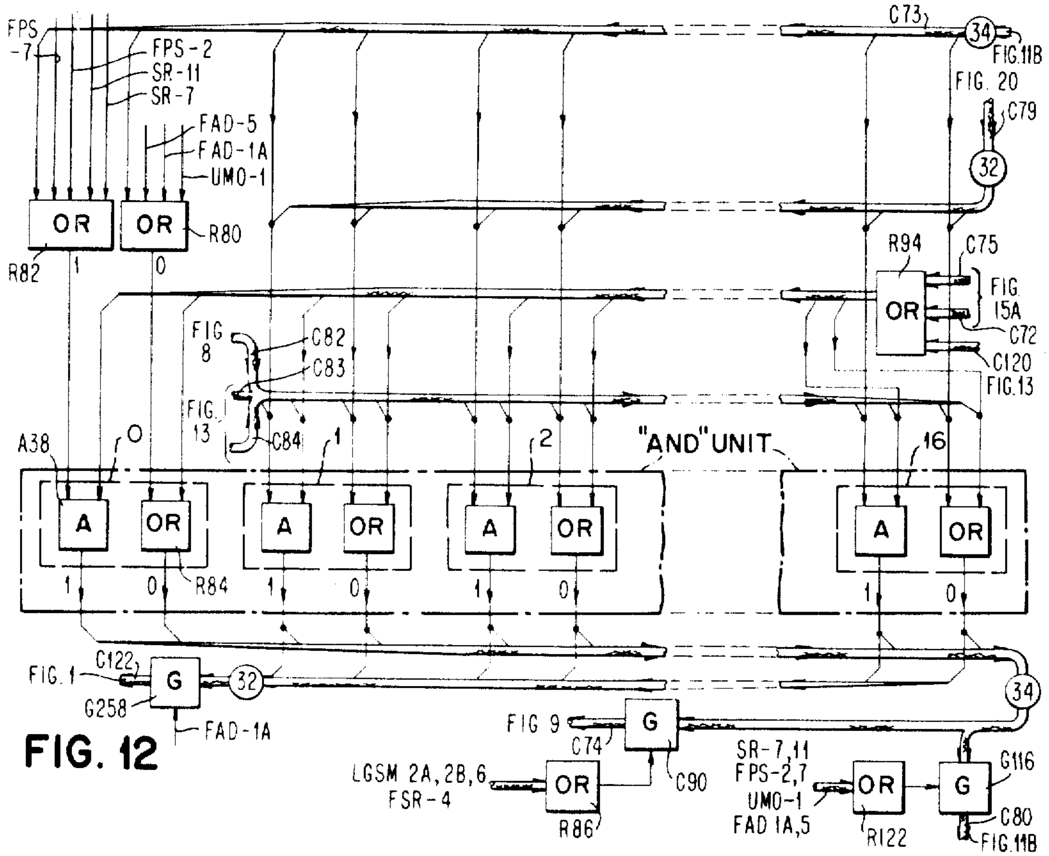

FIGURE 12 is a logical schematic diagram of the AND Unit.

Figure 13A:
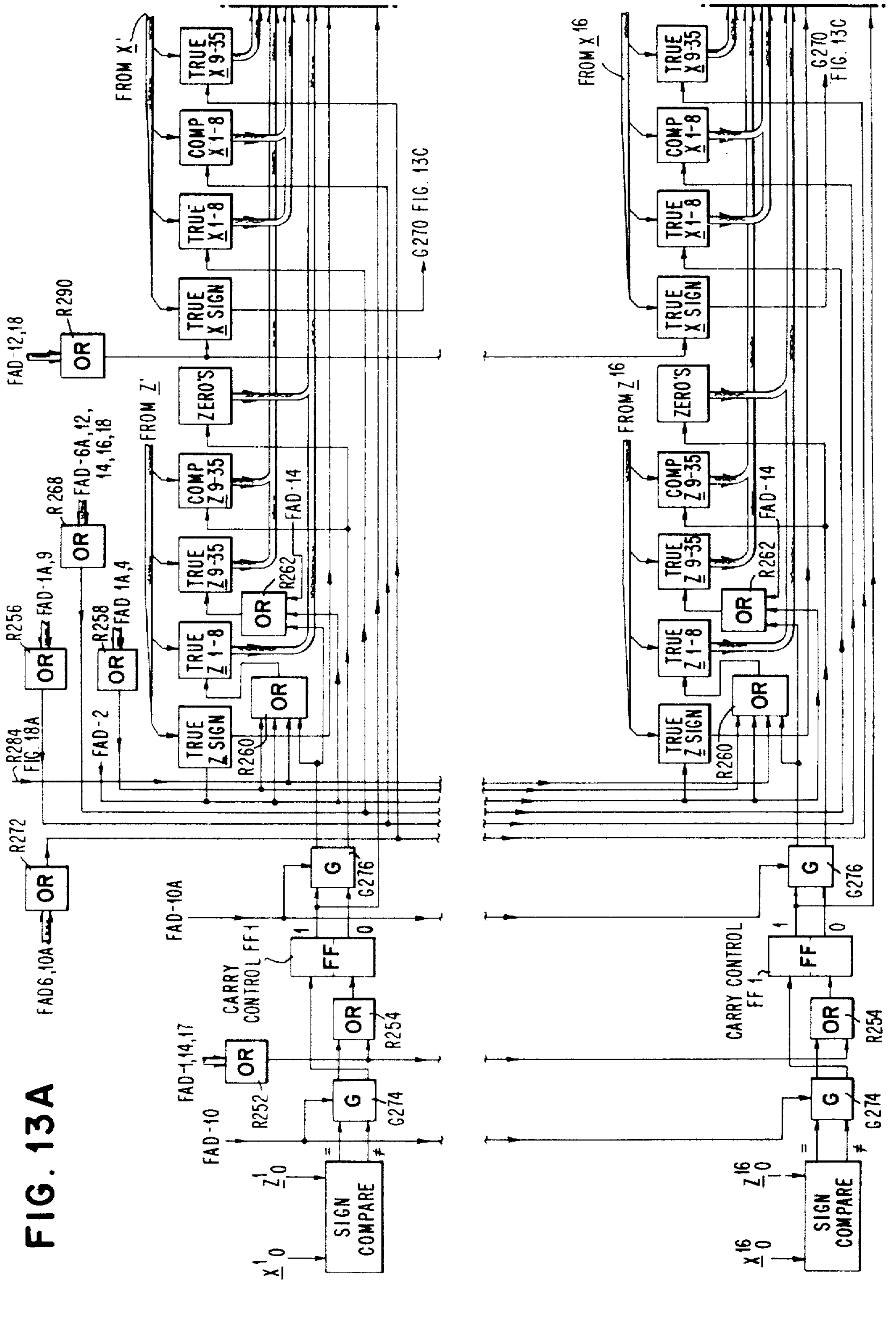
Figure 13B:
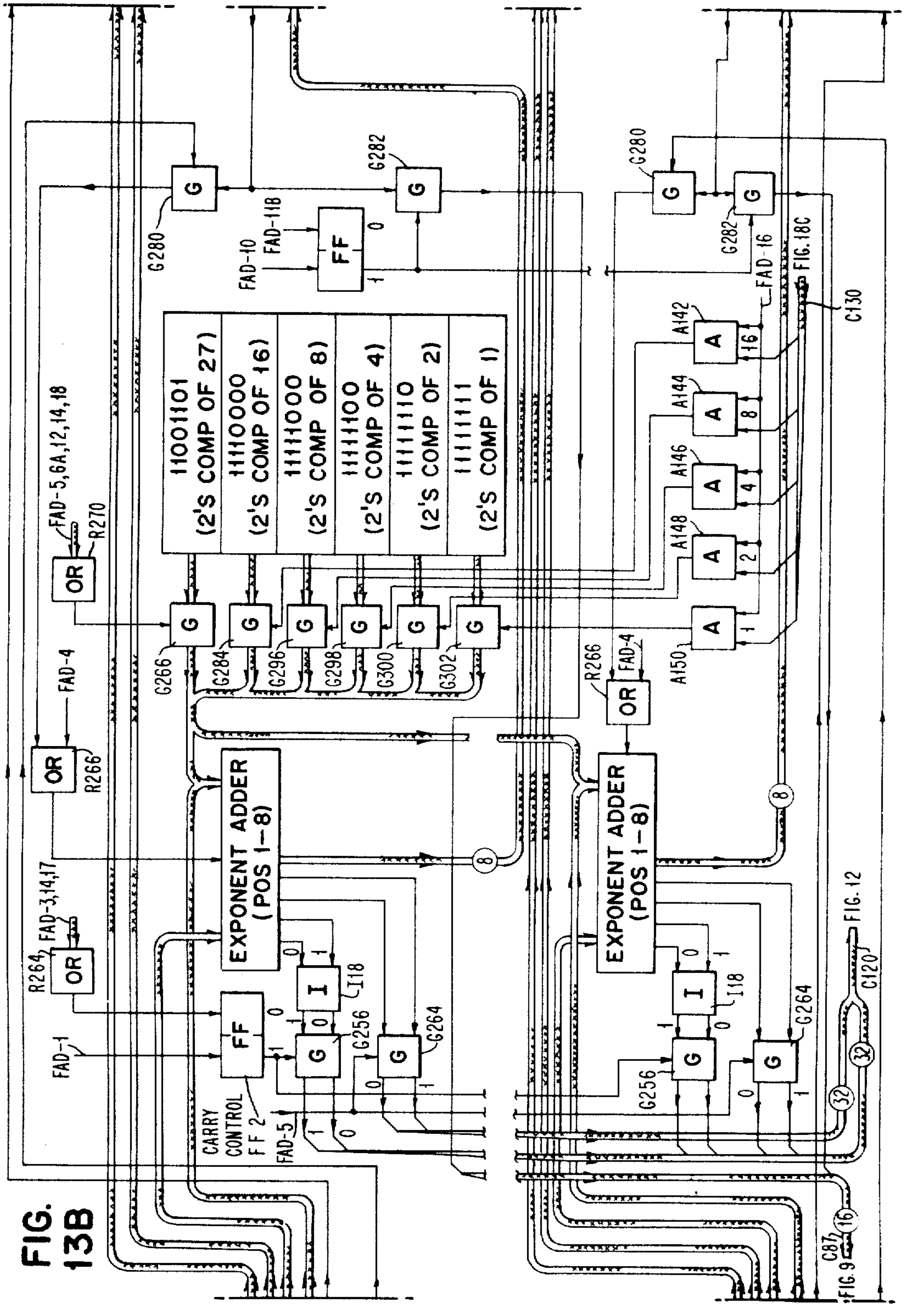
Figures 13, 13C:
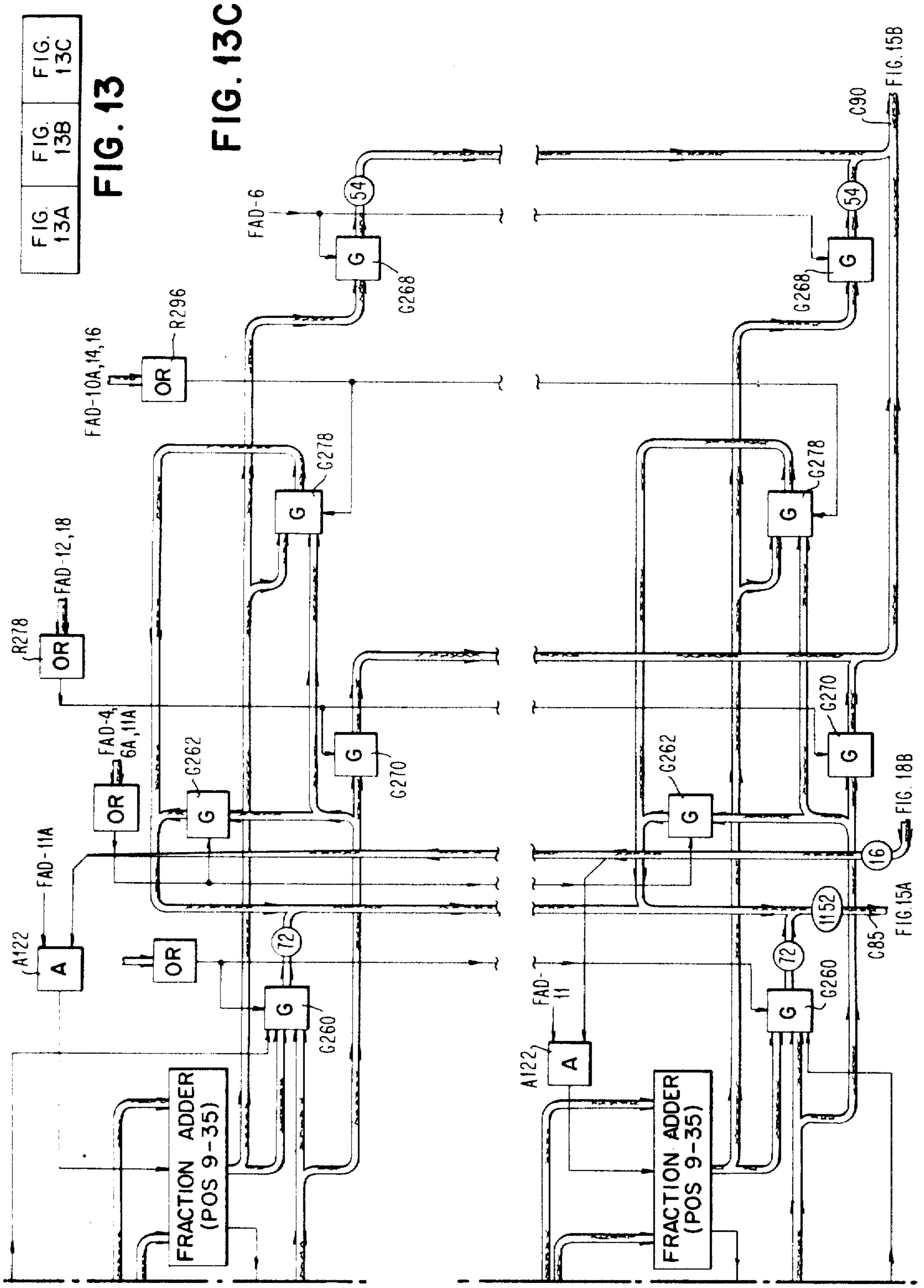

FIGURES 13 through 13*c* comprise a logical schematic diagram of the Floating Point Add section of the Arithmetic Units of the present invention.

Figure 14A:
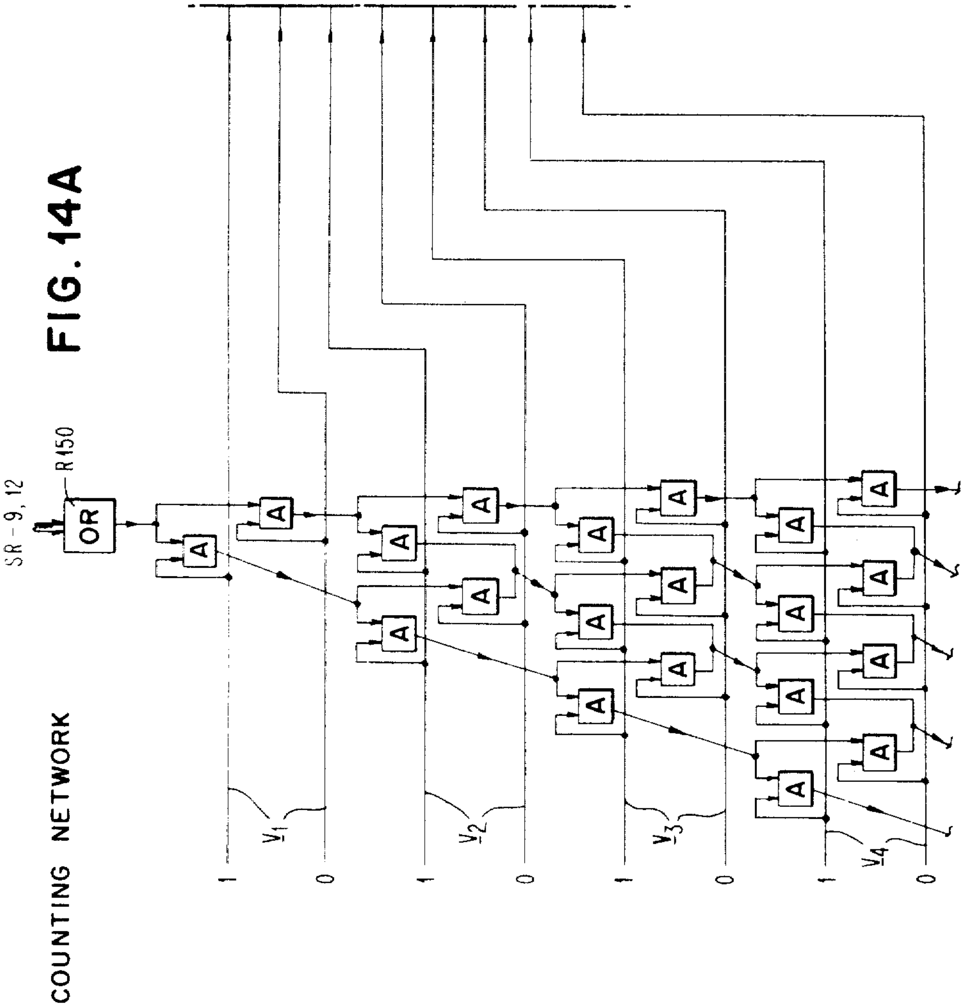
Figure 14:
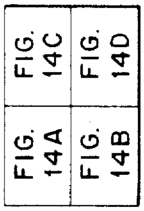
Figure 14B:
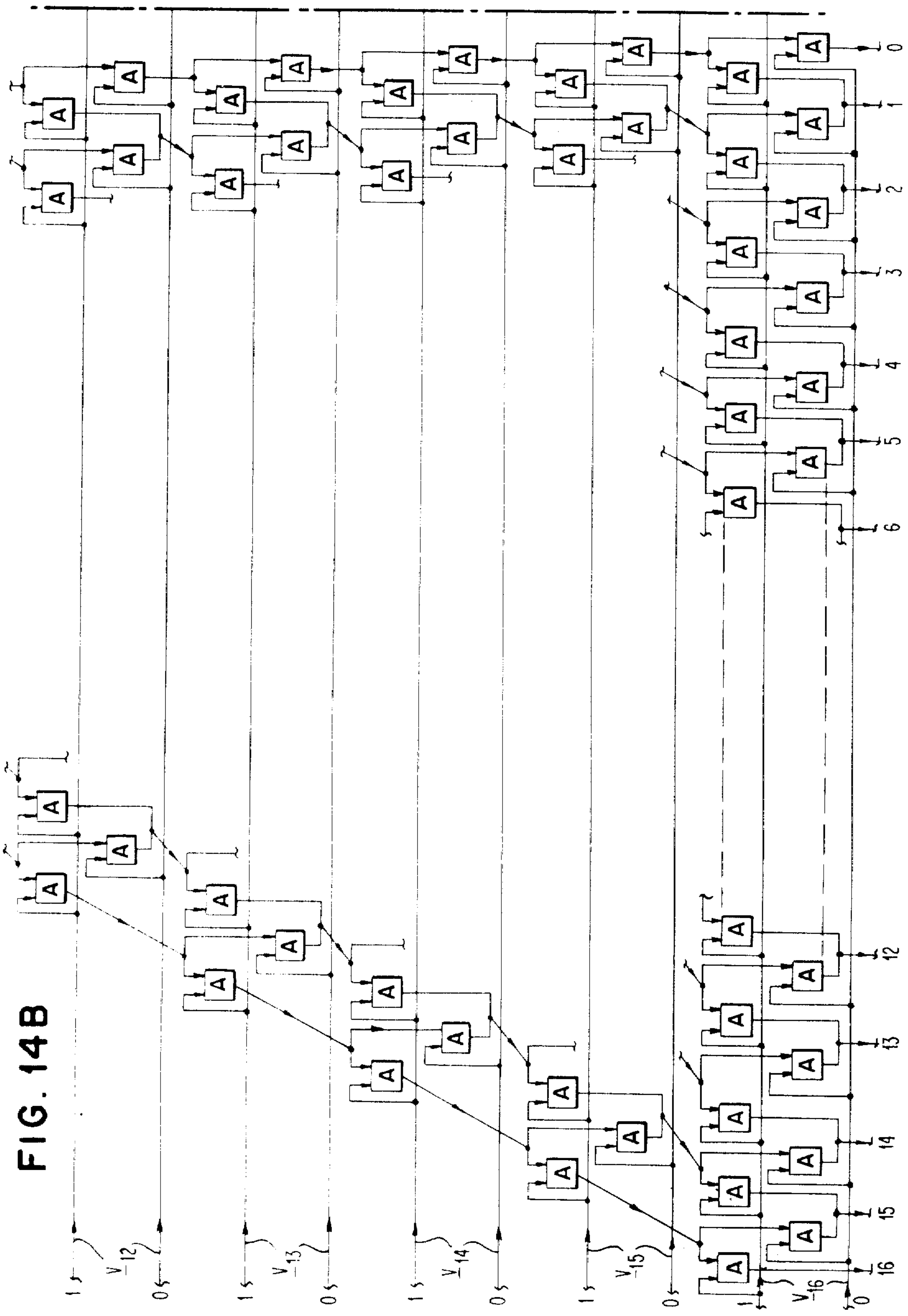
Figure 14C:
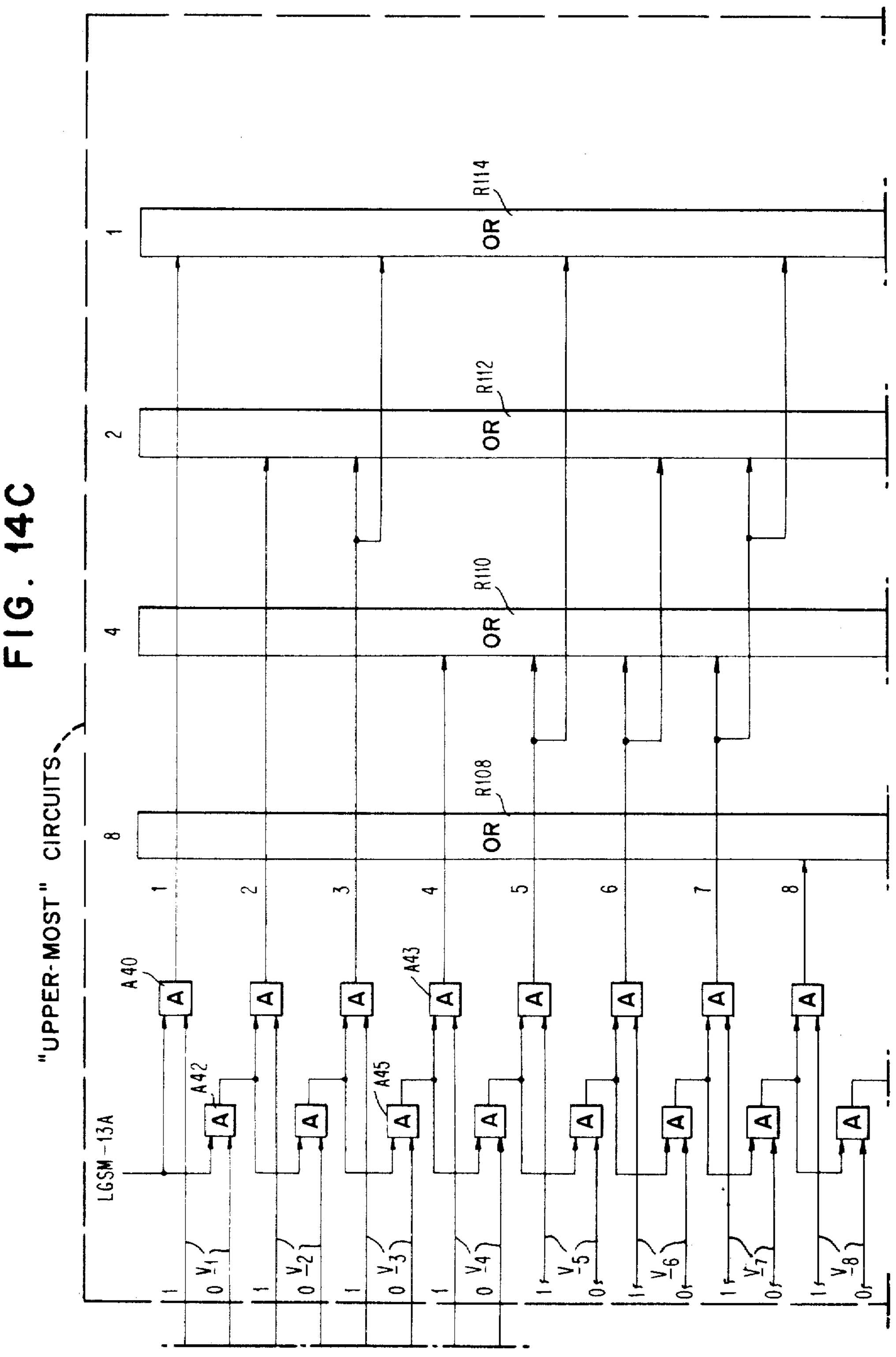
Figure 14D:
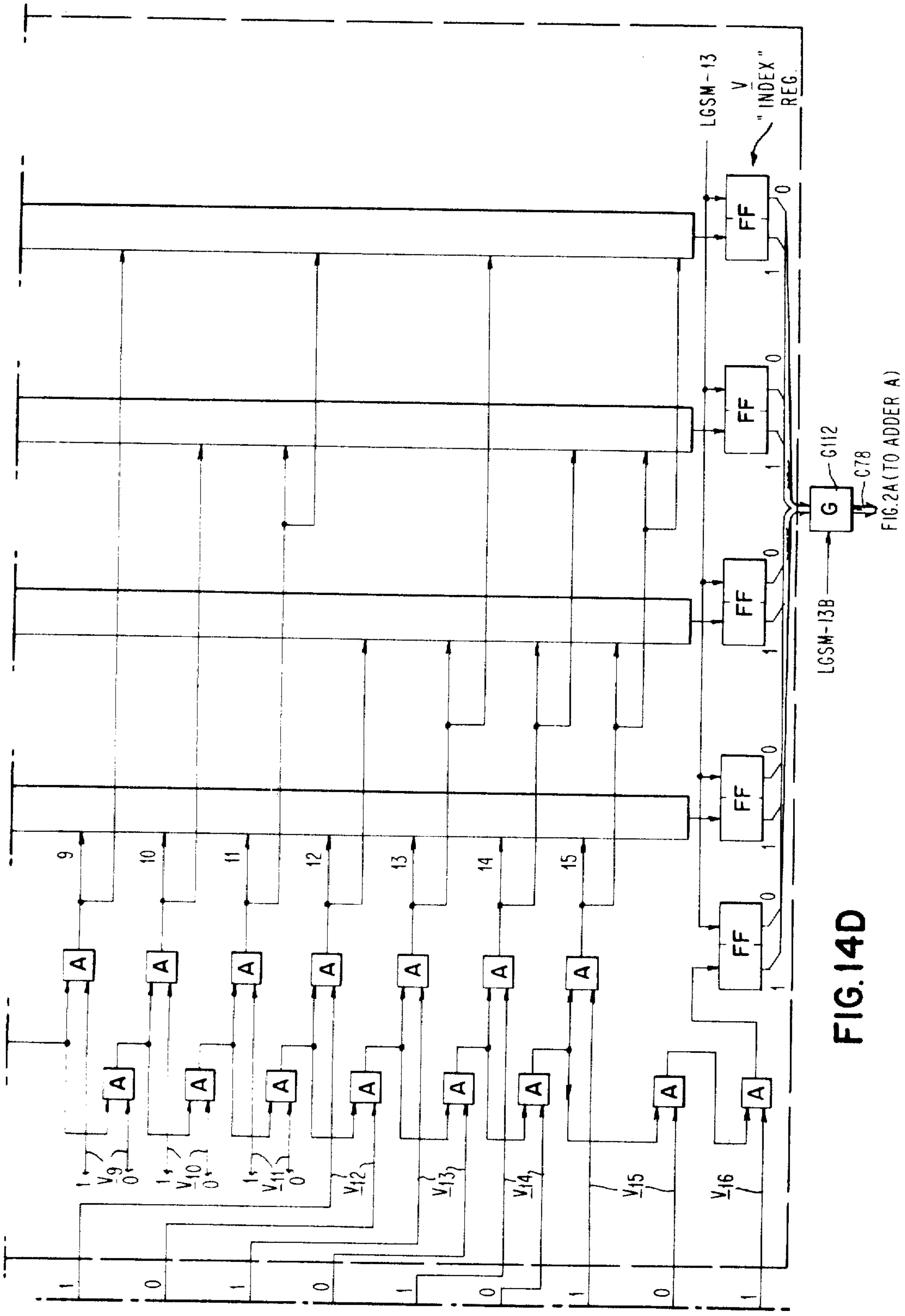

FIGURES 14 through 14*d* comprise a logical schematic diagram of the Counting Network and the Uppermost Circuits shown in block form on FIGURE 11.

Figures 15, 15A:
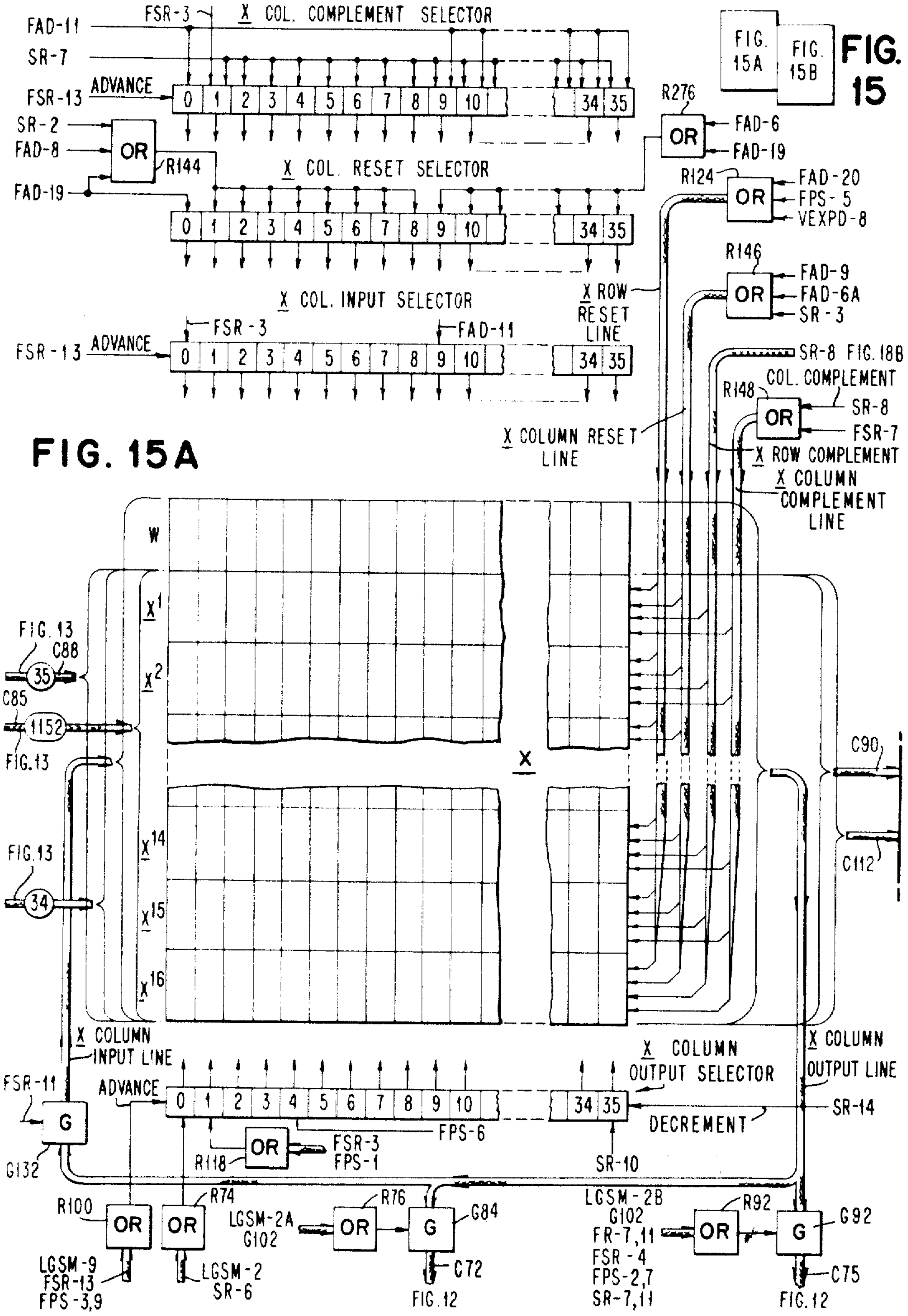
Figure 15B:
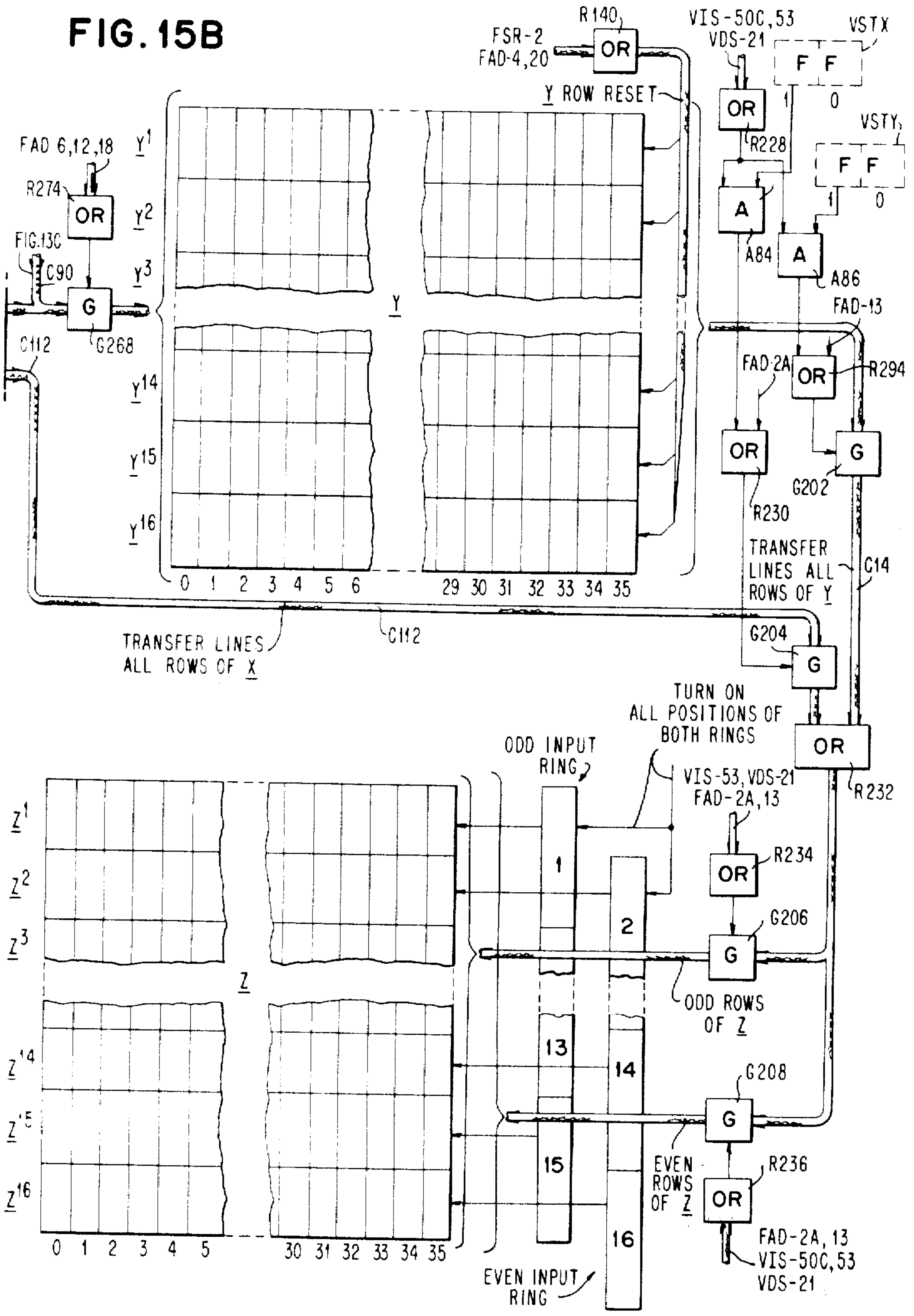

FIGURES 15 through 15*b* comprise a logical schematic diagram illustrating the interconnections between the X, Y and Z Registers and also showing the various X Register special purpose controls.

Figure 16:
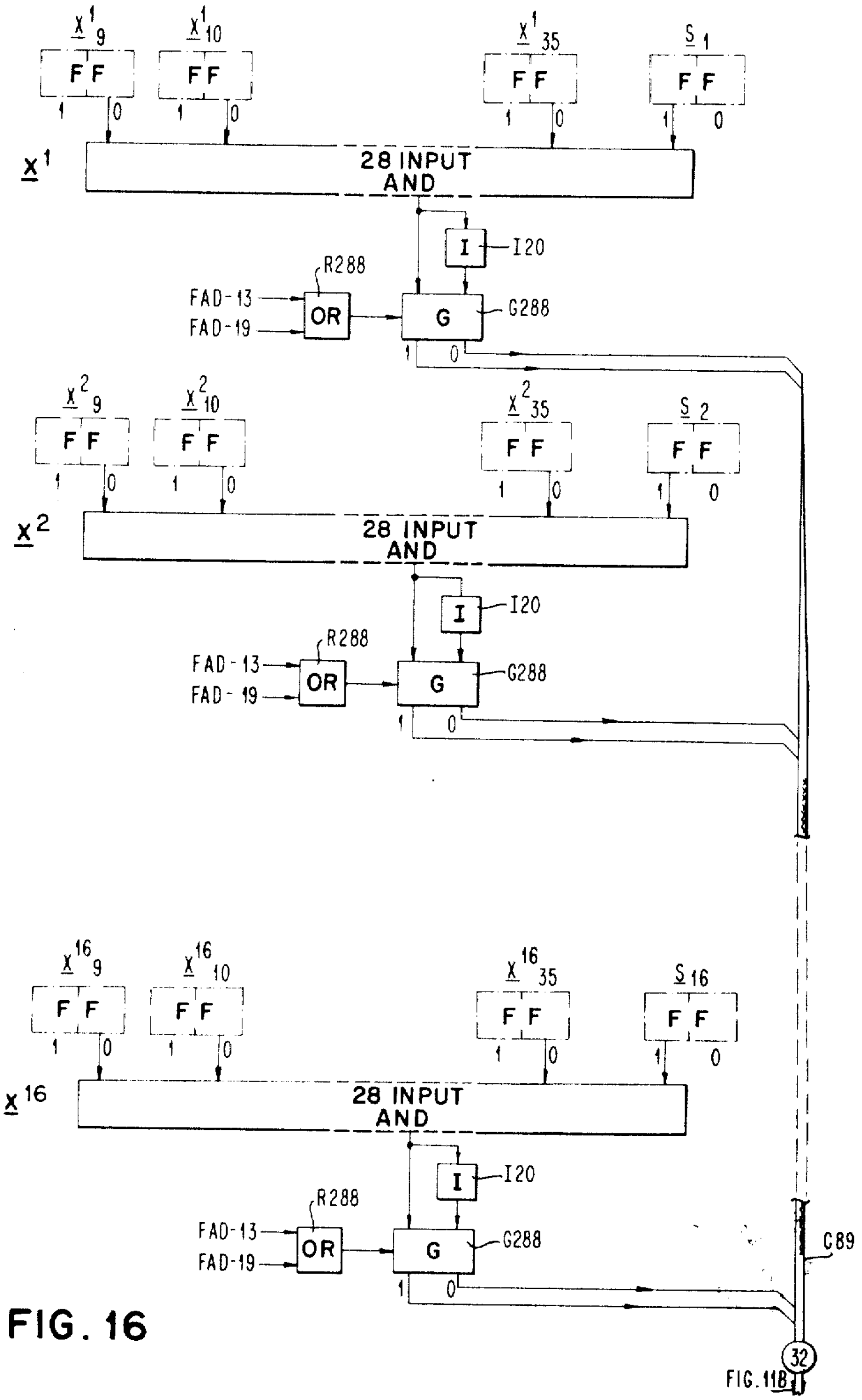

FIGURE 16 is a logical schematic diagram showing the details of the 28 Input AND Units utilized during certain Floating Point Add operations.

Figure 17A:
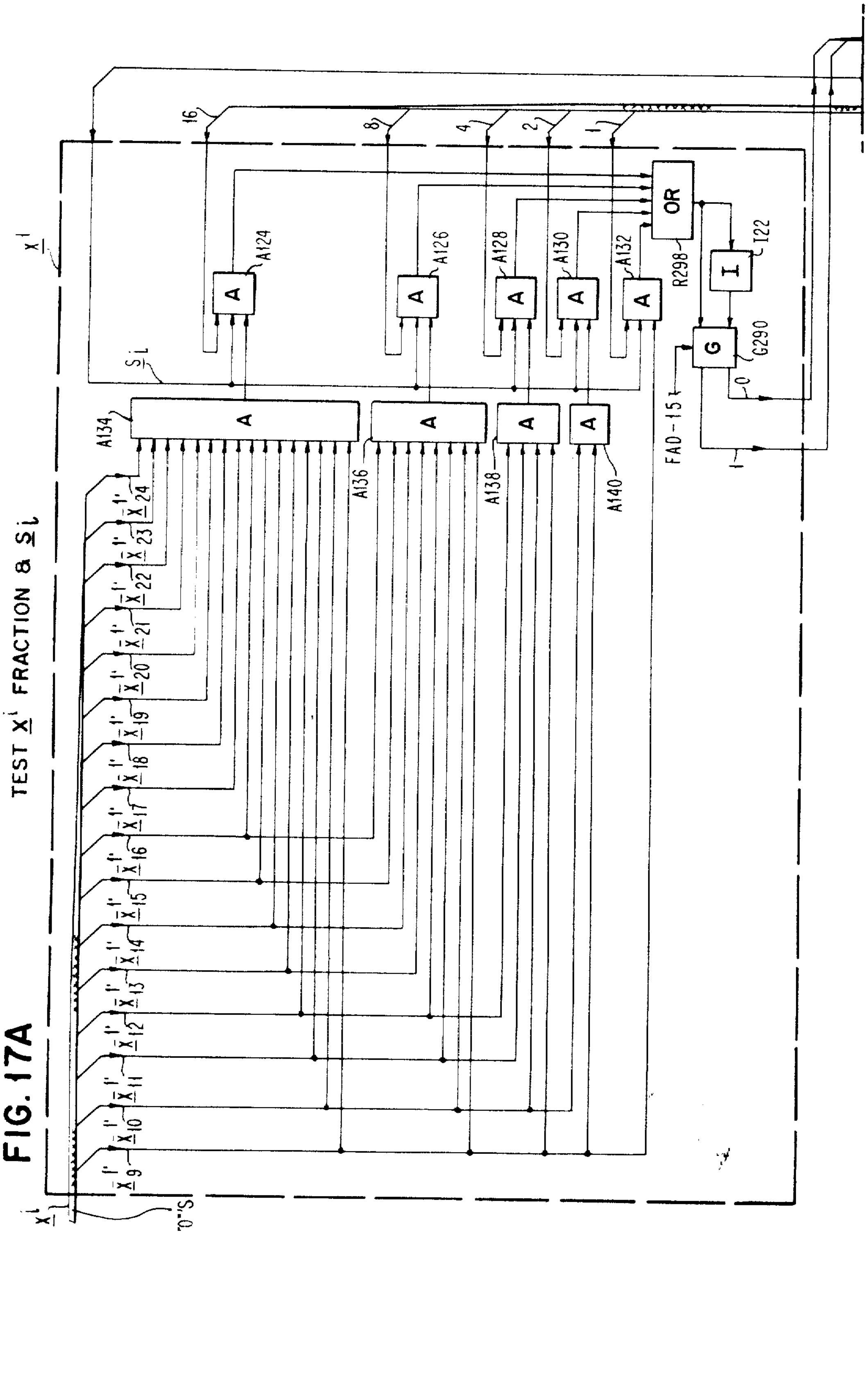
Figures 17, 17B:
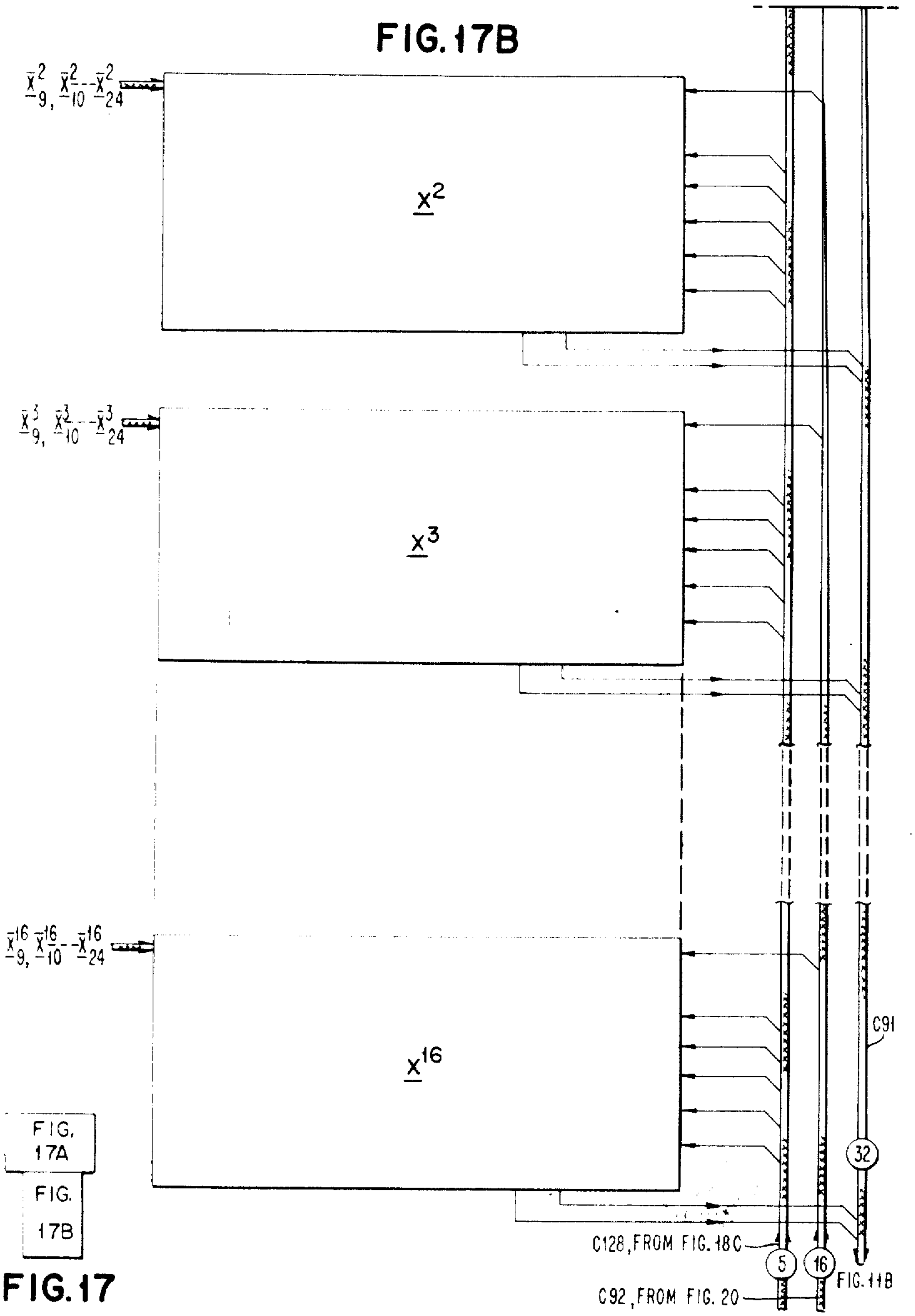

FIGURES 17 through 17*b* comprise a logical schematic diagram indicating both in block form and in detail (17*a*) the logic circuitry for performing Normalizing operations.

Figure 18A:
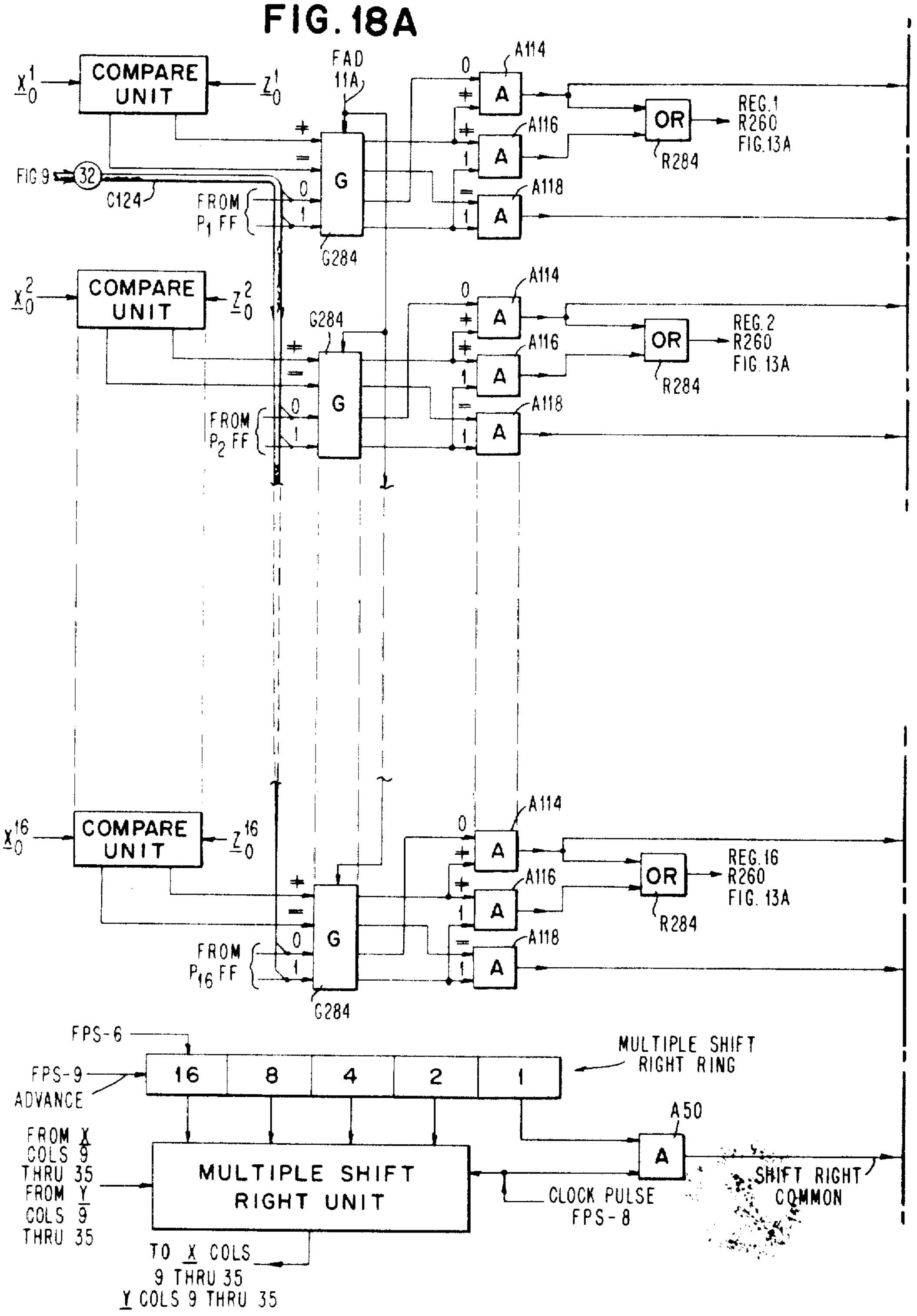
Figures 18, 18B:
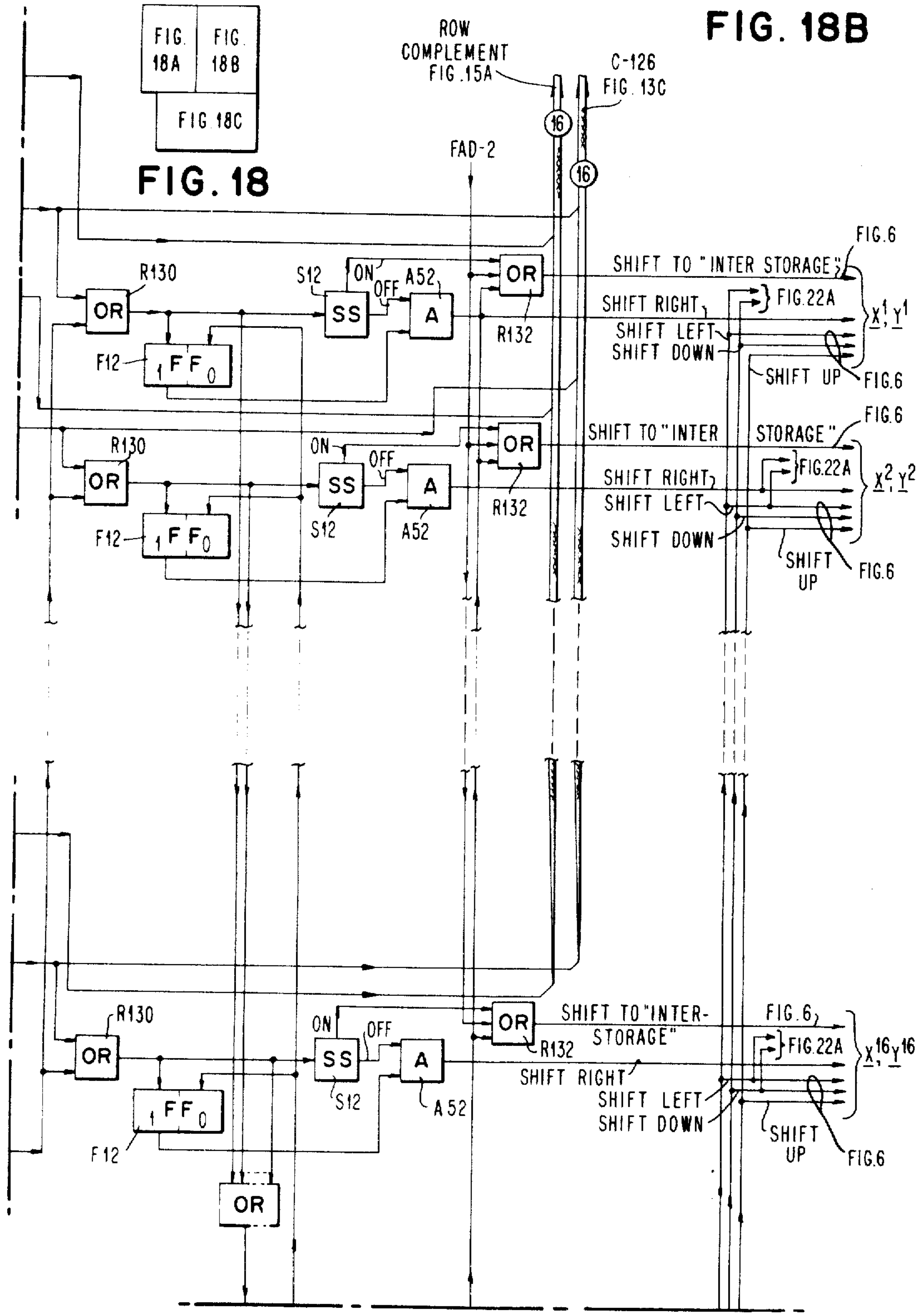
Figure 18C:
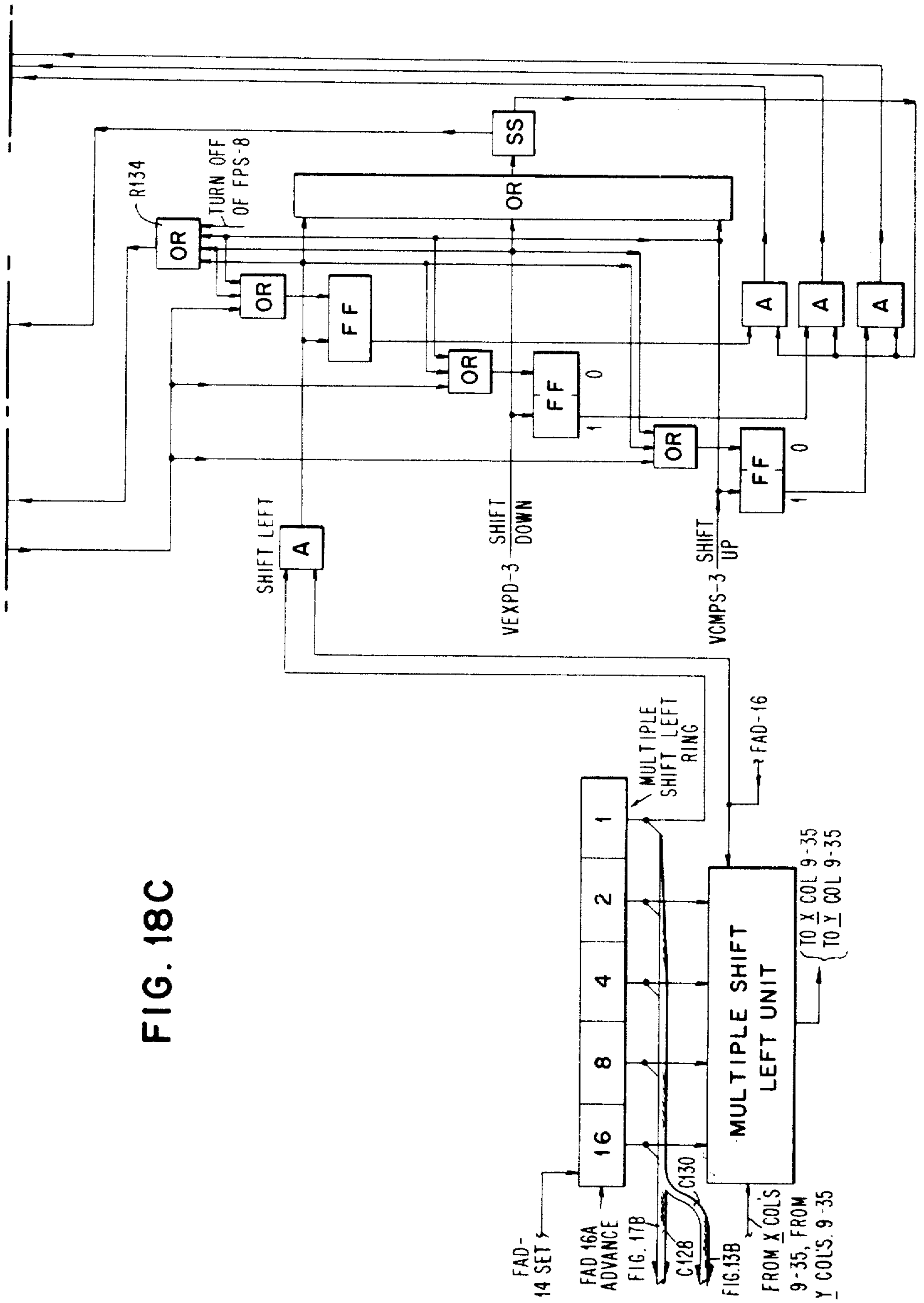

FIGURES 18 through 18*c* comprise a logical schematic diagram showing the details of the Shift Left and Shift Right controls for performing shift operations during Floating Point Add and Floating Sum Reduction operations.

Figure 19:
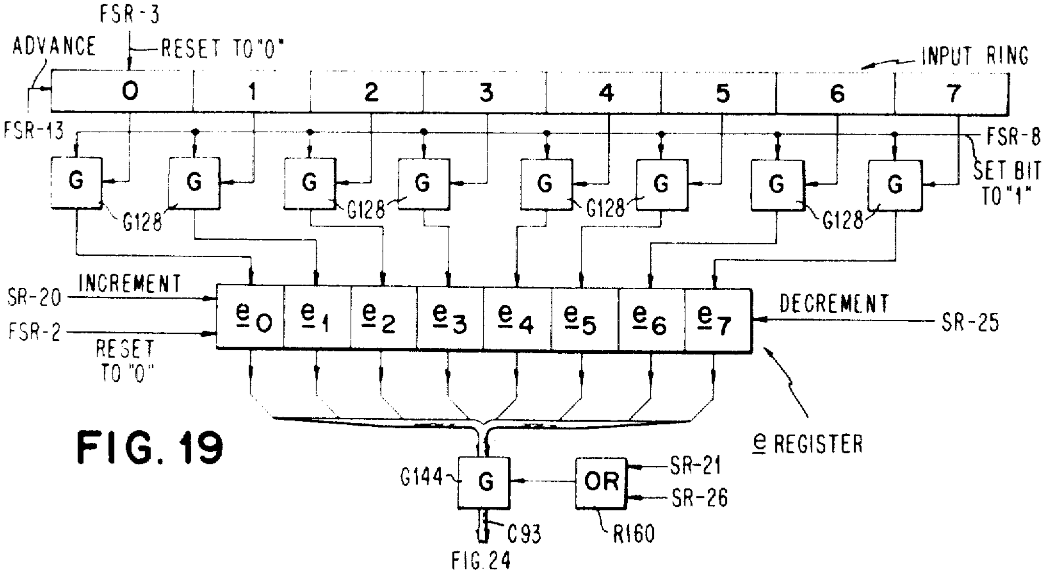

FIGURE 19 is a logical schematic diagram showing the e Register and its associated controls.

Figure 20:
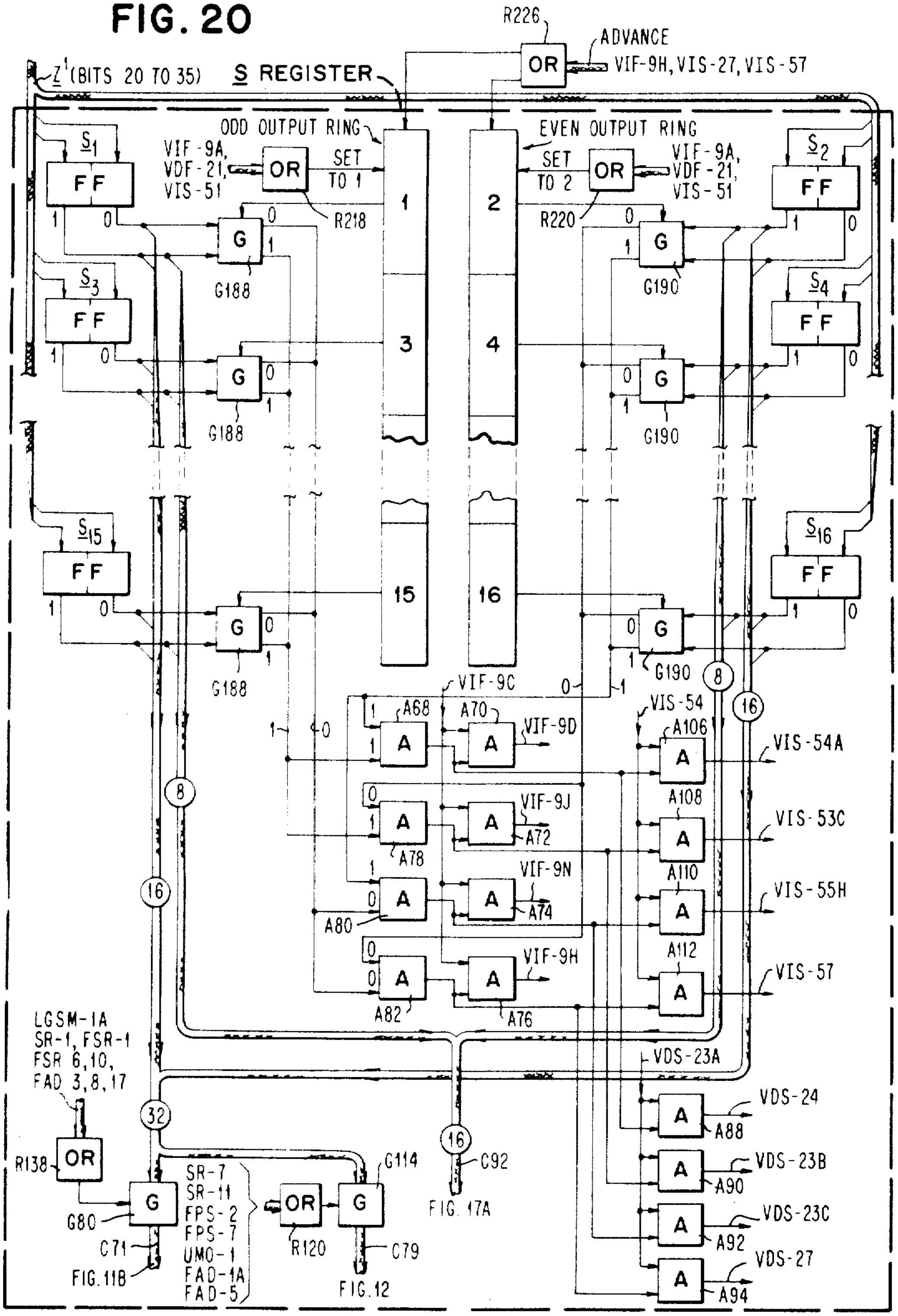

FIGURE 20 is a logical schematic diagram showing the details of the s (screen) Register.

Figure 21:
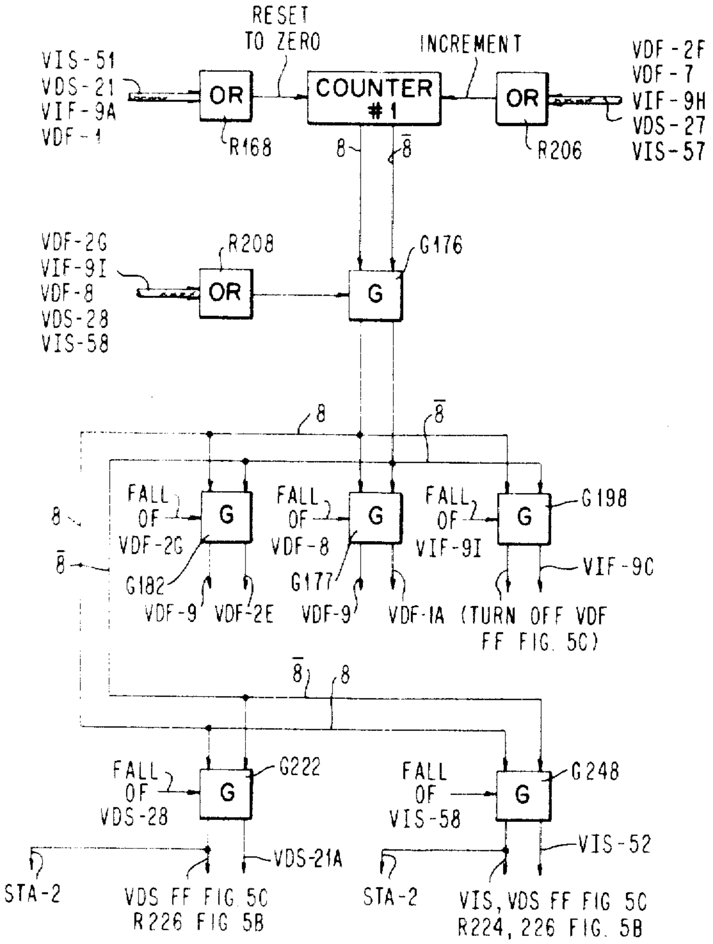

FIGURE 21 is a logical schematic diagram showing the Counter #1 and its associated Input and Output controls.

Figures 22, 22A:
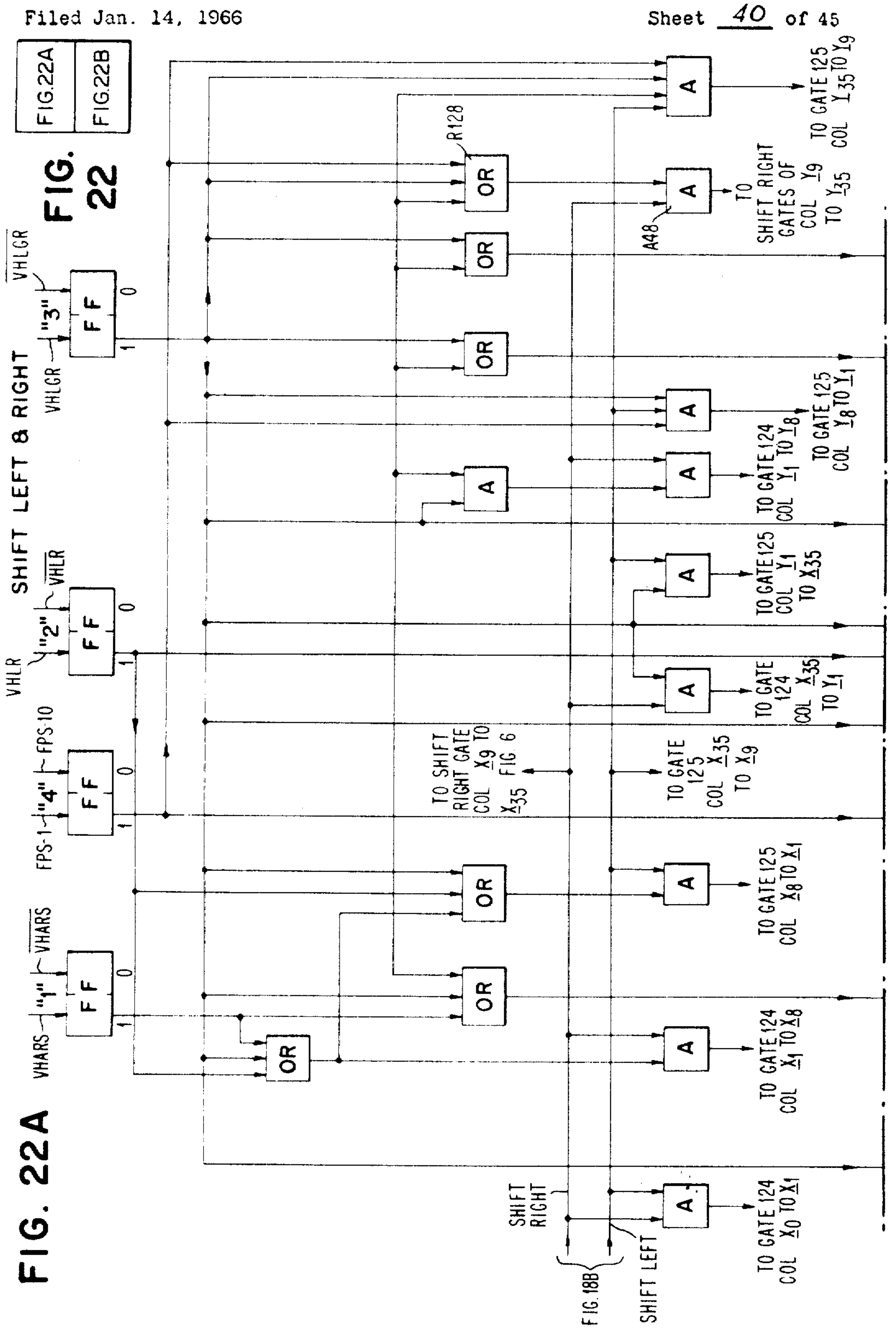
Figure 22B:
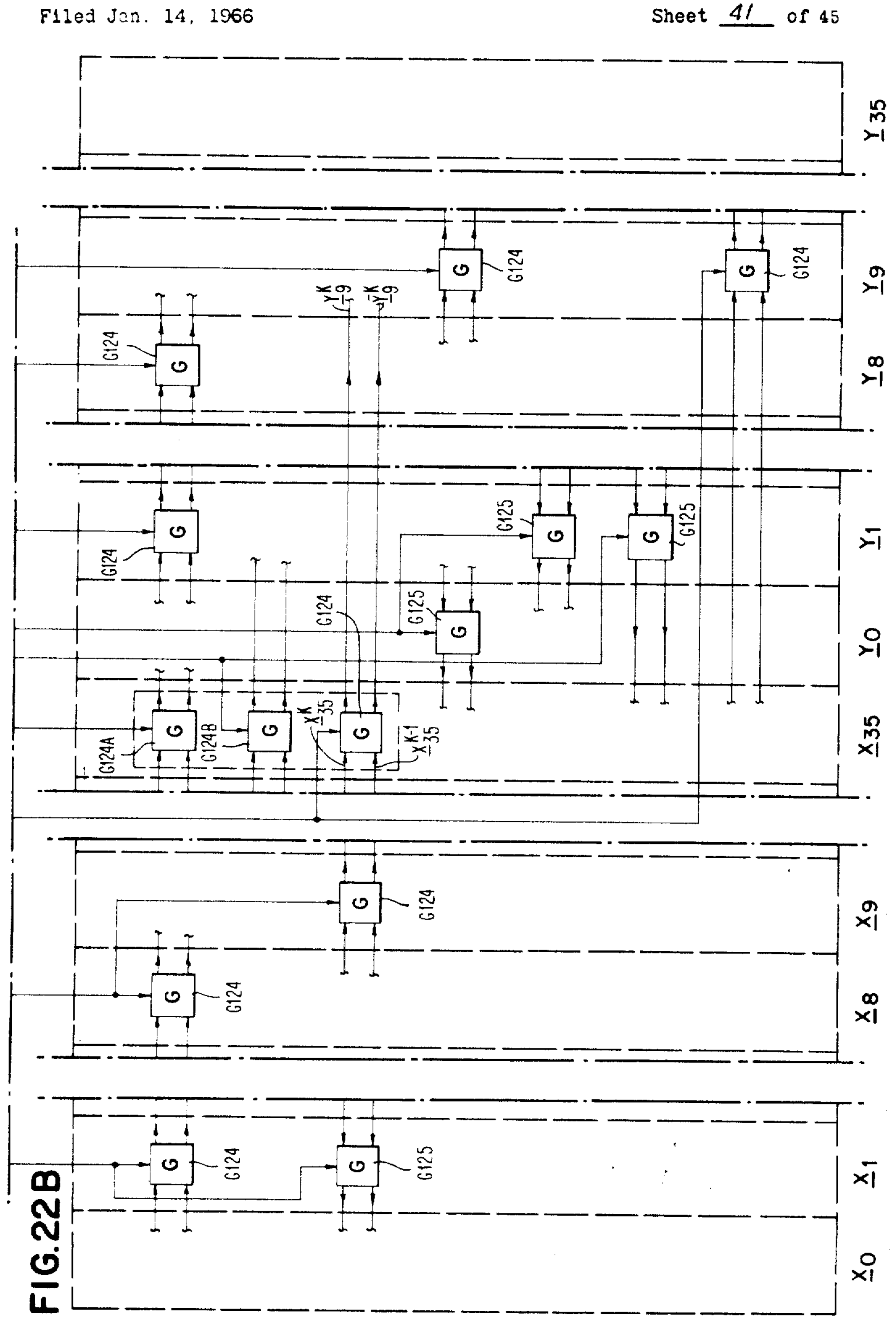

FIGURES 22 through 22*b* comprise a logical schematic diagram showing the interconnection of the Shift Left and Shift Right gates.

Figures 23, 23A:
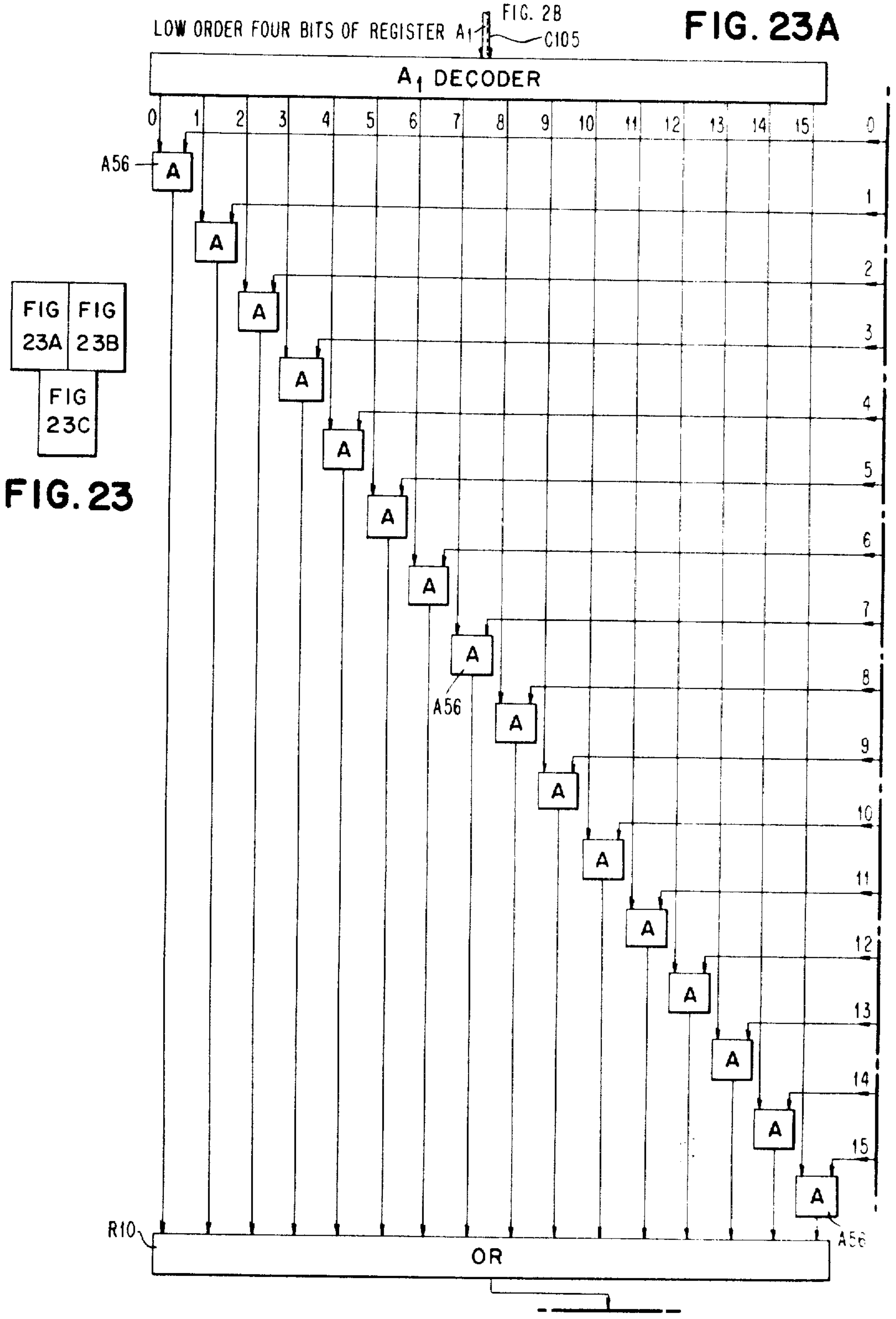
Figure 23B:
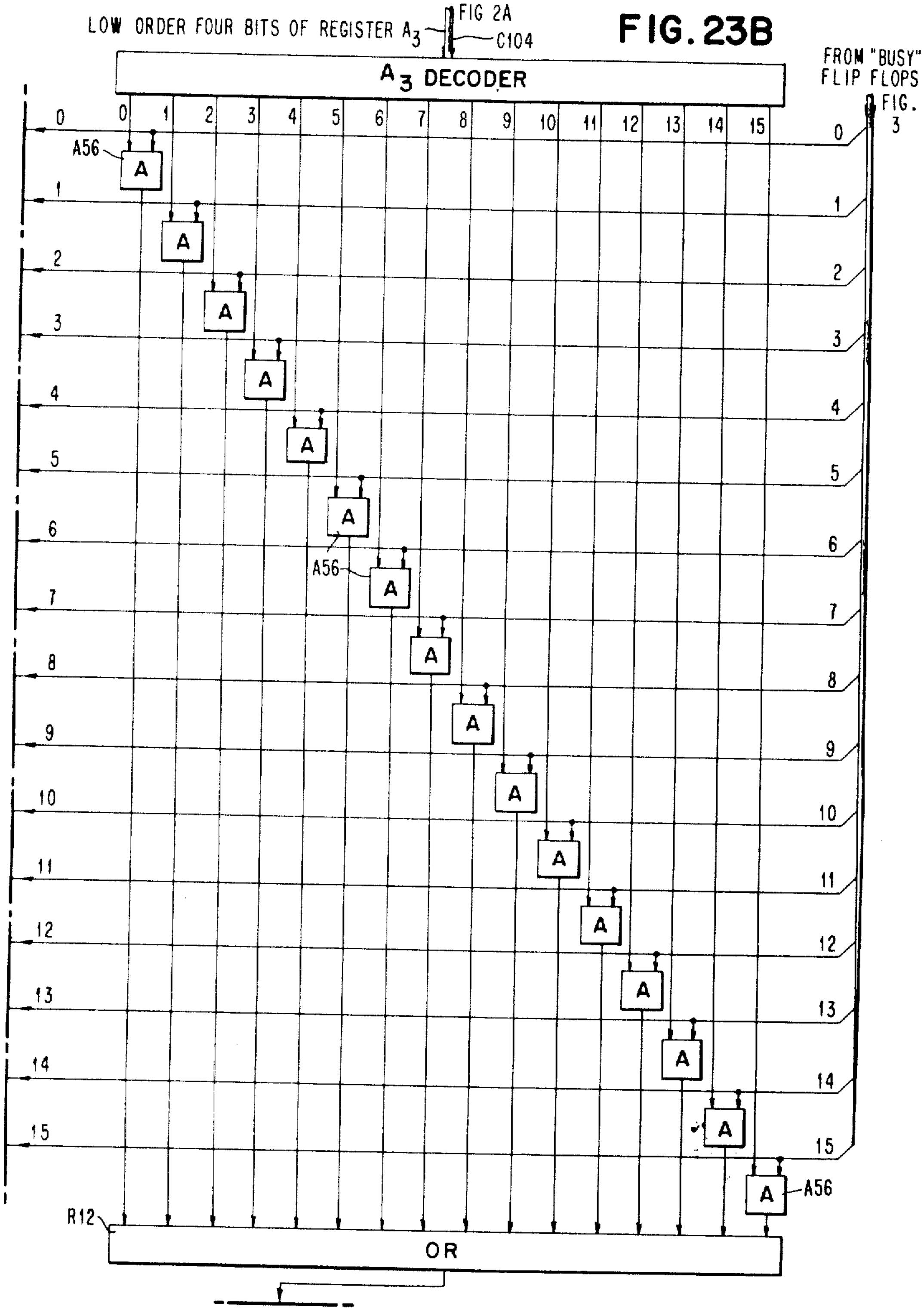
Figure 23C:
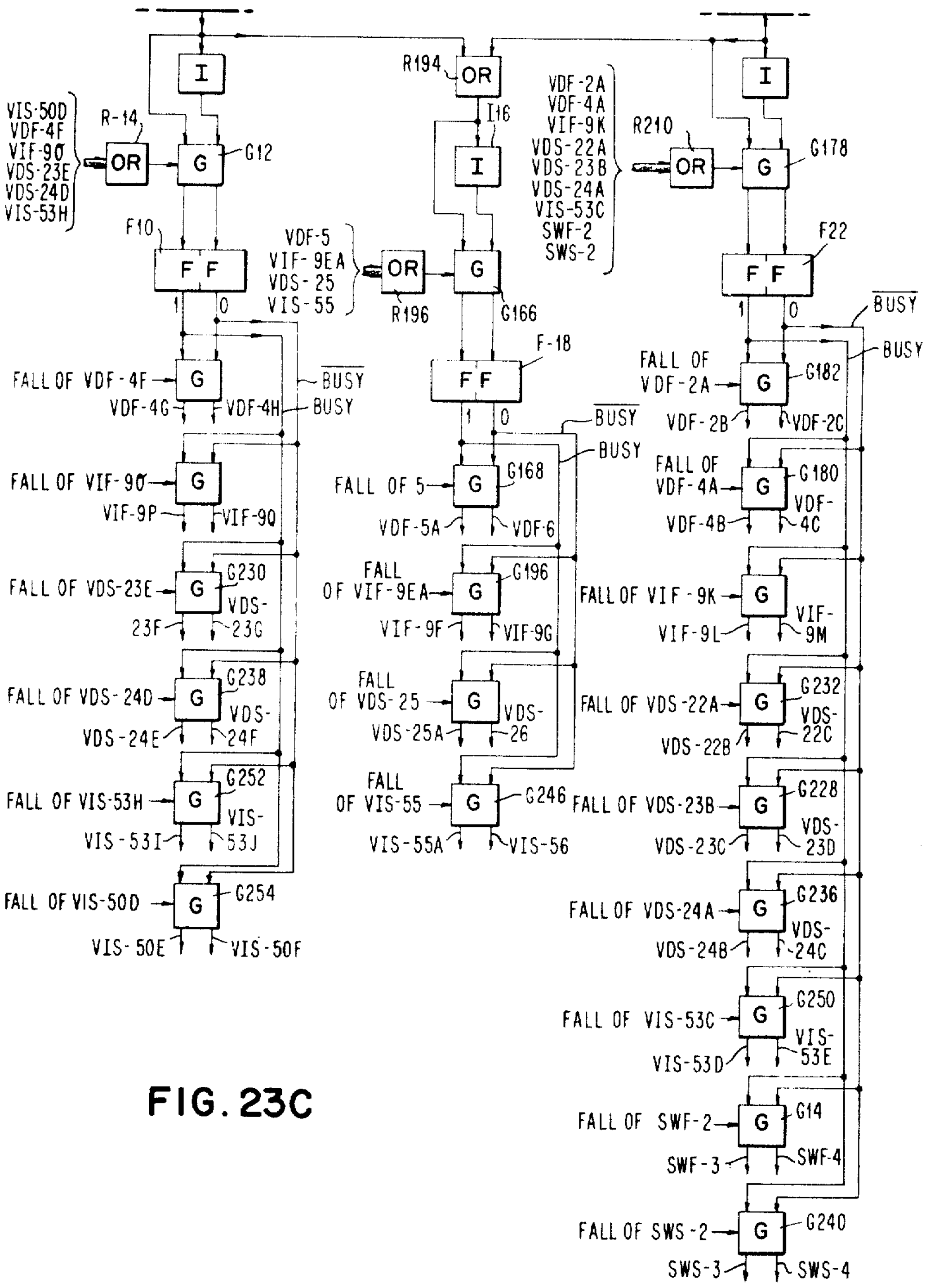

FIGURES 23 through 23*c* comprise a logical schematic diagram of the Test for Busy controls wherein the "busy" condition of any address Memory Box may be determined.

Figure 24:
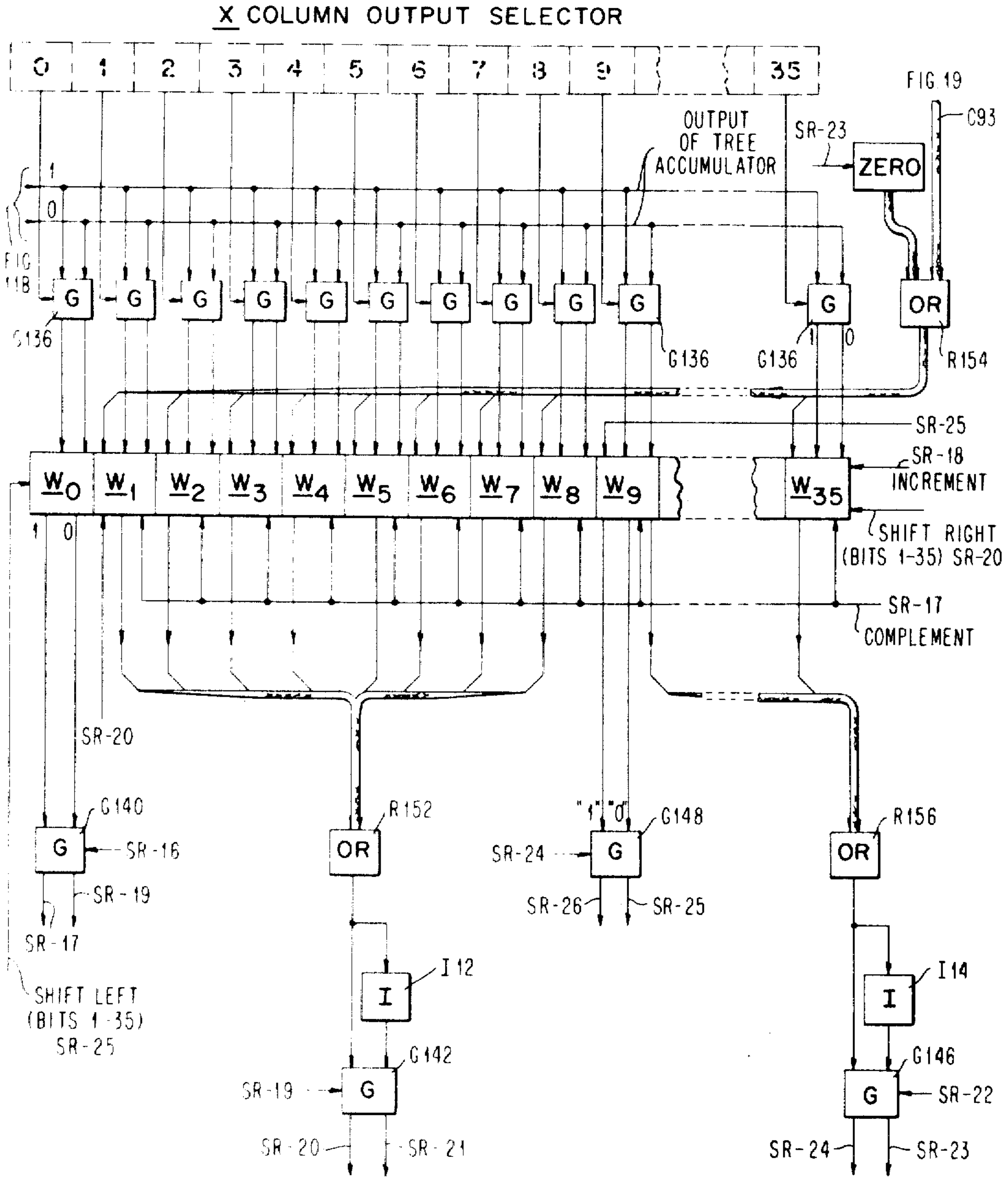

FIGURE 24 is a logical schematic diagram of the w Register and its associated Input and Output controls.

The objects of the present invention are accomplished in general by specialized circuitry and controls for use with a vector arithmetic multiprocessor computing system, said circuitry and controls including means for restructuring or reorganizing a plurality of data words stored in a plurality of storage registers in a word-parallel bit-serial fashion.

SECTION 2

*Introduction to system*

In spite of recent advances in computer speeds, there are still problems which make even greater demands on computer capabilities. Typical of such problems is the previously enumerated one of global weather prediction. This type of problem with its demand for increased speed in processing large arrays of data illustrates the applicability of a computer designed specifically for array or vector processing.

When arrays of data are being handled, it is necessary to perform the same calculations on each piece of data. This kind of problem is suited to a machine with multiple identical arithmetic units each executing the same instruction since each arithmetic unit can be carrying on the same task on different parts or members of the array. The industry is fast approaching the physical limit in speed for computer arithmetic units. In the system disclosed in the above-identified copending application, a number of arithmetic units are operated in parallel to increase the amount of work done per unit of time. The speed and number of these units is selected to suit the economics of the case and the logical characteristics of the problem. Since the parallel arithmetic units are all doing the same task, a single control unit suffices. For example, one load instruction causes all arithmetic units to load their separate accumulators each from a different part of the array. Control is provided to inhibit some of the arithmetic units when exceptional conditions are being handled by the others, or when the number of pieces of data to be processed is smaller than the total number of arithmetic units available. A suitable paralleling of separate memory units is also provided to yield data at the rate required by the arithmetic units.

The cost and speed of such an array processing computer depends on the speed of the memories and the circuitry used, and also on the number of arithmetic units provided. Speed can be characterized by the maximum rate at which bits can be brought from the memories and processed. It is presently believed that higher bit rates at proportionately lower costs are possible with given types of hardware by using the array processing approach rather than the conventional types of organization.

Such a system is primarily designed to be capable of performing the specific class of problems encountered when performing vector arithmetic. As stated previously, with such problems a plurality of computations must be performed on a plurality of numbers simultaneously wherein the numbers themselves may or may not be different but in which the particular mathematical operation performed is always the same in the vector. Additionally, the multiword results of such multiple computations must be capable of having a number of special operations performed on same in an essentially parallel fashion to most fully realize the inherent advantages of such a system organization. A number of these operations will be enumerated subsequently. Common types of such operation are to sum all of the results of the individual computations, to search for the largest and to search for the smallest member of said multiword results.

The vector arithmetic system comprises a powerful and versatile multiprocessor capable of the programmed solution of mathematical problems, specifically of a vector or closely related type. Such problems have conventionally required many orders of magnitude longer for solution in currently existing systems. It should be understood that while such a system is specifically designed and suited for the solving of vector arithmetic problems it is obviously not limited to such an area and other general types of problems capable of parallel performance can equally well be solved in an optimized manner by such a system providing data is stored in the system in an organization to take advantage of the multiaccessing and multiprocessing characteristics of such system.

It is not possible to reasonably describe all possible operations of the word-parallel bit-serial nature as anticipated by the present invention. However, the three illustrated operations, Search for Largest, Search for Smallest, and Sum Reduction, are considered exemplary of both the searching and arithmetic type of operation as anticipated by the invention. It will be appreciated that, with such a vector arithmetic processor as generally disclosed in the present application and described in detail in the previously referenced copending application, after any given arithmetic vector operation a plurality of results will be obtained. Subsequent to obtaining these results it is often desired to perform special searching operations on a vector such as a Search for Largest or Smallest or, alternatively, to group all or selected members of said vector into a single sum as is required by many well known mathematical operations conventionally performed on electronic computers. Conventional systems would perform these operations taking two members of the vector at a time and arriving at certain subanswers and subsequently rippling through the various subanswers until a final answer is obtained. This is true for both searching and arithmetic operations performed on the vector. It is the purpose of the present invention to perform such operations completely in parallel with a considerable saving in time but utilizing serial operation within the words in order to avoid undesirably large quantities of hardware. However, it should be understood that the basic principles of the invention are not limited specifically to a vector arithmetic processing system as set forth in the overall disclosed embodiment in the copending application but that the special hardware disclosed and described herein could be utilized as a special adjunct to any existing computer system providing a special multiword parallely accessible storage register were provided for storing the multiword vector which it is desired to process in parallel.

The system instructions and the method of handling these instructions are largely conventional and would be the same as used with any other large scale computer such as the I.B.M. 7090. This is to say, instruction words are accessed on command from a designated portion of memory, placed in the Instruction Register and decoded. Obviously, the specific instructions will be somewhat different due to the character of the novel operations capable of performance in the present system. Some typical examples of system instructions envisioned by the present system will be included in Section 4 entitled, Instruction Word Format. However, other than the use of specific instructions and specific information included with these instructions, as is necessitated by the present system operations, the instruction sequencing and control is conventional.

The Addressing scheme for the disclosed overall system embodiment is conventional insofar as obtaining single pieces of data from memory such as instruction words is concerned. In this case a specific address will either be given or derived directly from the Instruction Counter and the data placed in the Instruction Register from which the particular system command will be decoded. However, the Addressing scheme for obtaining data from the memory for actual processing of an array in the plurality of Arithmetic Units is quite unconventional. According to the specifically disclosed embodiment, provision is made for generating addresses two at a time until sixteen addresses are automatically generated from which sixteen memory areas may be addressed and the data withdrawn whereby all sixteen of the separate Arithmetic Units will be rapidly provided with operands. Also in the disclosed embodiment, sixteen separate Memory Boxes are disclosed and in the preferred mode of operation of the system data would be organized in memory so that there would be no address conflicts and, thus, the system would be allowed to operate at maximum speed. However, provision is made in the controls for the situation where memory conflicts do occur and where necessary, the accessing of data at the first address of any given Memory Box will be completed before the addressing of data at a second memory location in the same Memory Box is started. It will be apparent that this Addressing scheme may be modified so that 4, 8 or even 16 addresses could be generated essentially simultaneously if it were desired to provide the necessary circuitry and controls to achieve this operation. It should be clearly understood that the present system may apply to any number N Arithmetic Units and the present embodiment utilizes the condition $N=16$ for purposes of example only. It should be clearly understood that the particular address generating scheme and memory accessing are incidental to the present invention and for details of these operations reference should be made to the copending application as a complete description of these operations herein would only serve to obscure the present invention.

The type of operations with which the present invention is primarily concerned are multiword-parallel operations including the operations, Search for Largest, Search for Smallest, and Sum Reduction, which are specifically described herein and other closely related derivative operations generally described subsequently.

The Search for Smallest comprises a search of up to seventeen numbers in a vector stored at any one time in the Storage Registers for the smallest number. And once found, this number is transferred into a special Holding Register.

The Search for Largest operation is substantially the same as the Search for Smallest except that in the vector of up to seventeen numbers or data words, this time the largest number is to be selected and subsequently transferred into the Holding Register.

The Sum Reduction operation is one wherein up to seventeen numbers stored in the Storage Registers may be concurrently added together to produce a single sum, which sum may conveniently be transferred to the above mentioned Holding Register.

It should also be noted at this point that the Search for Smallest operation, the Search for Largest operation, and the Sum Reduction operation may all be performed under control of a screen or mask word whereby only selected members of the up to seventeen numbers currently set in the Storage Registers will be considered in the operation being performed. Thus, if the numbers 1, 5, 15, and 20 were currently stored in the Storage Registers, it would be possible to merely compare between the numbers 1 and 5 to select the largest or smallest rather than look at all four. Similarly, if it were desired to sum certain of these numbers, again the numbers 1 and 5 could be summed and by appropriate control, the numbers 10 and 15 would not be considered in the operation. Again, this control feature will be apparent from the following general description of these operations and also, in the detailed description of the operation of the system in Section 7.

As will be apparent from the subsequent description, all of these operations are performed word-parallel bit-serial. In other words, special circuitry and controls are provided which allow all of the selected (by mask) words of the vector of data words to be processed in parallel a bit at a time.

SECTION 3

*Multiword parallel vector operations*

Sum Reduction
Search for Largest
Search for Smallest

The following general descriptions of the special machine operations which will be described more fully subsequently utilize a number of tables which it is believed will materially aid in an understanding of the particular operation involved as well as generally describe the function of a number of the system registers.

SUM REDUCTION OPERATION

A Sum Reduction operation is one wherein selected operands stored in the X Register are taken out and added together to form a single result or number which is subsequently stored in the w Register. Again it will be remembered that an actual binary number or data word is stored in each row of the X Register and a control word having a bit position corresponding to each row of the X Register is provided which control word comprises a binary number made up of a series of "1's" and "0's." The control word is stored in the s Register and this register and the contents of the X Register are illustrated in Table I.

When the Sum Reduction operation command is given together with a binary control word to be stored in the s Register, it implies that those data words stored in the X Register are to be totalized wherever a "1" appears in the associated bit position of the s Register. Thus, in the example shown in Table I, the binary numbers shown in the s Register indicate that the numbers 1, 3, 4, 6, and 7 are to be totalized, thus producing the number 21 which is in turn stored in the *w* Register.

TABLE I.—SUM REDUCTION

| Row of X Register | Register contents | |
|---|---|---|
| | s | X |
| 1 | 1 | 1 |
| 2 | 0 | 2 |
| 3 | 1 | 3 |
| 4 | 1 | 4 w=21 |
| 5 | 0 | 5 |
| 6 | 1 | 6 |
| 7 | 1 | 7 |
| 8 | 0 | 8 |

The Floating Sum Reduction as described subsequently in the specification is a special case of the Sum Reduction operation and differs therefrom in that the members of the multiword vector are assumed to have different exponents, i.e., nonaligned radix points. Therefore, before the vector can be added, i.e., summed, the radix points must be aligned. As will be seen subsequently, this operation is accomplished during the FSR clock sequence.

SEARCH FOR LARGEST

This operation while very closely related to the Restructuring operations previously described is somewhat different in that it actually requires a search by a special searching circuit for the largest member of a group of numbers. Again, the numbers or data words involved are stored in the sixteen rows of the X Register associated with each of the sixteen Arithmetic units. Depending upon the contents of the s Register which appears as a binary control word, certain of these numbers will be compared and the largest number will be transferred to the w Register. In this operation only those numbers in the X Register whose corresponding bit position in the s Register contains a "1" are considered or compared. Thus, in Table II with the contents of the s Register and X Register as shown, the numbers 2, 3, 5, 4 and a second 3 are examined and obviously the number 5 is the largest which number will be placed in the w Register. In this example it will be noted that the numbers 1, 9, and 1 stored in the first, fourth, and eighth rows of the X Register were not included in the comparison.

TABLE II.—SEARCH FOR LARGEST

| Row of X Register | Register contents s | Register contents X |
|---|---|---|
| 1 | 0 | 1 |
| 2 | 1 | 2 |
| 3 | 1 | 3 |
| 4 | 0 | 9 |
| 5 | 1 | 5 |
| 6 | 1 | 4 w=5 |
| 7 | 1 | 3 |
| 8 | 0 | 1 |

SEARCH FOR SMALLEST

This operation is almost identical to the previously described Search for Largest operation with the exception that instead of the largest number of a particular group of numbers in the X Register, the smallest number of this group is searched for. Thus, again assuming the contents of the s and X Registers to be as shown in Table III, the the number 2 would be selected by the system and placed in the w Register. Again the numbers 2, 3, 5, 4, and 3 are being examined by the system since for these numbers the binary number "1" appears in the corresponding control word bit position stored in the s Register.

TABLE III.—SEARCH FOR SMALLEST

| Row of X Register | Register contents s | Register contents X |
|---|---|---|
| 1 | 0 | 1 |
| 2 | 1 | 2 |
| 3 | 1 | 3 |
| 4 | 0 | 9 w=2 |
| 5 | 1 | 5 |
| 6 | 1 | 4 |
| 7 | 1 | 3 |
| 8 | 0 | 1 |

It should be reiterated here that in all of the above descriptions of the Restructuring and Searching operations possible with the present system, the number of Arithmetic Units indicated in the Tables I through III, i.e., eight, are meant to be exemplary only and in no way limiting on the system. In actuality all of the subsequent description of the system will assume that there are sixteen Arithmetic Units and, thus, sixteen separate X Registers which when combined comprise the X Vector Register. It should further be noted that the number sixteen is merely a convenient number which was chosen to be shown with the present embodiment and is not intended to be in any way limiting on the system and that every time the number sixteen is used in the present example, the symbol N could be used to speak of the more general case.

Further, it should be remembered that the X Register as well as the w Register are actual multibit registers capable of storing, for example, a 36 binary bit number. Here again the assumed number of bits for a particular number is also arbitrary and for purposes of the present invention was considered to give a sufficient degree of accuracy for performing most scientific problems. However, it will be evident that either a greater or smaller number of bits could equally well be used without affecting the basic concepts and system design.

As stated, the individual rows of the X Register making up the X Register are utilized to store multibit numbers as is the w Register; however, the u Register and the s Register are bit registers having a binary bit position capable of storing a "1" or a "0" for each X Register row or conversely stated, for each Arithmetic Unit in the system. In the embodiment shown, these registers have sixteen bit positions (seventeen in some cases) although in the Tables I through III only eight such positions are actually shown. The storing of the "1's" and "0's" in these registers affect the gating of information and subsequent branching in a manner that will be apparent from the following subsequent detailed description of the system with reference to the logical schematic diagrams shown in the drawings and the Timing Sequence Charts which are provided for all of these operations and which specify the specific system operations performed by various timing stages.

SECTION 4

*Instruction word format*

This section describes the data and instruction word format in terms of word length and content, wherein the number of Arithmetic Units and Memory Boxes is assumed to be 16.

The word length chosen is 36 bits. The number representation is the same as the IBM 7090 General Purpose Computer; fixed pointed is binary sign and magnitude; the floating point fraction is binary, sign and magnitude; the exponent is excess 128. (—1.0, 0, 1.0 are represented in octal by 601400000000, 000 000 000 000, and 201400 000 000, respectively.

The instructions are basically 1 address although a number of index modify instructions refer to two Index Registers. The data and instruction formats are shown in the diagram below.

Data format

| 0,1 | 8,9 | | | 35 | Bit Positions |
|---|---|---|---|---|---|
| SGN | Exponent | Fraction | | | Floating Point Word |
| SGN | | | | | Fixed Point Word |
| | | | | | Index/Address |
| | | | | | Logical |
| 1 | 8 | 9 | 2 | 16 | No. of Bits |

Instruction formats

| 0 | | 11, | 14, | 17, 18 | 35 | Bit Positions |
|---|---|---|---|---|---|---|
| OP | | | F | I1 | Address | Scalar |
| OP | | I2 | F | I1 | Address | Vector |
| OP | I3 | I2 | F | I1 | Address | Index/Transfer |
| 4 | 4 | 4 | 2 | 4 | 18 | No. of Bits |

The described embodiment has 15 Index Registers. The I1, I2 and I3 fields of the instruction formats refer to one of these registers or, if the field is 0000, to an implicit register that contains an unmodifiable zero. The bit combination in the field I1 selects the Index Register to be used in modifying the Address field. The instruction is then executed as if its address field contained the stated address plus the contents of the Index Register.

Vector instructions, i.e., those that do 16 operations simultaneously, use the effective base address as the address of the first operand. The address of the second operand is determined by adding the contents of the Index Register specified by field I2 to the effective base address. Letting $\underline{a}_0$ represent the effective base address and $i_2$ the contents of the Index Register address by I2, the address vector $a$ is of dimension 16 and the components are $(\underline{a}, 0, \underline{a}_0+i_2, \ldots, \underline{a}_0+15*i_2)$. All values $0\ i_2\ 2^{18}$ are valid.

The instruction set for the present system has been designed for the processing of vectors in memory, including rows and columns of matrices. These will normally have considerably more components than the number of Arithmetic Units. System operations such as Search for Smallest, Search for the Largest and Sum Reduction (sum of all components) must operate over the entire vector even though only 16 are handled at any one time. The instruction set is designed around this concept.

A typical list of instructions is given in the previously identified copending application.

SECTION 5

*General description of drawings*

In the following description where a plurality of individual sheets make up a single figure only a single number will be used in referring to this figure. Thus, FIGURES 2 through 2*d* comprising a single logical schematic diagram will be referred to simply as FIGURE 2.

It will be further noted that various portions of the drawings are referred to and explained in this section although they are not necessary to the actual functions performed in accordance with the present invention. These elements are shown and explained generally in the present application to set forth the overall operations of the complete system and thus describe the system environment for the operations set forth and claimed herein. For a more detailed description of the complete system, reference should be made to the previously referenced copending application. Also, certain clock steps are shown entering various logic blocks such as AND gates and OR gates which are not explained, however, the function and operation of those clock steps may also be determined from said copending application. Thus, the present description does not go into the various address generation, memory accessing and actual vector arithmetic operations which the overall system is capable of performing.

FIGURE 1

This figure is a logical schematic diagram showing the Z Register. It will be noted referring to the figure that this register is broken into 16 different storage positions, each of which is capable of storing a complete array word. This Register is used primarily as an input and output buffer store for Store and Fetch operations from the 16 separate Memory Boxes. The Z Register is divided into two sections indicated as the Odd Numbered and the Even Numbered section. Each section has its own Input Ring and Output Ring which are controllable separately. The Z Register is broken into the two indicated sections in order that the Memory Boxes may be accessed two at a time, said access including both Storage and Readout operations. This particular organization of the Z Registers is closely related with the Address Generating system for the present disclosure, since addresses are generated two at a time and provision made for addressing memory two Memory Boxes at a time. The various OR gates and other gates perform in a completely conventional manner. The operation of each is specifically set forth in detail in the subsequent description of the Timing Sequence Charts.

FIGURE 1A

Figure 3:
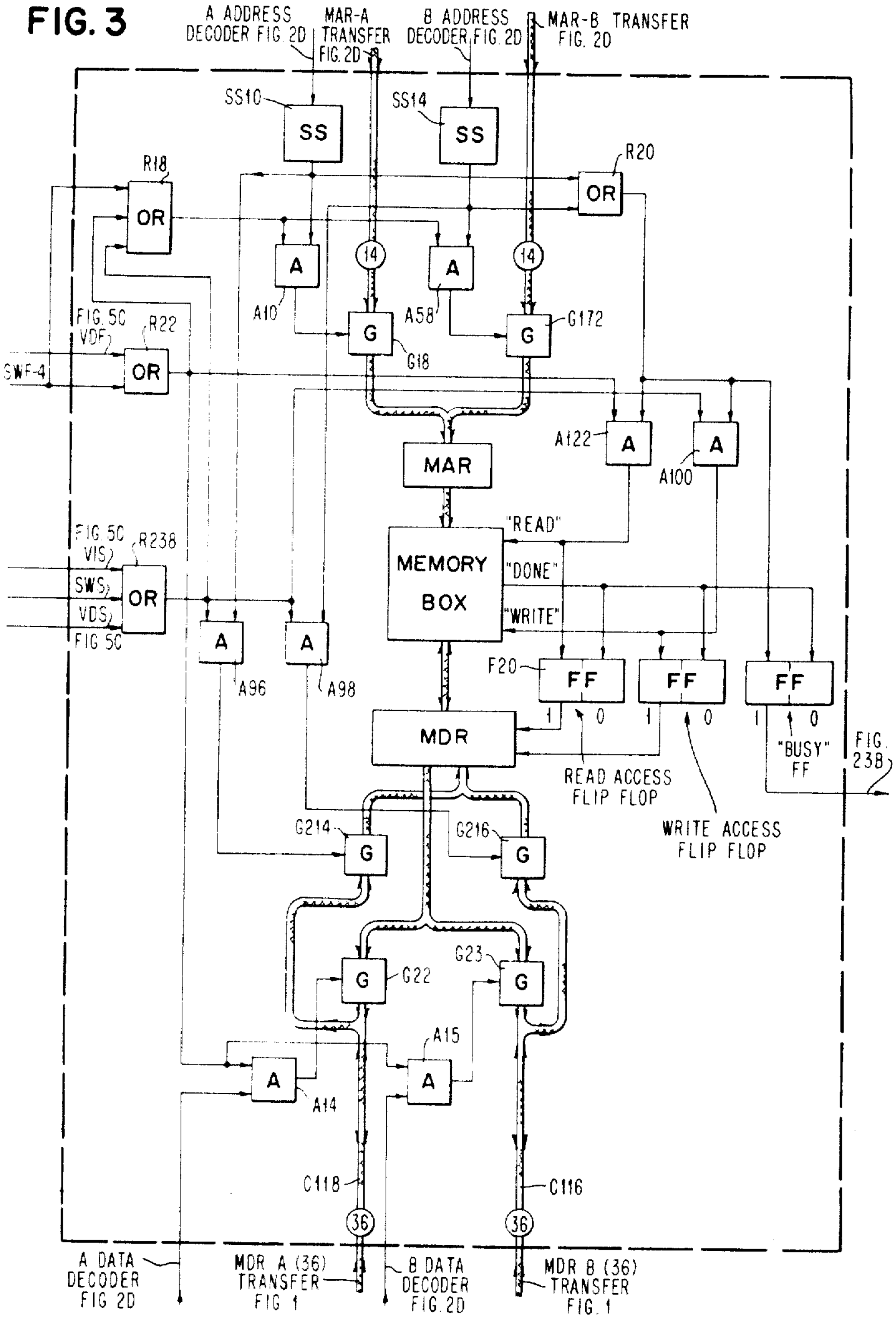
FIGURE 3 is a logical schematic diagram of the individual Memory Box controls necessary in performing the disclosed operations in the present system.
Figure 4:
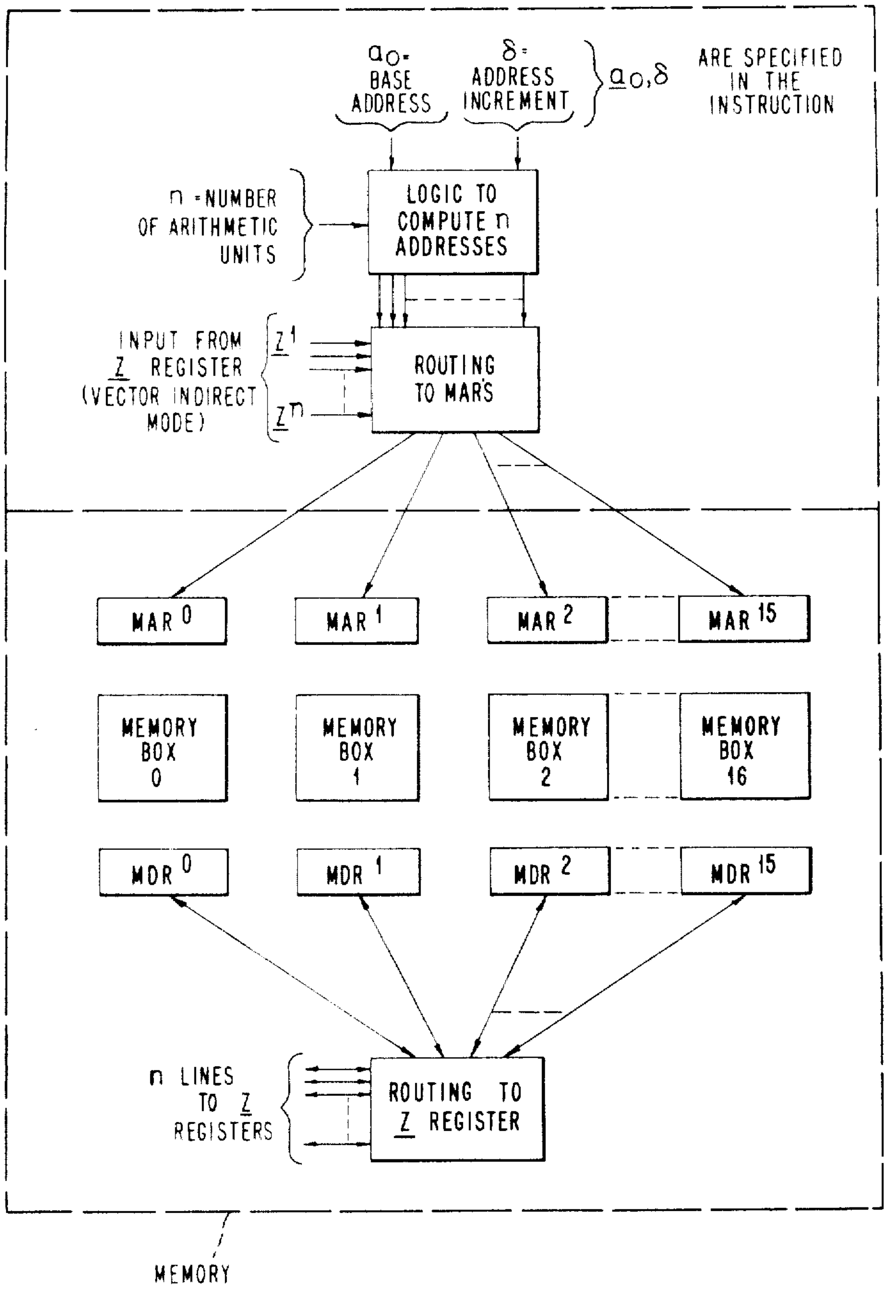
FIGURE 4 is a functional block diagram illustrating the manner in which addresses are generated according to the teachings of the present invention.

This figure is a basic block diagram setting forth the primary functional components of the present system. Referring to the figure it will be noted that there are four primary boxes. The box labeled Memory refers to that portion of the system including the 16 separate Memory Boxes and the associated controls immediately associated with each Memory Box such as is illustrated in FIGURE 3.

Figures 2, 2A:
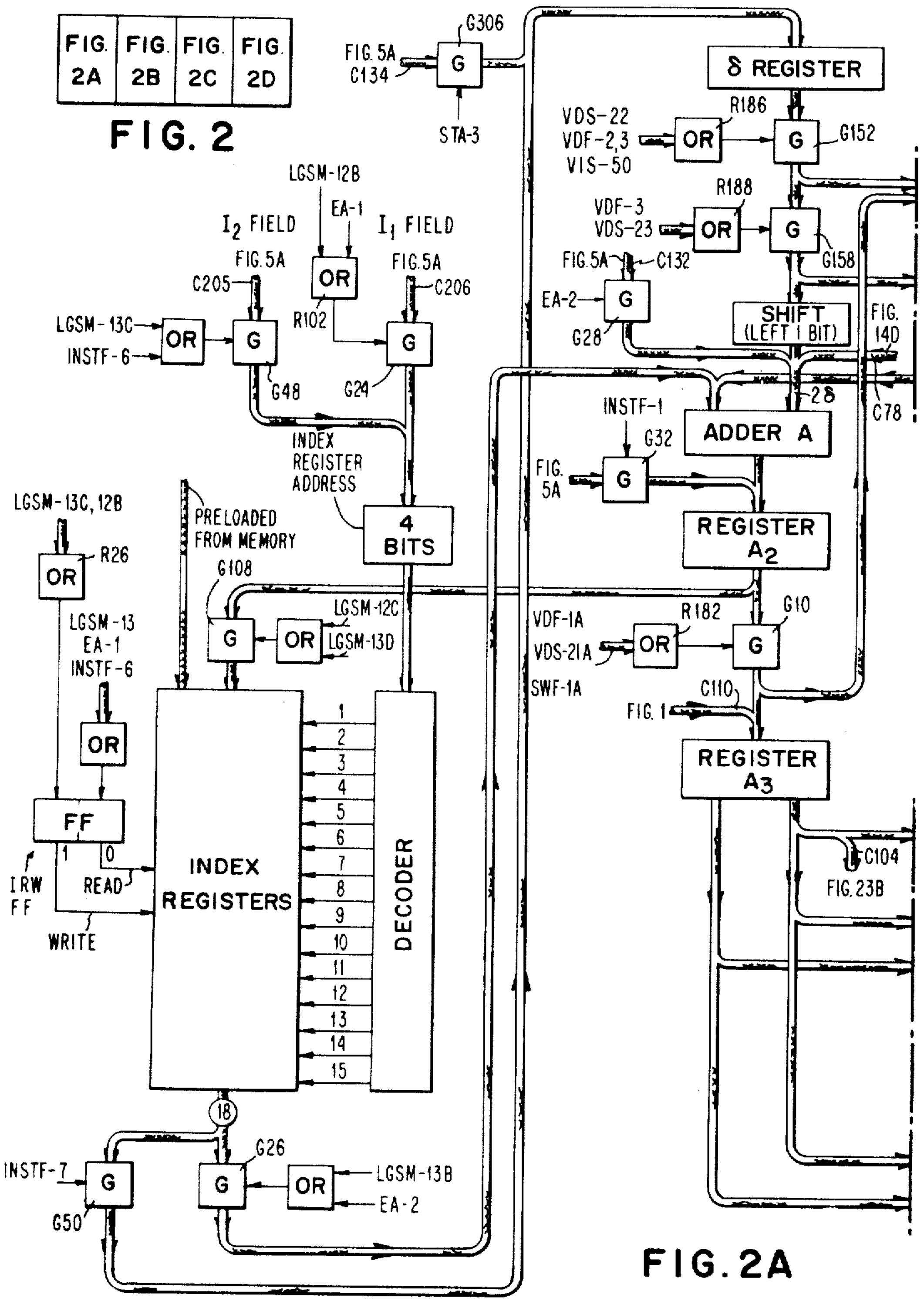
Figure 2B:
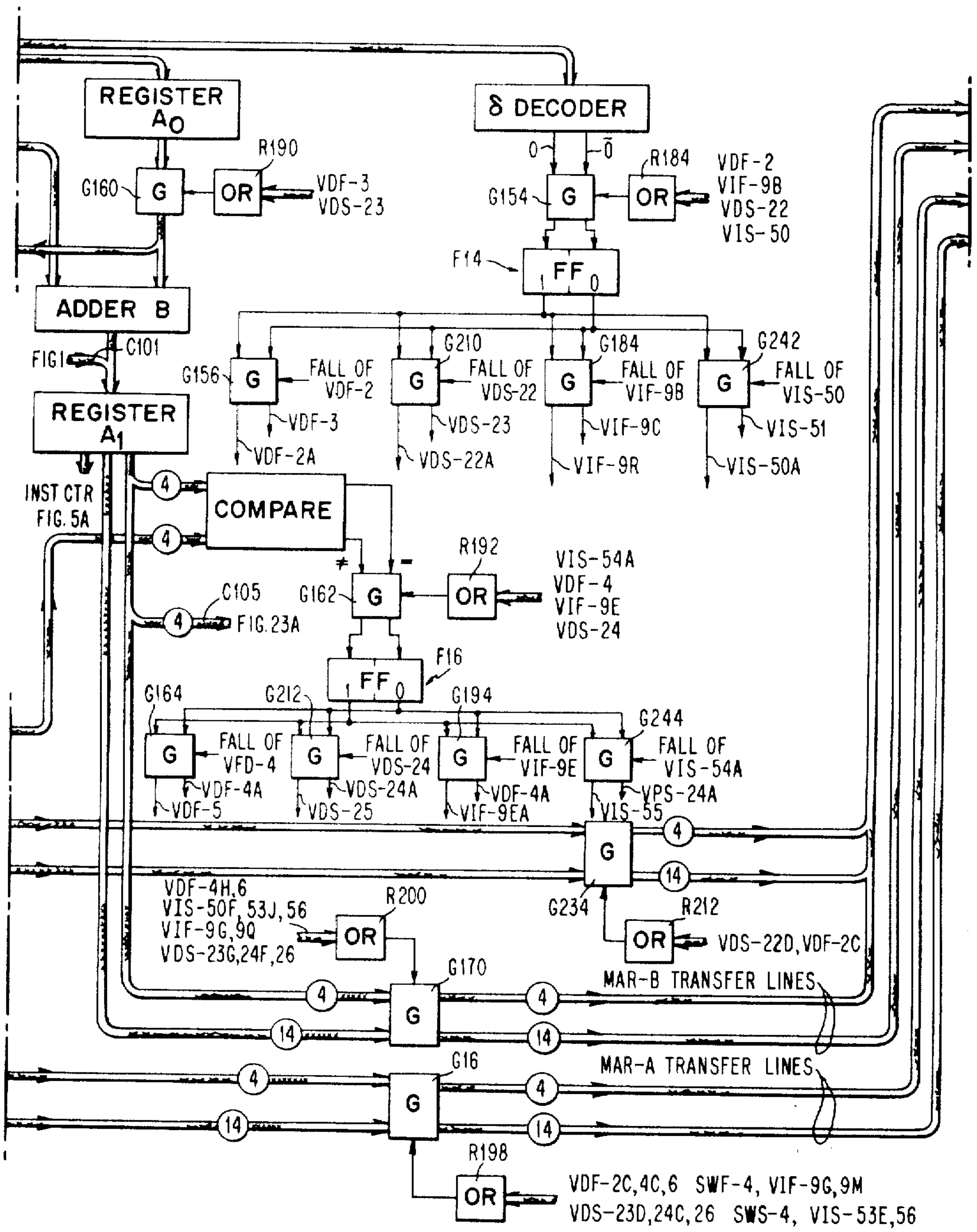

Closely associated with the Memory is the block labeled Index and Address Unit. This block in essence performs the function of generating 16 addresses where such instruction is called for from a base address and increment ($\delta$). This section does control the addressing of the Memory Boxes on Direct Addressing operations, Indirect operations, Signal Word operations as well as the accessing of new instruction words. The majority of controls indicated in this particular block are shown in FIGURE 2 which includes FIGURES 2A through 2D.

The block marked Mill represents the 16 separate Arithmetic Units and their associated controls for actually performing desired arithmetic operations such as add and multiply, divide, etc. It further includes the controls for performing the relatively complex Floating Point operations.

The block designated Data Restructuring Arithmetic Unit Control includes those controls necessary for performing the various Data Restructuring operations such as Expand, Compress, Search for Largest and Smallest, Sum Reduction and the Multiple Shift of the vector of up to 17 numbers which may be stored at any time in the X, Y and W Registers. As will be explained subsequently, the Y Register is included since this register would be utilized for double precision work.

FIGURE 1B

This figure represents the functional units for a single section of the Mill. As will be noted, an Adder and a single row position of each of the X, Y and Z Registers are shown. This section of these registers indicates the particular row of said registers related with the particular Arithmetic Unit of the Mill. Thus, for example, if a particular Adder were that of the 8th Arithmetic Unit, this Arithmetic Unit is automatically connected to the eighth row of the X, Y and Z Registers.

Figure 1:
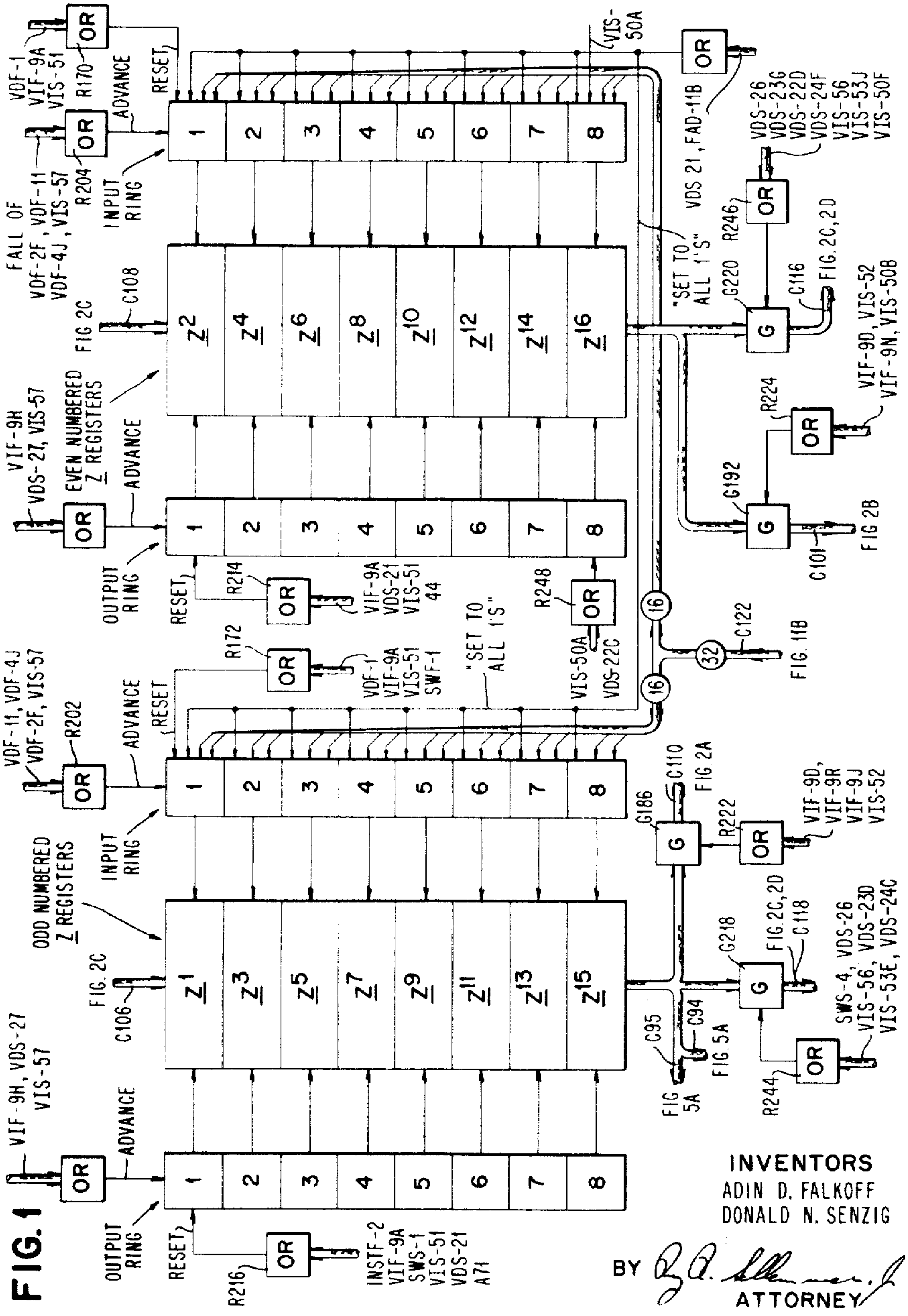
Figure 1A:
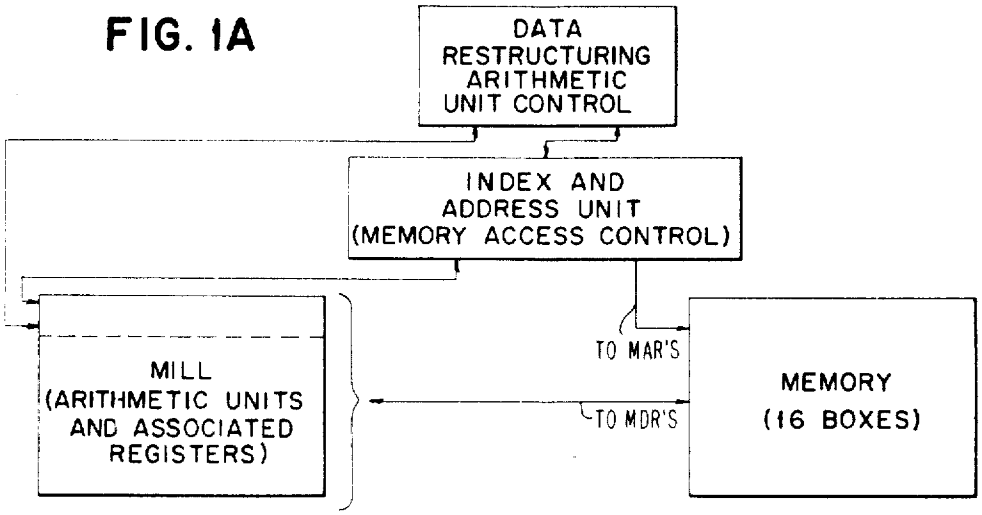
Figure 1B:
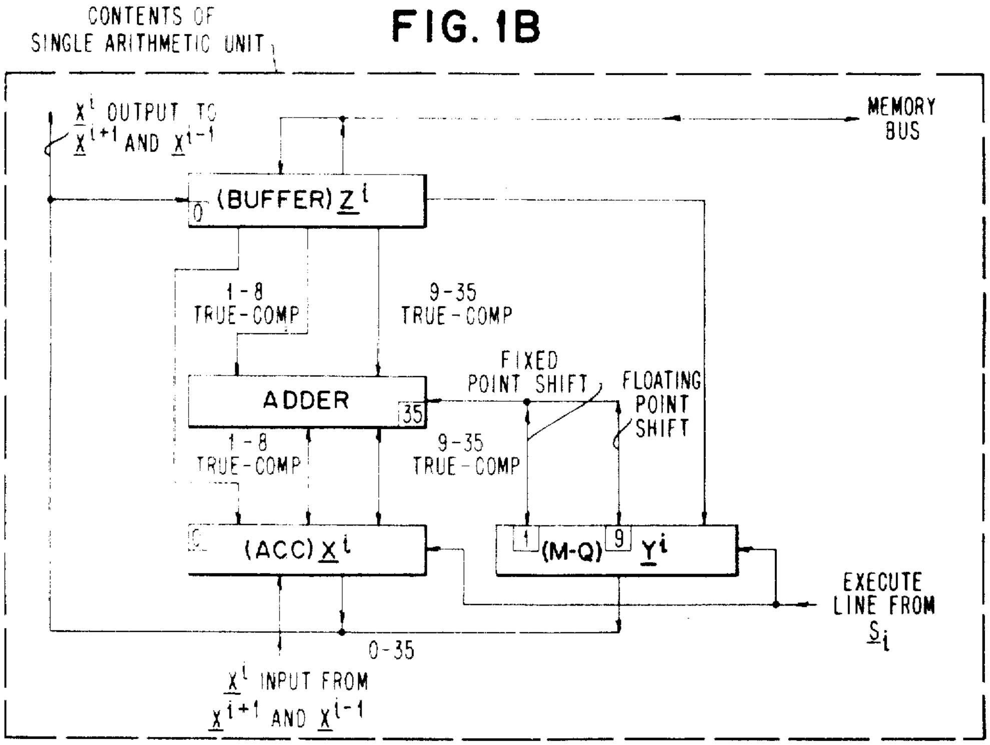

The flow chart in FIGURE 1B is intended to generally illustrate the manner in which a Floating Point Addition is carried out. Referring to the figure, the three Registers X, Y and Z perform the approximate functions of an Accumulator, Multiplier-Quotient, and Storage Register respectively. Within each Arithmetic Unit the actual processing is done in parallel in all bits in the registers. The number of bits per word is immaterial to the present discussion but a typical number utilized in the present embodiment is 36 bits. The X Register as the Accumulator receives the results of most arithmetic operations, i.e., from the Adder. The Y Register serves as a Multiplier-Quotient Register and holds the multiplier in multiplication and the quotient in division. The Z Register in the present embodiment is not program addressable and serves mainly as a buffer between Memory and the X and Y Registers. The first word position of the Z Register, i.e., $Z^1$ also serves as a buffer between Memory and the p, v, s and u Registers whose function will likewise be described subsequently. An instruction for loading the X or Y Registers normally transfers words from memory into the Z Registers. The words are then transferred into the X or Y Registers from the Z Registers.

In arithmetic instructions using operands from memory, the instruction results in $n$ operands being fetched into the Z Register. For an add instruction the numbers in the Z and X Registers are added and the sum placed back in X Register. For a multiply, the number placed in Z Register is the multiplicand, the multiplier is in the Y Register as a result of the previous operation. The double length product is formed and placed in the combination of the X and Y Registers with the most significant half in the X Register.

Referring specifically to FIGURE 1B, it will be noted that there are certain Transfer lines shown between the X, Y and Z Registers and the Adder. It will be noted that these are marked 1 through 8 true-complement and 9 through 35 true-complement. This indicates that the various bit positions of the registers may be handled separately. The bit positions 1–8 are those positions containing the exponent and bit positions 9–35 contain the fraction. It being noted that the bit position zero, i.e., $X_0^i$ determines the sign of the number. This is the well known normalized binary format. It should be further noted that the Transfer lines are indicated as being capable of transferring a true or a complement number from the Register to the Adder. This is in order that addition, subtraction, multiplication and division may be more readily performed by the Unit. To this end a true or a complement will be transferred upon certain instructions depending on the particular type of Arithmetic operation being performed.

It will be noted referring to the Transfer lines shown adjacent to the Y Register that the lines are denoted as the Fixed Point Shift and the Floating Point Shift. It will be noted that the Fixed Point Shift enters the Y Register at bit position 1. This is because with the Fixed Point operation it is not necessary to utilize positions 1 through 8 for exponent information as will be apparent from subsequent descriptions of the certain Floating Point operations and also the general description of arithmetic operations with the present system. The output lines shown as $X^i$ Output and Input indicate that the entire contents of the X Register for any $i^{th}$ position may be transferred to the next adjacent row of the register on command.

Figure 1C:
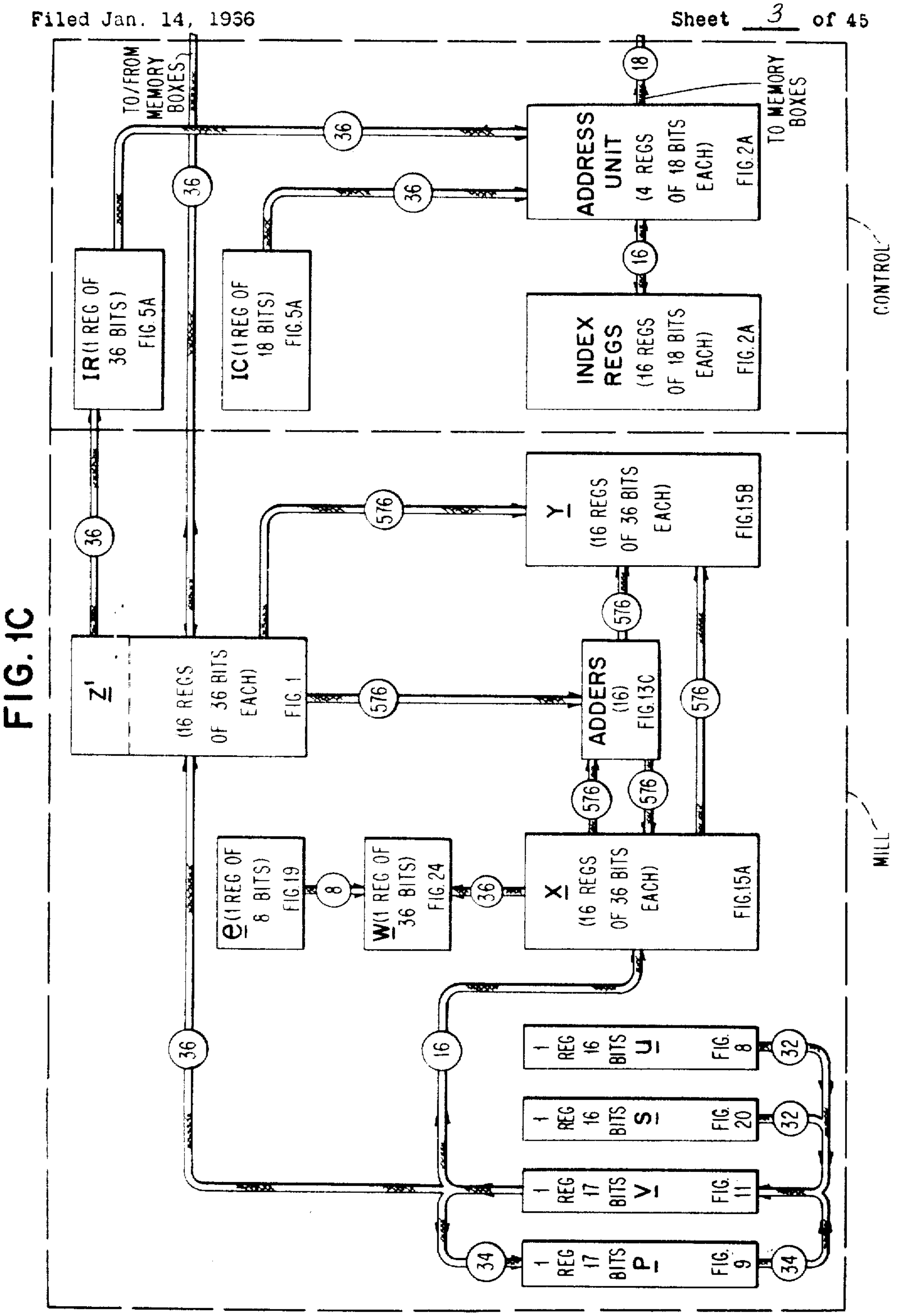

It will also be noted that FIGURE 1B illustrates an Arithmetic Unit and the Register word storage locations for only a single Arithmetic Unit of the Mill. It must be remembered that there are 16 of these units in the disclosed embodiment and that the memories are arranged so that all 16 rows of the X, Y and Z Registers are actually located physically adjacent one another as indicated more accurately in FIGURE 1C. However, all 16 of the individual Arithmetic Units and their associated X, Y and Z Register word storage locations operate and are associated in substantially the manner set forth above.

FIGURE 1C

This figure is a block diagram showing the functional inter-relationship of the Storage Registers other than the Main Memory utilized in the system both for the temporary storage of data per se and also for controlling certain system functions. Referring to the figure it will be noted that the X, Y and Z Registers are shown. These registers are the primary working Data Storage Registers in the system and serve, in essence, as the system working registers. As indicated in the drawing each of these three registers is capable of storing 16 complete data words of 36 bits each. The adders block indicates the 16 Arithmetic Units described previously. The blocks marked Index Registers and Address Unit are essentially Storage Registers shown on FIGURE 2 (2A through 2D). The Address Unit consists of the four A Registers which are utilized during the Address Generation routines.

The Index Registers are primarily utilized as will be described subsequently in the specification to modify instruction addresses.

The block marked IR and IC refer to the Instruction Register and Instruction Counter shown in FIGURE 5 (5A through 5C). These registers are quite conventional in large computing systems and are utilized to temporarily store an instruction and keep track of the location in memory of the instruction which is being executed at any given time. The operation of such Instruction Registers and Instruction Counters is well known and essentially conventional in the present system.

The w Register is a single 36 bit Data Register capable of storing one data word. It is used in a number of system functions such, for example, as Sum Reduction which will be described in detail subsequently where the result of the operation is a single number or piece of data and wherein it is not practicable to store same in either of the other three primary storage registers, i.e., X, Y and Z Registers.

The p, v, s and u Registers are single registers having N or $N+1$ bit storage locations wherein it will be remembered that N is the number of Arithmetic Units. In the presently disclosed embodiment, the number $N=16$ is utilized in describing the invention.

These four registers perform a number of control functions in the present system and depending upon how they are loaded, i.e., the binary bit pattern stored therein and control a number of specified operations which will be described in detail subsequently. The following is a general description of the function of these four registers insofar as it broadly describes how they are used. It should first be noted that these four registers are loaded through the $Z^1$ Register word position from memory upon appropriate instruction from the given instruction in the Instruction Register.

The Registers s and u contain 16 bits each. Referring briefly back to the description of FIGURE 1D, it will be remembered that for the $i^{th}$ Arithmetic Unit, word locations $X^i$, $Y^i$ and $Z^i$ correspond to the $i^{th}$ bit position of both the s and u Registers.

The bits of the s Register serve to inhibit the operation of its corresponding Arithmetic Unit. The Mill is designed to, and generally will simultaneously execute the common instruction in all the Arithmetic Units. However, the screen control, i.e., the contents of s Register is provided to give the Arithmetic Unit the capability of not executing a given instruction. For example, if the given instruction specifies addition, those Arithmetic Units whose screen bit is a "1" perform the addition, those whose screen bit is "0" do not.

The Logical Accumulator, or u, Register serves to hold the results of certain logical operations and acts as a control vector in certain vector operations on the X Register. The conventional logical operations AND, OR, etc., are performed with a single word from memory and the contents of the u Register serving as operants. The result has been placed back in the u Register. Controls are also provided for testing various bit positions of the u Register. For example, tests of various bit positions of the u Register may be compared with a particular row or word location of the X Register.

The u Register also serves to control the Compress, Expand, and Mask operations which were described generally in a previous section. These operations enable the user to restructure arrays of data by inserting and removing words from the X Registers.

The s and u Registers are registers whose functions are essentially visible to the programmer or from the input of the machine and words of a program may be assigned for filling these specific registers. Conversely, the p and v Registers are buried within the system and are utilized by the system as either Control Registers which are loaded from the s or u or Holding Registers which may be utilized to temporarily store and hold the contents of a previous comparison between the s, u and some other registers or the like.

The v Register has seventeen bit positions, one for each row or individual word storage register of the X Register and one for the w Register. Referring briefly to FIGURE 6, it will be noted that an output from v is fed into the gate circuit G60. A v Register position feeds into each bit position storage location of the entire X Register and, thus, it may be seen that unless a "1" is stored in the appropriate position of the v Register, operations will be inhibited. It will thus be seen that the v Register forms the most important single control function within the X Register. It should be noted that although the Y Register is not specifically explained in FIGURES 6 and 6A that the same controls exist for this register, i.e., a v Register bit position will be fed into an appropriate gate such as G60 in each storage bit location in the Y Register.

The p Register is primarily a Holding Register. Its contents may be alternately gated directly to the v Register or into the shift control circuitry shown on FIGURES 18A and 18C. As shown in the present embodiment, the p Register may be loaded directly from the v Register, from the AND unit shown on FIGURE 12, or from the Arithmetic Units the major functional portions are shown on FIGURES 13A–13C.

FIGURE 2

FIGURE 2 is a composite of FIGURES 2A–2D and is shown to illustrate the way in which this functional schematic diagram is organized.

FIGURES 2A, 2B, 2C, and 2D comprises a logical schematic diagram such as is well known in the art of the Address Generation and Memory Accessing circuitry.

Starting with the left-hand portion of this drawing, an Index Register with an associated Decoder and various conventional control gates in the input and output lines to the Index Register. The use of Index Registers is conventional in the computing systems primarily for modifying the address portion of instructions and to control branching among instructions. The present Index Register operates in the same manner; that is, it is initially loaded from memory upon appropriate initializing of the system such as when the Memory Boxes are filled. Subsequently, during the operation of the system the Index Registers will be addressed to obtain the address in Memory of desired data. Certain operations of the Index Registers are described subsequently in the detailed description of the Timing Sequence Charts.

The portion of the drawings appearing on the right-hand portion of FIGURES 2A and on 2B comprise the Address Generating Circuitry and include the Registers $A_0$–$A_3$ together with a number of special units such as the Adders and the $\delta$ Register and the Shift block. The operation of these devices is explained in detail in the description of certain of the Memory Access cycles. The circuitry shown provides for the generation of addresses two at a time from a base address $\alpha_0$ and an address increment $\delta$. The philosophy of the Address Generation is set forth clearly in the section of the specification relating thereto.

Figure 2C:
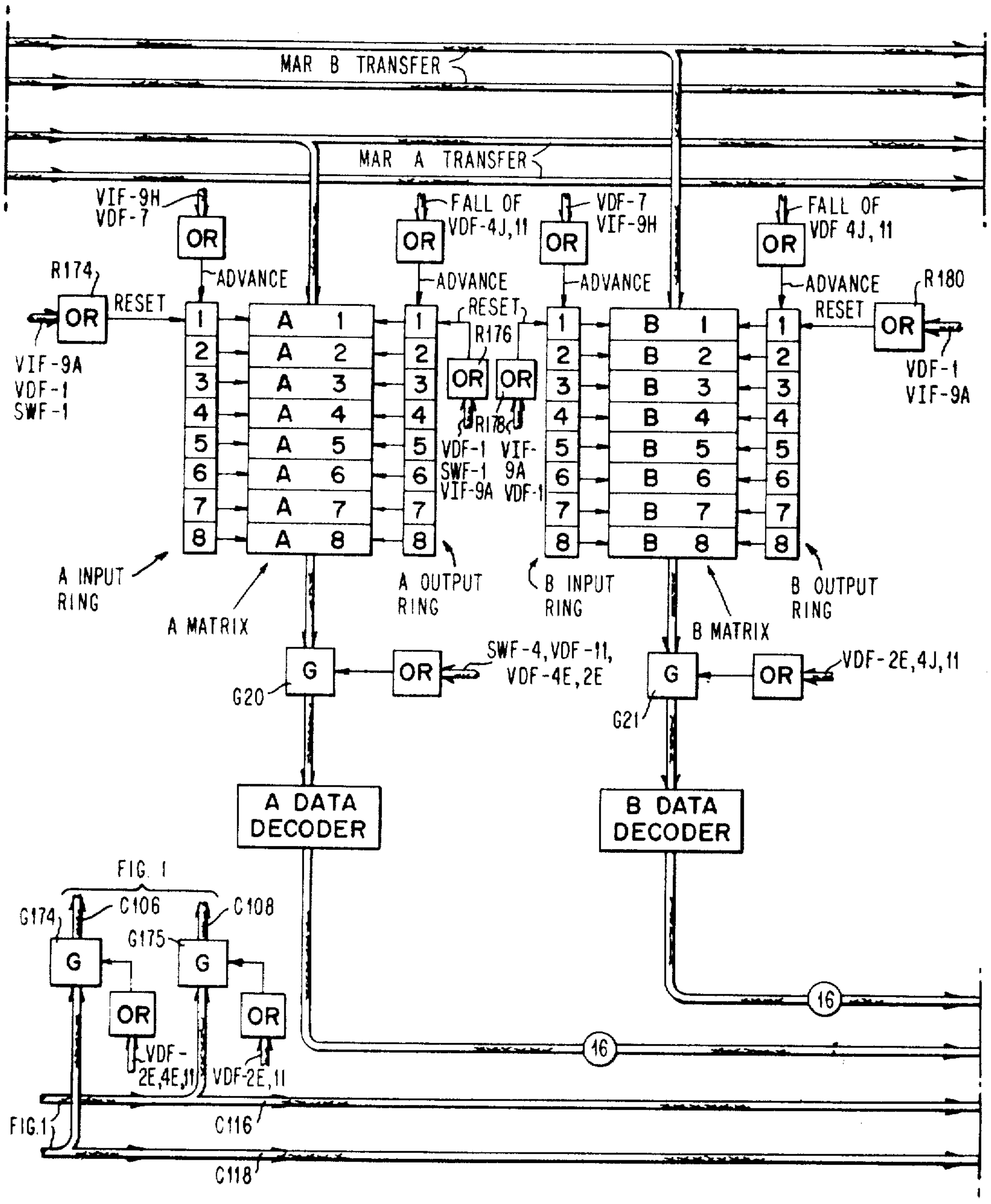
Figure 2D:
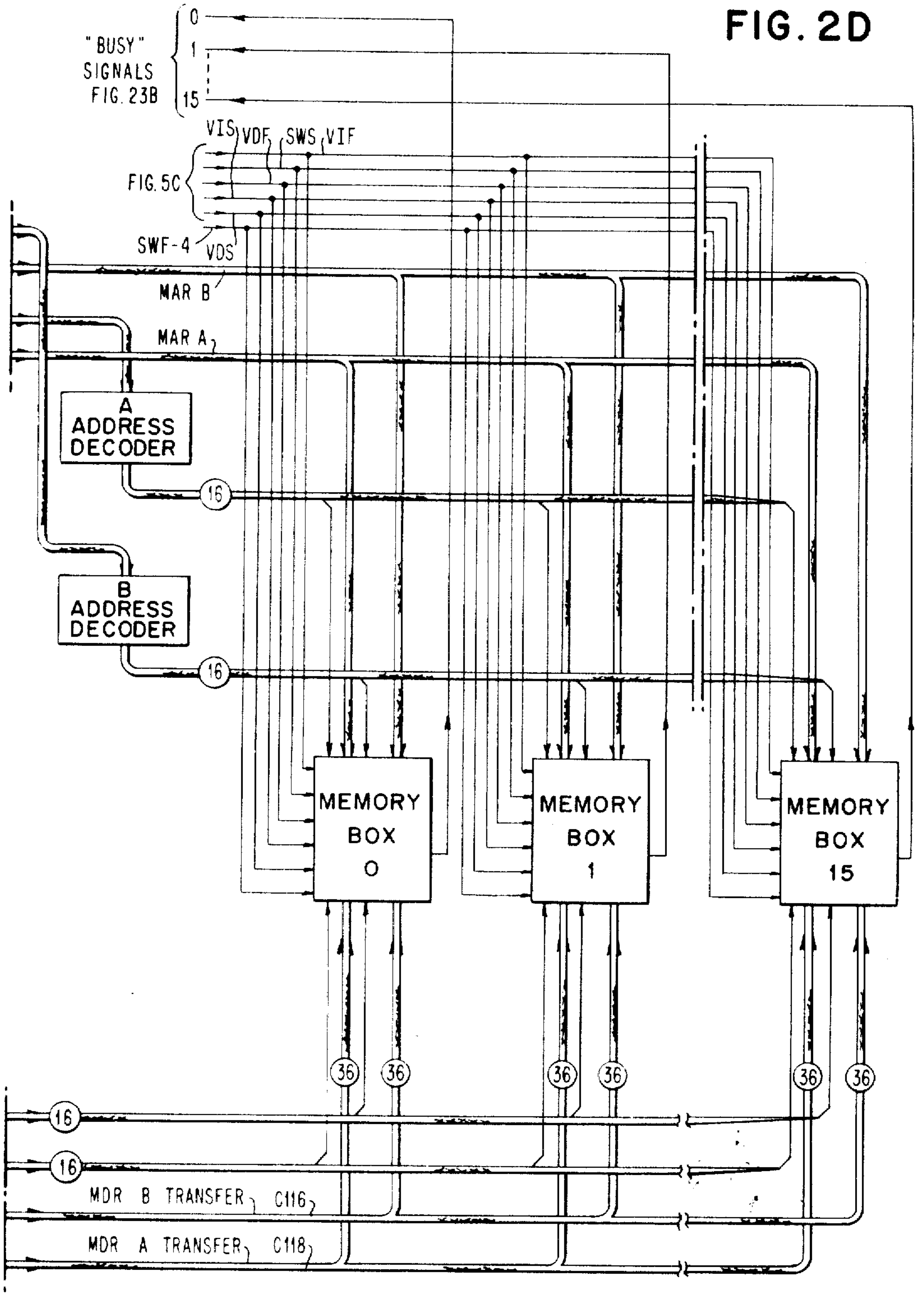

Referring to FIGURE 2C, there are shown the A Matrix and B Matrix together with their associated Input and Output Rings. The A and B Matrices and their associated circuitry including the A and B Data Decoders are for the purpose of keeping track of the sequence in which various Memory Boxes are accessed and allow for a certain amount of overlap between the generation of addresses and the transferring of data into and out of the Memory Boxes. Thus, the output of the A and B Data Decoders will select the proper gates within individual Memory Boxes to allow data to be transferred into and out of the individual memory storage locations. It will be obvious that for a given four bit address the same output or Memory Box will be selected by both, for example, the A Data Decoder and A Address Decoder.

FIGURE 3

FIGURE 3 is a logical schematic diagram showing the major control gates for a particular Memory Box insofar as setting up the address input and the data flow input and output paths. It will be noted that the Memory Box MAR may be loaded from either MAR–A Transfer line or from the MAR–B Transfer line. Similarly, the MDR (Memory Data Register) may be loaded from either the MDR–A Transfer line or MDR–B Transfer line. As will be explained subsequently, with reference to the specific description of the Timing Sequence Charts the provision of plural input and output lines into Memory Box is for the purpose of simultaneous Address Generation and Memory Accessing. With the system described two such Transfer lines are required. For a Four-Address Generation system, obviously, four such address and Data Transfer lines would be required. This is explained in detail in the general description of the memory addressing scheme. The additional logic in the nature of AND gates in the gate circuits would be apparent to a person skilled in the art in going from a Two to a Four-Address Generating scheme in view of the current description of the present embodiment.

The "read access," "write access," and "busy" flip-flops are shown as they are considered more important functional controls which would be utilized by the rest of the system, especially the "busy" flip-flop whose output is supplied to the circuitry shown in FIGURE 23. It is, of course, apparent that the actual memory and related circuitry is a conventional three-dimensional magnetic memory containing conventional addressing circuitry, driving circuitry, sense circuitry and inhibit circuitry as is well known in the art. Memory Boxes utilized in the present system are conventional with the exception of the controls illustrated in FIGURE 3.

FIGURE 4

The figure illustrates the manner in which addresses are generated by the present system. It will be noted that in the upper block entitled, Logic to Compute *n* Addresses, two inputs are shown. There are $\alpha_0$ and $\delta$. The $\alpha_0$ is the base address and $\delta$ is the address increment from which additional addresses may be generated from the base address $\alpha_0$. The *n* in the present embodiment is equal to the number of Memory Boxes which is also equal to or greater than the number of Arithmetic Units. This number is 16 in the present embodiment. Thus, the output from the uppermost block in the figure is 16 separate addresses which are utilized to address the Memory Boxes. The addressing of these memories is shown in the box marked "Routing to MAR's." It will be noted that there is an output line from this box to each of the Memory Address Registers for each Memory Box. This situation applies to both the direct and indirect modes of addressing in the present system. The lower box marked "Routing to Z Register" indicates the switching that is necessary in routing data from an individual Memory Box through its associated Memory Data Register into a particular location of the Z Register. As will be apparent, the routing can either be to or from a given Memory Box depending upon whether a "write" or "read" operation is being performed. It will further be noted that there are *n* lines to the Z Register which contains *n* Word Storage Registers.

Referring again to the box marked "Routing to MAR's," it will be noted that provision is made for an input from the Z Register (vector indirect mode). This describes the Memory Addressing operations during the Indirect Addressing Scheme. The Direct and Indirect modes are described in detail in the subsequent description of the Timing Sequence Charts. However, what is involved briefly in the Direct mode is that the 16 memory addresses are generated directly from the base address $\alpha_0$ and the address increment $\delta$. In the Direct mode of operation these generated addresses are utilized directly to obtain data from memory. That is to say, data will be stored at the location specified by the generated addresses. In the Indirect mode, however, the information stored in memory at the addresses obtained from the Address Generation circuitry are in turn addresses which are subsequently utilized by the system to obtain the actual data. Thus, in the Indirect mode of operation 16 addresses are first generated and these addresses utilized to obtain words from memory which words are then routed to the $\underline{Z}$ Register upon the termination of the initial Addressing cycle; and subsequently, the addresses are routed from the $\underline{Z}$ Register to the individual Memory Box Memory Address Registers and the data obtained therefrom routed back into the $\underline{Z}$ Registers.

Another common Addressing routine utilized in the present system is the single-word operation wherein a single address is utilized to address the bank of memories to obtain only a single word, such for example, as an instruction word which is to be placed in the Instruction Register. Again, the specific details of this routine will be completely described subsequently in the description of the Timing Sequence Charts.

FIGURE 5

This figure comprises the logical circuitry closely associated with the Instruction Register, its associated Instruction Decoder Register and various closely related logic circuitry which is utilized for the purpose of initiating various control sequences in the present system. Referring specifically to the drawing it will be noted that FIGURE 5 is a composite showing the arrangement of the drawings of FIGURES 5A through 5C. As stated previously, the primary individual function of the unit on this particular figure is the Instruction Register and its associated Instruction Decoder Register. It will be noted that there are multiple outputs from the Instruction Register Decoder. The nature of these outputs is shown in the following table:

VSTY—Store $\underline{Y}$.
VSTX—Store $\underline{X}$.
VSSM—Search for the smallest number of a vector.
VSLG—Search for the largest number of a vector.
VRFSM—Perform a Floating Point-Sum Reduction upon a vector of numbers.
VCMPS—Perform a Compress operation upon a vector.
VEXPD—Perform an Expand operation upon a vector of numbers.
VUSM—Subtract the magnitude (absolute value) of the vector in memory for the $\underline{X}$ Register. The result is not normalized.
VFSM—Same as VUSM except the result is normalized.
VUAM—Add the absolute value of the vector element in memory to the contents of $\underline{X}$. The result is not normalized.
VFAM—Same as VUAM except normalize the result.
VUFS—Algebraically subtract the vector in memory from the contents of $\underline{X}$. The results are not normalized.
VFSB—Same as VUFS except that the result is to be normalized.
VFAD—Algebraically add the vector in memory to the contents of $\underline{X}$. The result is normalized.
VUFA—Performs a Floating Point Add operation as above wherein the result is not normalized.
VUMO—Performs a search for the Uppermost (position with smallest index) One in a given bit position in the vector $\underline{u}$.

The Instruction Counter Register shown in the upper left hand corner of FIGURE 5A is a conventional Counter and is used primarily to keep track of the main instruction program as is conventional and well known in the art. Its input and output are indicated generally in the figure.

The remainder of the functional units of FIGURES 5A through 5C comprise various logical functional blocks such as AND, OR and gate circuits, whose function is clearly implied from the inputs and outputs shown on the drawing. The various flip-flops (FF) are Control flip-flops which are set to their "1" or "0" state by various control conditions, whether it be the detection of a particular operation detected by the Instruction Decoder Register or the setting of such a flip-flop from a particular clock sequence. Thus certain of these flip-flops represent the entering of common subroutines necessitated by various enumerated operations such as specified by the output of the Instruction Decoder Register, said operations being listed in the above table. An example of such a subroutine flip-flop is the Floating Point Shift flip-flop shown in the right hand portion of FIGURE 5B. The setting of this flip-flop to a "1" causes entry into the FPS Clock which is necessary for performing Floating Point operations as will be understood. Most of the flip-flops shown on FIGURE 5C are of a similar nature. That is, the setting of one of these flip-flops to a "1" causes entry into a system subroutine. The particular clock sequences for the subroutines are listed in the Timing Sequence Charts and the specific operation of the system in performing these subroutines is set forth in detail in the description of the Timing Sequence Charts subsequently in the specification.

FIGURE 6

This figure illustrates a specific bit storage cell or location for the $\underline{X}$ Register. It should, thus be noted that the entire $\underline{X}$ Register would be made up of sixteen rows wherein each row would be composed of 36 individual storage cells and associated logic circuitry of the type shown in FIGURE 6. Further, the $\underline{Y}$ Register would be constructed in substantially the same manner.

Referring now specifically to FIGURE 6, the primary storage element is the flip-flop denoted $\underline{X}_i^k$. It will further be noted that this flip-flop has three possible inputs, a "set to '1'," a "set to '0' " and a complementing input, any one of which may be energized upon demand from the gate circuit G60. The "Intermediate Storage" flip-flop shown beneath the main Storage flip-flop is for the purpose of performing Shifting operations and holds a particular piece of information for a short period of time during such operations as will be understood. The various other logic circuitry illustrated is quite conventional and the specific operation is clearly set forth in the subsequent description of the Timing Sequence Charts where a number of operations are described.

It should be noted as is stated subsequently, that the present configuration shows the circuitry only for shift left and shift right for (1 bit). There would be similar direct connection lines for shifting both left and right 2 bits, 4 bits and 8 bits. However, these are not specifically shown as they would merely complicate the drawing and would be apparent to one that is skilled in the art. They would differ only in that the particular lines would connect to storage positions 2, 4 and 8 positions removed rather than one storage position.

FIGURE 6A

This figure is an organizational drawing showing a plurality of bit storage locations in the $\underline{X}$ Register. Each of the large blocks represents that portion of a bit storage location shown in the dotted portion of FIGURE 6. This figure illustrates in a general way the controls for a shift-up, a shift-down and a one-bit shift to the right or to the left. The bit storage position shown in the center of the drawing represents the bit in row K and column $i$. Thus the upper row is $k-1$ and the lower row is $k+1$, and similarly, the column to the left is $i-1$, the column to the right is $i+1$. It will further be noted that each of the individual discharge locations illustrated has four gate circuits and two OR circuits. These are for the general function, as follows:

Gate circuit G125 is energized when it is desired to effect a shift to the left of 1 bit position. Gate circuit G124 is energized if it is desired to shift to the right by 1 bit position. Similarly Gate circuit G74 is energized if it is desired to shift up by one row and Gate circuit G75 is energized to shift down one row. OR circuit 54 is the input to set the particular Storage flip-flop to a "1" and OR circuit R56 is utilized as the input to set the storage flip-flop to a "0." As stated previously, only one gate circuit each of G125 and G124 is shown for a shift left or shift right of one bit position. It will be understood that an additional gate circuit and lines would be needed for effecting the needed multiple shifts, i.e., 2, 4 and 8 bits such as would be necessary for shifts of greater than one bit. However, the circuitry for accomplishing this would be obvious in that it would comprise a gate circuit and direct connecting lines to the left or to the right the appropriate nlmber of bit positions.

FIGURE 7

This figure is a logical schematic diagram of a control element used with the present system referred to as the Counter J. This Counter is merely used to keep track of certain operations being performed by the system and for example in a given loop type of operation such, for example, as Search for Largest or Smallest, Floating Sum Reduction, Floating Point Shift, Vector Expand, Vector Compress, and Floating Point Add operations. The Counter is incremented each time a loop is entered and usually at the end of the loop the current setting of the Counter is tested such as by means of the gate circuits shown immediately below the Decoder and the setting of the Counter J will determine whether a particular sequence has been completed or whether the loop must be reentered. Again the description of the manner in which this Counter is used will be very clearly described in the description of the Timing Sequence Chart.

FIGURE 8

This figure is a logical schematic diagram showing the details of the u̲ Register which is utilized in a number of the system operations. A sixteen bit number may be stored in the Register flip-flops $\underline{u}_1$ through $\underline{u}_{16}$. It will be noted that the controls include the u̲ Output Ring which is settable to a "1" and may be advanced in accordance with input pulses applied to the "Advance" line. By examining this figure it will be noted that the contents of this register may be gated out one bit position at a time through either the gate circuit G68 or G56 or it may be gated out the entire register at a time through the gate circuit K64 or G150 under control of the indicated system clock pulses. Again the specific details of the operation of the u̲ Register and its associated controls are set forth in the subsequent description of the Timing Sequence Charts.

FIGURE 9

This figure is a logical schematic of the p̲ Register and its associated controls. Like the u̲ Register, the p̲ Register comprises a series of Storage flip-flops, i.e, 17 in this case, indicated in this case $\underline{p}_0$ through $\underline{p}_{16}$. It will be noted that the Storage flip-flops may be loaded or set from a plurality of sources and that similarly the outputs may be taken off and routed to a number of different points. It will be noted particularly in the bottom of the figure that logical control circuitry is shown for the existence of a "1" in any of the register storage locations at any given time. This is done by bringing the "1" side only of each of the flip-flops into a cable and routing them into the OR circuit 96. Subsequent tests are made on the output of this OR circuit as clearly indicated in the drawing and as is described subsequently.

FIGURE 10

This figure is an exemplary logical schematic diagram of one of the System Blocks. Each of the blocks comprises a single-shot multivibrator having a distinct turnon pulse and a turnoff pulse spaced therefrom. Referring to the drawing of FIGURE 10 it will be noted that a listing is included of all the circuit components in the various figures to which the various illustrated pulses are routed. The arrow coming out of the top of each of these single shot boxes represent the turnon pulse and the arrow coming out the side of the box represents the turnoff pulse. It will be noted that certain of the turnoff pulses proceed directly to the next box whereas others go elsewhere. In the latter case, the turnoff pulse is usually applied to some sort of gate circuit or the like, which tests the setting of a particular flip-flop or other condition indicating block and, thus, the clock sequence can be branched appropriately. For clock stages SWF–3 or SWF–4 may be initiated depending upon the input to G014 on FIGURE 23C at the time SWF–2 is applied thereto.

FIGURE 10, the Single Word Fetch Clock, is the only one of the system clocks which is shown in detail as it is believed that this figure together with the Timing Sequence Charts in which each system of clock stage operation is shown and described in the greatest detail together with the actual description of the Timing Sequence Charts makes the operation of the present system very clear and unambiguous and the showing of a separate figure for each clock of the nature of FIGURE 10 would not add materially to the present specification.

For example, in the Timing Sequence Charts the functions that must be performed by each and every clock stage are clearly set forth and also it is indicated whether the turnon or the turnoff pulse of a particular clock stage is to perform the particular operation. Subsequently, in the description of the operations referring to the Timing Sequence Charts, a specific reference is made to the particular circuit element in the drawings to which a given clock pulse must be applied in order to perform a particular specified operation.

FIGURE 10A

This figure is a functional block diagram illustrating all of the individual clock sequences which are specifically described in the Timing Sequence Charts. The abbreviations used in this figure are explained in the List of Abbreviations immediately preceding the Timing Sequence Charts. A block is shown in the figure for each of the individual clock sequences and the drawing is separated by means of the dotted lines to indicate the different types of control operations performed by the different clock sequences. For example the STA, INSTF and EA Clock sequences are part of the Instruction Accessing and Control sequence of events in which the system operations are initiated and instructions obtained in accordance with program control. The block marked Instruction Register and Controls is shown since this integral part of the system obviously decodes various instruction words and initiates particular clock sequences. The section marked System Operations indicates the actual arithmetic operations and Data Restructuring operations which involve the performance of arithmetic operations or the moving of data around within the system to, in effect, restructure or reorganize same for some subsequent type of operation.

The section marked Memory Operations are those involving Memory Store and Fetch sequences and include operations necessary to generate addresses in memory and the routing of data to and from memory.

Interconnection lines have not been shown on the drawing as it would be sufficiently interwoven to render the drawing unclear. It is obvious however, that a memory operation or more than one memory operation will be necessary in performing Instruction Accessing operations and most of the System operations specified.

Similarly, the Floating Point Shift Clock sequence (FPS) is a necessary step in most of the vector arithmetic operations such as Floating Point Add, Floating Sum Reduction, Compress and Expand, etc. It should further be noted that a specific clock sequence is not necessarily provided for all of the operations illustrated in FIGURE 5 as an output from the Instruction Register Decoder since the individual clock sequences shown, such as FAD, make tests to determine whether or not a normalized or unnormalized result is necessary for a particular operation, etc. Again the specific tests of all such conditions is described in detail in the description of the Timing Sequence Charts.

FIGURE 11

FIGURE 11 is a composite showing the arrangement of FIGURES 11A and 11B. FIGURES 11A and 11B are a logical schematic diagram illustrating the major components of the $\underline{v}$ Register and showing the Counting Network and the Uppermost Circuit in block form and illustrating this relationship to the $\underline{v}$ Register. The $\underline{v}$ Register as with the other special purpose registers previously described, comprises a series of individual bit storage flip-flops, in this case 17, $\underline{v}_0$ to $\underline{v}_{16}$. Various logic for inputting information into the register 17 bits, at a time, is shown as well as logic including the $\underline{v}$ Input Ring for storing information in this register a single bit at a time. More detail of the Counting Network and Uppermost Circuit is shown in FIGURE 14. It will be noted that the $\underline{v}$ Register has a great many inputs and outputs since this register is utilized in a great many of the system functions the more important of which is the control of the $\underline{X}$ Register which must have an input to every bit storage location from the $\underline{v}$ Register for any of the register functions such as shifting, transfer, etc., to occur.

FIGURE 12

This figure is a logical schematic diagram of the AND Unit. This circuitry performs the functions of ANDing or ORing up to 17 pairs of bits. This unit is utilized in a wide variety of system operations as may be readily ascertained from the clock pulse inputs to the various control gates such as the OR circuits R80 and R82. For example in a Floating Point Shift operation for any given segment of data, if it were desired to know whether or not a particular piece of data stored, for example, in one of the rows of the $\underline{X}$ Register would require shifting, a mask bit would have to be examined to determine whether or not it is desired to utilize this particular piece of data in an operation and then subsequently determine whether or not the radix point and exponent for the data were such that a shift is required. Thus, if a "1" is ascribed to each of these two positive conditions, an output from the particular position of the AND Unit would indicate that the data is to be used in a subsequent operation and that it does require shifting. This output may be appropriately stored in the $\underline{v}$ Register, where, as will be described subsequently, it will be used to control Shifting operations. A similar type function is obtained from the OR gates included in each of the bit positions of the AND Unit, again, as will be described subsequently.

FIGURE 13

FIGURE 13 is a composite showing the arrangement of FIGURES 13A through 13C. This FIGURE i.e., 13A through 13C is a logical schematic diagram of the actual Floating Point Add Unit of the present system that shows the first and 16th Arithmetic Units, it being understood, of course, that numbers 2 through 15 are identical to the two shown in the drawing. Each of the Arithmetic Units consists essentially of the following major sections. The first is the Sign Compare Block wherein the sign bits with two numbers to be added are compared to determine whether a true addition or subtraction by means of addition of a complement is to occur and an appropriate Carry Control flip-flop may be set to control the subsequent operation. Next is a series of gates on FIGURE 13A, marked True $\underline{Z}$ Sign, True $\underline{Z}$ 1–8, True $\underline{Z}$ 9–35, etc., to True $\underline{X}$ 9–35.

As is clearly indicated in the drawings, these gates are connected to various bit positions of the $\underline{Z}$ and $\underline{X}$ Registers and are, thus, capable of transferring the particular bit positions through their respective output cables to the Exponent and Fraction Adders. The Box marked Zero's is for the purpose of specifically introducing Zeros as a desired addend or augend as an input to the Exponent Adder as will be explained subsequently. All of the other OR circuits, AND circuits, gate circuits (G), flip-flops (FF) etc., are well known functional blocks whose specific operations are specifically described in the subsequent description of the Timing Statements Charts.

Referring specifically now to FIGURE 13B, a section including the AND circuits A142, A144, A146, A148, A150, the gate circuits G266, G284, G296, G298, G300, G302 and the blocks indicated at the digit 2's complement of the binary numbers, the digits 1, 2, 4, 8, 16 and 27 are shown. This section of the circuitry is not repeated for each of the 16 Arithmetic Units but is a single unit whose output feeds in parallel into all 16 of the Exponent Adders. Whether all 16 of the Adders utilize these inputs to modify exponents will, of course, be under control of the system and additions will or will not be performed in accordance with other information placed in the system as will be clear from the subsequent descriptions. Generally, however, it will be remembered that arithmetic operations occur simultaneously in all 16 Arithmetic Units and also in the registers insofar as shifting is concerned. The shifting operations are performed in accordance with tests made on a particular order of the exponent binary bits. That is, shifting will occur, for example, in all numbers wherein a shift of, for example, 4 is required.

The circuitry shown in FIGURE 13 is capable of performing all of the Floating Point Addition described with the present system and necessary in accordance with the clock requirement as specific in the Timing Sequence Charts. It is of course, apparent that multiplication and division may be performed by the same logical circuitry shown in FIGURE 13 with the provision of appropriate system clocks for performing these operations. The additional functional circuitry i.e., AND circuits, OR circuits and gate circuits necessary to perform these operations is considered trivial and within the knowledge of one skilled in the art and is not shown and explained specifically as it would needlessly complicate the disclosure of the present system. The principal factors, of course, are the fact that all such operations may be performed in parallel, i.e., 16 at a time wherein the data is gated in parallel to the Arithmetic Units and the results are gated out of the Arithmetic Units in parallel and back into the registers.

FIGURE 14

FIGURE 14 is a composite showing the arrangement of FIGURES 14A–14D. This set of figures is a logical schematic diagram showing the details of the Counting Network and the Uppermost Circuits.

The Counting Network as will be explained subsequently is used in the Sum Reduction operation where it is desired to add the 16 numbers appearing in the $\underline{X}$ Register together concurrently. The way is which the operation is performed is that all of the numbers to be added are brought into the Counting Network a column at a time, that is, the equivalent word bit position such, for example, as the 4th bit in all numbers is brought in the horizontal lines from a $\underline{Z}$ Register where such column is temporarily stored on the transfer from the $\underline{X}$ Register. As each column is added an output on one of the lines marked Zero to 17 at the bottom of FIGURE 14B will occur depending on how many "1's" appeared in a particular column. Thus, it may be seen that the Counting Network merely comprises a Counting Tree having up to 17 binary inputs and Zero through 17 possible outputs. The output lines are brought in the Unitary to Binary Encoder shown on FIGURE 11B and in turn is transferred into the Tree Accumulator. Then as the operation is continued, that is, through all 27 bit positions of the fraction portion of the numbers to be added, each of the results from each column will be detected and accumulated in the Accumulator and at the end of the operation an output will be obtained from same and the results shifted into the w Register which is shown in block form on FIGURE 11B and in detail in FIGURE 24.

The Counting Network as may be seen merely comprises an interconnected array of AND circuits wherein the occurrence of a "one" or a "zero" appearing on the horizontal input lines routes a signal appearing at the input of the OR circuit R150 down through the Tree Network and, thus, brings up the appropriate output line. The actual operation of such Tree Circuits is thought to be well known and quite apparent from the logical schematic diagram shown.

The Uppermost Circuits shown in FIGURES 14C and 14D comprise a decoding network used in the Search for Largest-Smallest operation when it is desired to locate that bit position of the Z Register having a first "1" going from the $Y_1$ bit postioin. If for example zeroes were stored in bit positions $Y_1$–$Y_3$ and a one were stored in a $Y_4$, the "1" signal appearing on the appropriate line would be applied as one input to the AND circuit A43 the other input to which would be received from the AND circuit A45 whose output is energized by the occurrence of the previously mentioned "zeros" stored in the preceding bit, positions. The output from A43, thus, provides an input to the OR R110 whose output is connected to set the associated flip-flop to a "1." Thus it may be seen that a binary number will appear in the y Index Register representative of the numbered position, i.e., $Y_1$ through $Y_{16}$ in which the first "one" is stored. It will be apparent by studying the circuitry of the Uppermost Circuits drawing that the currents of the first "one" prevents the energization of any of the subsequent lines going into the OR circuits R108, R110, R112 or R114.

FIGURES 15 THROUGH 15B

FIGURE 15 is a composite showing the relative location of FIGURES 15A and 15B for purposes of assembly. This drawing is a logical schematic diagram illustrating the interconnections of the X, Y and Z Registers. In these drawings the registers themselves are shown in functional block form and the various columns and rows of these registers are clearly indicated. Also the major peripheral control units for the X Register are shown such as the X Column Complement Selector which selects which column of the X Register is to be gated out to other sections of the system in complement form. The X Column Reset Selector selects the particular column of the X Register which is to be reset to "0's" upon command. The X Column Input Selector selects which column of the X Register is to have new data inserted therein. The X Column Output Selector which is also shown on FIGURE 24 controls the selection of a particular column of the X Register which is to be gated out to, for example, the y Register where it is to be used in various machine operations. Also Input Control lines corresponding to the above enumerated control units for the X Register are shown such as the X Column Reset line, X Row Reset line, X Row Complement line, X Column Complement line and X Column Output line.

As stated previously, the present system will operate by providing such a high degree of control for only the X Register, however, it will be understood that such controls may similarly be provided for the Y Register to extend the versatility of the present system within the teachings of the present invention.

Various AND, OR and gate circuits shown operate in a completely conventional manner and the control pulses applied to these various logical circuit elements are clearly set forth in the figures and described in detail in the subsequent description of the Timing Sequence Charts wherein the specific operation of the system is described.

It should be noted that only those sections of the Z Register are shown in this drawing necessary to generally describe data transfer between the X, Y and Z Registers. The additional details of the Z Register are shown in FIGURE 1 and the logical circuitry included therein completely described in the section relating to various memory operations.

FIGURE 16

This figure is a logical schematic diagram of the 28 Input AND Unit. As will be noted, there are 16 of these units marked $X^1$ through $X^{16}$.

As is explained in detail in the Floating Point Add operation description subsequently, these units are utilized during certain operations when it is desired to normalize a result and are utilized to test the fraction bits of the X Register to determine if a true zero is stored therein. As will be appreciated, if a true zero is stored therein it will not be possible to normalize such a number and the result of this test prevents the system from attempting to normalize same. A Test is made by gating all of the "0" positions of the various rows of the X Registers into the digits 28 Input AND Units together with the "1" position of the appropriate bit posiition of the s Register. If an output is obtained it indicates that all zeros are stored in the X Register and further that this is an active position in the particular computation being made. The function of all of the logic circuits shown in the figure is quite conventional.

FIGURES 17 THROUGH 17B

FIGURE 17 is a composite drawing showing the relationship of FIGURES 17A and 17B. FIGURES 17A and 17B comprise a logical schematic diagram of a major segment of the shift testing and control circuitry utilized in Normalizing operations performed on the present system. The circuitry is somewhat similar to that of FIGURE 16 in that it comprises a plurality of AND circuits for testing for "0" bit positions in the left hand fraction bits of the numbers stored in the X Register. FIGURE 17A shows the logical detail circuitry for testing one row of the X Register. The circuitry shown within the dotted portion of FIGURE 17A is replicated in each of the large boxes shown in FIGURE 17B. As will be appreciated from the description of the Floating Point Add operations requiring normalization, all of the zeros in any number may be removed by successively testing the number for "0's," shifting the contents of the register appropriately and appropriately adjusting the exponent bits.

FIGURE 18

FIGURE 18 is a composite drawing illustrating the organization of FIGURES 18A through 18C. These figures represent a logical schematic diagram of that portion of the system utilized primarily for effecting the Shifting operations. As will be noted, there is a separate section for each row of the X Register. This includes a Compare Unit, a gate G284, AND circuits A14, A116 and A118, OR circuits R284, R130, R132, flip-flop F12, single shot S12, etc. There are 16 such sections as indicated in the drawing, particularly FIGURE 18A, each having an input from the "0" bit position of each row of the X Register. Thus the first Compare Unit has an input from the $X_0^1$ bit position, and so forth.

Referring now to the bottom of FIGURE 18A and to FIGURE 18C there are shown two blocks labelled Multiple Shift Right Unit and Multiple Shift Left Unit. These units are shown in partial detail in FIGURES 22A and 22B. They actually comprise the shifting gate which is utilized to connect the various bit storage locations of said $\underline{X}$ and $\underline{Y}$ Registers to effect the various shifts specified. The amount or degree of the shift is specified by the Multiple Shift Right Ring and the Multiple Shift Left Ring. In other words, if the 8 position of the Multiple Shift Left Ring of the Multiple Shift Left Unit were energized, a shift left of 8 bit positions would be effected by the unit. It will also be noted that the "shift down" and "shift up" signals will originate from the logical circuit as shown in FIGURE 18C, specifically the two flip-flops shown adjacent the "shift up" and "shift down" lines.

The circuitry shown in FIGURE 18 further controls the accessing of complements rather than true outputs from certain of the registers for arithmetic operations when sign bits for two numbers to be added differ, thus, requiring, in effect, a Subtraction operation as will be well understood.

FIGURE 19

This figure is a logical schematic diagram of the $\underline{e}$ Register. This register is used to keep track of exponent bits Floating Sum Reduction operation. It may be reset to a "0" and incremented and decremented accordingly, or individual bit positions thereof may be selectively set to a "1" under control of its associated input Ring. Again the specific operation and relationship of this particular segment to the system during the above-mentioned operations will be clearly specified in the detailed description of the Timing Sequence Charts appearing subsequently herein.

FIGURE 20

This figure is a logical schematic diagram of the $\underline{s}$ Register. It will be noted that this register is broken up into odd and even segments having Odd and Even Output Rings. This register is used primarily during various memory operations which include the Vector Direct Store, Vector Direct Fetch, Vector Indirect Store and Vector Indirect Fetch. This register is organized in the odd and even numbered fashion illustrated since it will be remembered that the addresses are generated in odd and even multiples and that the $\underline{Z}$ Register is also organized in odd and even numbered row positions. The logic circuitry associated with this register serves the purpose of gating information both into and out of same and also for the purpose of making a number of branching tests for determining which clock sequences will be enabled at a certain test point. Note for example, directly below the Odd and Even Output Rings the AND circuits designated as A68, A70, A78, A72, A80, A74, A82 and A76. It will be noted that upon the application of clock pulse VIF–9C, the system will be conditioned to branch selectively to VIF–9D, VIF–9N or VIF–9H. The exact test being made by the input clock pulse will be clearly apparent by an inspection of the Timing Sequence Charts and the specific detailed description of same, which follows subsequently.

FIGURE 21

This figure is the logical schematic of the Counter I which is used in a manner similar to the Counter J illustrated in FIGURE 7. This Counter is selectively resetable to "0" or may be incremented by a suitable pulse applied thereto as is well known in the art. As will be apparent from the two output lines from the Counter, this Counter is used to test for the occurrence of an 8 or not 8 condition and as will be apparent from this subsequent description, determines when 8 cycles of the associated control clocks have been completed and the Counter will thus signal when a particular operation is done. In this case an Address Generation routine will indicate when 16 addresses have been generated by the system. It will be noted that on a given Address Generation cycle two addresses will be generated, thus, in eight cycles, sixteen addresses are generated. The various gate circuits illustrated are for the purpose of making the Test for the condition of this Counter I.

FIGURE 22

FIGURE 22 is a composite drawing illustrating the organization of FIGURES 22A and 22B. FIGURES 22A and 22B comprise a logical schematic of the details of the Multiple Shift Left and Multiple Shift Right Units shown on FIGURE 18 in block form. The gate circuits shown in the FIGURE 22B are the shifting gates also shown in the detail of the bit storage location on FIGURE 6. All of these gate circuits have been shown as number G124 or G125 depending on whether or not they are involved with a Shift Right or a Shift Left operation. Referring specifically to the indicated bit position $\underline{X}_{35}$, it will be noted that there are two additional gate circuits illustrated, i.e., gate circuits G124A and G124B. These are used when the shift from the 35th bit position of the $\underline{X}$ Register is to proceed other than to the 9th bit position of the $\underline{Y}$ Register. Thus, gate circuit G124A is energized when it is desired to shift directly from the 35th bit position of the $\underline{X}$ Register to the "0" bit position of the $\underline{Y}$ Register. Similarly, gate circuit G124B is energized when it is desired to shift directly from the 35th bit position of the $\underline{X}$ Register to the first bit position ($\underline{Y}_1$) of the Y Register. Register to the first bit position ($\underline{Y}_1$) of the $\underline{Y}$ Register. These alternate shift patterns are utilized as will be understood when different instructions are detected in the Instruction Register and as will be appreciated, allow the use of more register storage bit positions in order to maintain desired precision for certain operations.

Referring to the top of FIGURE 22A, the four flip-flops illustrated as FF "1," FF "2," FF "3" and FF "4" are set by various inputs from the Instruction Register. It will be noted that the flip-flop FF "4" is set from the indicated clock stages of the Timing Sequence Chart. The other three flip-flops are set as indicated from various clock sequences which have not been specifically set forth in the description of the present system as it was not felt that they added materially to the overall system description, however, the power of obtaining these shifts is described in order to illustrate the versatility of the present system organization. For example, an instruction labelled VHLGR is anticipated by the system which stands for Vector Horizontal Logical Right Shift. This means that a specific row position of the $\underline{X}$ and $\underline{Y}$ Registers will be treated as a single 72 bit Storage Register having neither sign nor exponent. As will be noted, this flip-flop causes direct connection between bit positions $\underline{X}_0$ and $\underline{X}_1$, $\underline{X}_8$ and $\underline{X}_9$, $\underline{X}_{35}$ and $\underline{Y}_0$, and $\underline{Y}_0$ and $\underline{Y}_1$, and $\underline{Y}_8$ and $\underline{Y}_9$.

Flip-flop FF "2" as is indicated is actuated by an instruction designated as VHLRS which stands for the instruction Vector Horizontal Long Right Shift. The operation this flip-flop sets up is a 70 bit signed register by combining appropriate bit positions of the X and Y Registers. Specifically, it now connects $\underline{X}_1$ and $\underline{X}_8$, and $\underline{X}_9$, $\underline{X}_{35}$ and $\underline{Y}_1$, and finally, $\underline{Y}_8$ and $\underline{Y}_9$.

The flip-flop "1" is energized by the instruction designated as VHARS which stands for the instruction Vector Horizontal Arithmetic Right Shift. This operation requires the use of a single 35 bit signed register, and thus, affects only the $\underline{X}$ Register. It will be noted that the output from the flip-flop FF "1" connects only bit positions $\underline{X}_8$ and $\underline{X}_9$, thus providing 35 bit storage locations in positions $\underline{X}_1$ through position $\underline{X}_{35}$ and provides for a sign bit in location $\underline{X}_0$. It will again be noted that nothing in the Y Register is modified by the above instruction.

FIGURE 23

FIGURE 23 is a composite drawing illustrating the organization of FIGURE 23A through 23C. This composite figure represents the logical schematic drawing of the "Test for Busy" circuitry of this system. The function of this circuitry is to test the two memories whose addresses are specified in the A1 Address Register and the A3 Address Register. The particular memory is determined from the low order four bits of this address and decodedby the two Decorders shown in FIGURES 23A and 23B. The specific output of these Decorders is supplied to the AND circuits A56 and if an output is concurrently obtained from the individual Memory Box busy flip-flop and from one of the OR circuits R10 or R12, this will indicate that the specific Memory Box to be addressed is busy. The occurrence of a signal from the OR circuits R10 and R12 will cause one of the flip-flops F10, F18, or F22 to be set to a "1" thus indicating that the particular Memory Box which it is desired to address is currently busy. Subsequent tests made by the indicated gate circuits connected to the output of the "busy" flip-flops, said gate circuits being actuated by various clock pulses as indicated by FIGURE 23C, will cause the individual clock sequences currently being performed to delay until the not busy line out of the pertinent flip-flop becomes active at which point the clock sequence continues with the particular operation. Again, the specific detailed description of the various system clock sequences will clearly describe the operation of this circuitry. As will be appreciated, this circuitry is active and utilized during the various Memory Accessing operations which include the Vector Direct Fetch, Vector Direct, Fetch, Vector Indirect Store, Vector Indirect Fetch, Single Word Fetch and the Single Word Store operations.

FIGURE 24

This figure is a logical schematic diagram of the w Register and its associated logic circuitry. This register is used primarily to receive the results of a Sum Reduction operation wherein all selected members of a vector of numbers up to 16 stored in the X Register are all added together. As will be remembered from the description of the Counting Tree shown in FIGURE 11B, the contents of FIGURE 24 would be within the box marked w Register also shown on FIGURE 11B. As will be remembered a column of up to 17 bits at a time will be added one at a time by the Counting Network. The particular column of the X Register is selected by the X Column Output Selector shown in dotted lines at the top of FIGURE 24. This Output Selector selects the particular bit position of w Register into which a particular output of the Accumulator will be stored. The function of the various other logical blocks illustrated is set forth in detail in the description of the Sum Reduction Clock and its operation, which is set forth subsequently.

SECTION 6

*Timing sequence charts*

The following is a detailed list of the specific operating sequences of the disclosed system. These operations are performed by the System Clock which has been described generally previously. A specific clock section or stage is illustrated in FIGURE 10. As is apparent from the previous description, various timing sequences will be initiated by direct instructions as determined by the Instruction Decoder which sets various Control flip-flops. Subsequent sub-sequences are determined by tests made during various clock sequences.

The following list of abbreviations is used in the Timing Sequence Charts for simplicity on both the charts and also the drawings where the various clock pulses are shown applied to perform the specified control functions.

As will be apparent from the following description, only those operation sequences which relate to the specific portions of the system necessary to perform the word-parallel bit-serial vector operations are set forth. In addition, certain of the initiating clock sequences are set forth such as the STA, INSTF, and EA as these must occur before the system can branch into the special searching and sum reduction operations. It will further be apparent by referring to the drawings that many of the specific clock pulses are disclosed which are indicated in the following List of Abbreviations but which are not explained in the present specification as they are not germane to the present invention. For a specific description of these clock sequences, reference should be made to the previously specified copending application.

LIST OF ABBREVIATIONS

Start Clock—STA
Instruction Fetch—INSTF
Effective Address—EA
Vector Expand—VEXPD
Vector Compress—VCMPS
Search for Largest-Smallest—LGSM
Single Word Fetch—SWF
Vector Direct Fetch—VDF
Zero $\delta$ Fetch
Vector Indirect Fetch—VIF
Single Word Store—SWS
Vector Direct Store—VDS
Vector Indirect Store—VIS
Sum Reduction—SR
Floating Sum Reduction—FSR
Floating Point Shift—FPS
Uppermost One—UMO
Floating Point Add—FAD

START CLOCK

[No FF associated with this clock]

STA–1: Initiated manually (pushbutton) resets all Control flip-flops, →STA–2
STA–2: Test for "on" condition of Instruction Clock flip-flops. If any one is on, →STA–3. If all are off, →INSTF–1
STA–3: Delay only →STA–2

Note that at the end of all instruction routines (FAD, VEXPD, VCMPS, VRFSM, VSLG, VSSM, VSTX and VSTY) the control is returned to STA–2.

INSTRUCTION FETCH (INSTF)

[No FF associated with this clock]

INSTF–1: Gate Instruction Counter Register to $A_2$, →INSTF–2
INSTF–2: Start Single Word Fetch Clock. Set SWF FF to "1." Set Odd Numbered Z Output Ring to one. Increment Instruction Counter Register, →INSTF–2A
INSTF–2A: Test SWF FF. If on "1," →INSTF–2B. If on "0," →INSTF–3
INSTF–2B: Delay only →INSTF–2A
INSTF–3: Gate $Z^1$ to IR (Instruction Register), →INSTF–4
INSTF–4: Test the left hand bits of the OP code. If "01," →INSTF–5. If "001," →INSTF–5A
INSTF–5: Start Effective Address Clock. Set EA FF to "1," →INSTF–5B
INSTF–5A: Test output of IR Decoder for instructions VEXPD, VCMPS, VRFSM, etc., and branch accordingly
INSTF–5B: Test output of IR Decoder. If VSLG or VSSM, →LGSM Clock. If UMO, →UMO Clock. If not VSLG, VSSM or UMO, →INSTF–5C
INSTF–5C: Test EA FF. If on "1," →INSTF–5D. If on "0," →INSTF–6
INSTF–5D: Delay only →INSTF–5C
INSTF–6: Gate $I_2$ field (4 bits) from Instruction Register to Index Address Register, Set IR W FF to "Read," →INSTF–7
INSTF–7: Gate selected Index Register to $\delta$, →INSTF–8
INSTF–8: Test "Vector Fetch" output lines of IR Decoder and Vector Indirect bit. If "vector fetch," INSTF–8A. If "direct store," →Vector Direct Store Clock (VDS)
INSTF–8A: Start VDF Clock →INSTF–8B
INSTF–8B: Test VDF FF. If on "1," →INSTF–8C. If on "0," →INSTF–9

INSTF–8C: Delay only →INSTF–8B

INSTF–9: Test Instruction Decoder. If VUFA, →FAD–1. If VFAD, →FAD–1. If VFSB or VUFS, invert sign bits of Z, →FAD–1. If VFAM or VUAM, set sign bits of Z to zero, →FAD–1. If VFSM or VUSM, set sign bits of Z to one, →FAD–1

EFFECTIVE ADDRESS CLOCK (EA)

EA–1: Gate $I_1$ field (4 bits) from Instruction Register to Index Address Register (this selects Index Register). Set IRW FF to "Read," →EA–2

EA–2: Gate Index Register to Adder A. Gate low order 18 bits of Instruction Register to Adder A. Sum will appear in Register $A_2$. If 13th bit is a "1," →SWF Clock. Note the SWF–5 returns control back to EA–3. If 13th bit is a "0," →END (Turn off EA FF)

EA–3: Gate low order 23 bits of $Z^1$ to right hand end of Instruction Register, →EA–1

SEARCH FOR LARGEST OR SMALLEST CLOCK (LGSM)

[This clock is started when either a VSLG or VSSM instruction is found after step INSTF–5B]

LGSM–1: Set v Input Ring to zero, →LGSM–1A

LGSM–1A: Gate a one to $v_0$. Gate s to remaining 16 v's, →LGSM–2

LGSM–2: Set #0 position of X Output Column Selector. If VSLG, →LGSM–2A. If VSSM, →LGSM–2B LGSM–2A: Gate inverted X Register Column Output to AND Unit (note: X Column Output includes w). Gate v to AND Unit. Gate AND Unit to p, →LGSM–3

LGSM–2B: Gate X Column Output to AND Unit. Gate v to AND Unit. Gate AND Unit to p, →LGSM–3

LGSM–3: Gate ORed output to p to "i" FF. If all bits of p are "0," "i" will be set to "0." If any bit of p is a "1," "i" will be set to "1," →LGSM–4

LGSM–4: If "i" FF is "1," gate p into v. If "i" FF is "0," do nothing, →LGSM–5

LGSM–5: Set Counter J to zero, →LGSM–9

LGSM–6: If "i" FF is "1," gate X Column Output to AND Unit. Gate v to AND Unit. Gate output of AND circuit to p if "i" FF is "0," gate inverted output of X Column Output to AND Unit. Gate v to AND Unit. Gate output of AND Unit to p, →LGSM–7

LGSM–7: If any bit of p is "1," →LGSM–8. If all bits of p are "0," →LGSM–9

LGSM–8: Gate p to v, →LGSM–9

LGSM–9: Advance X Output Column Selector, →LGSM–10

LGSM–10: Increment Counter J, →LGSM–11

LGSM–11: Test Counter J. If J does not equal 36, →LGSM–6. If J equals 36, →LGSM–12

LGSM–12: Test for "off" condition of EA FF. If "1," →LGSM–12A. If "0," →LGSM–12B LGSM–12A: Delay only →LGSM–12

LGSM–12B: Gate $I_1$ to Index Address Register. Set IR W FF to "WRITE," →LGSM–12C LGSM–12C: Gate $A_2$ to Index Register Test $v_0$. If one, →LGSM–13D. If zero, →LGSM–13

LGSM–13: Set IR W FF to "Read." Reset v Index Register to zero, →LGSM–13A

LGSM–13: Set v Index Register to locate index of uppermost one in v, →LGSM–13B

LGSM–13B: Gate v Index Register to Adder A. Gate Index Registers to Adder A (sum will appear in Register $A_2$), →LGSM–13C LGSM–13C: Gate $I_2$ to Index Address Register. Set IR W FF to "Write," →LGSM–13D LGSM–13D: Gate $A_2$ to Index Registers. Reset VSLG and VSSM FF's to "0," →STA–2

SINGLE WORD FETCH (SWF)

[Address in $A_2$. Data goes to $Z^1$]

SWF–1: Set A Matrix Input Ring to one. Set A Matrix Output Ring to one. Set Odd Numbered Z Input Ring to one, →SWF–1A SWF–1A: Gate Register $A_2$ to Register $A_3$, →SWF–2

SWF–2: Test for busy ($A_3$ only). If busy, →SWF–3. If not busy, →SWF–4

SWF–3: Delay only →SWF–2

SWF–4: Gate Register $A_3$ to MAR A Transfer line. If EA FF is "on," reset Odd Numbered Z Output Ring to one. Set Read Access FF, →SWF–5

SWF–5: →END. Turn off SWF FF. If EA FF is on "1," also →EA–3

SUM REDUCTION (SR)

[Entered from FPS–10]

SR–1: Gate s to v. Set $v_0$ to one, →SR–2. Set X Column Reset Selector bits 1–8, →SR–3

SR–3: X Column Reset, →SR–6

SR–6: Set X Column Output Selector on zero, →SR–7

SR–7: Gate s to AND Unit. Gate "1" to 0 position of AND Unit. Gate X Column Output to AND Unit. Gate AND Unit to v. Set bits 1–35 of X Column Complement Selector to "1"

SR–8: Complement X array [positions will be complemented where v contains "1's" (negative numbers) and X Column Complement Selector contains "1's" (positions 1–35)]. Set Tree Accumulator to zero, →SR–9

SR–9: Pulse the Counting Network associated with v [this will place the sum of the sign bits ("1") of the negative numbers in the Tree Accumulator at the bottom of the Counting Network (FIG. 11)], →SR–10

SR–10: Set X Column Output Selector to 35. Set Counter J to 35, →SR–11

SR–11: Gate s to AND Unit. Gate a "1" to "0" position of AND Unit. Gate Column Output of X to AND Unit. Gate AND Unit to v, →SR–12

SR–12: Pulse Counting Network associated with v. Add output of Counting Network to contents of Tree Accumulator, →SR–13

SR–13: Gate the right hand end of the Tree Accumulator into the j position of w, →SR–14

SR–14: Decrement Counter J. Decrement X Column Output Selector, →SR–15

SR–15: Test Counter J. If negative, →SR–16. If zero or greater, →SR–11

SR–16: Test $w_0$ bit. If a "1" (which indicates negative number), →SR–17. If a "0" (which indicates positive number), →SR–19

SR–17: Complement w except sign bit ($w_0$), →SR–18

SR–18: Increment w (add 1 to w), →SR–19

SR–19: Test output of OR circuit across bits 1 through 8 of w. If OR circuit has output, →SR–20. If OR circuit does not have output, →SR–21

SR–20: Shift bits 1 through 35 of w one position to the right. Increment e Register, →SR–19

SR–21: Gate e Register to bits 1 through 8 of w, →SR–22

SR–22: Test output of OR circuit across bits 9 through 35 of w (fraction portion). If output is "0," →SR–23. If output is not "0," →SR–24

SR–23: Set bits 1 through 8 of w (exponent field) to zero. Turn off VRFSM and SR FF's, →STA–2

SR–24: Test bit 9 of w Register. If "1," →SR–26. If "0," →SR–25

SR–25: Shift bits 1 through 35 (fraction portion) of w one position to the left. Decrement e Register, →SR–24

SR–26: Gate e Register to bits 1 to 8 of w. Turn off VRFSM and SR FF's, →STA–2

FLOATING SUM REDUCTION (FSR)

[Turn on when VRFSM instruction detected after INSTF–5A executed]

FSR–1: Gate s to v. Gate a "1" to $v_0$, →FSR–2

FSR–2: Set e Register to zero. Set $Y^1$ to 0. If $v_1$ equals 1, set $Y^1$ to 0. If $v_1$ equals 0, do nothing, →FSR–3

FSR–3: Set X Column Input Selector to zero. Set X Column Complement Selector to one. Set e Register Input Ring to zero. Set Counter J to on e. Set X Column Output Se'ector to one, →FSR–4

FSR–4: Gate X Column Output to AND Unit. Gate v to AND Unit. Gate output of AND Unit to p, →FSR–5

FSR–5: Test p. If p contains a "1," →FSR–6. If there are no "1's" in p, →FSR–9

FSR–6: Gate s to v. Set $v_0$ to one, →FSR–7

FSR–7: Complement Column $X_j$, →FSR–8

FSR–8: Set $j-1$ bit of e to one (note: e Register Input Ring starts at zero), →FSR–9

FSR–9: Gate v to p, →FSR–10

FSR–10: Gate s to v. Set $v_0$ to one, →FSR–11

FSR–11: Gate X Column Output to X Column Input (note: Bits #1 through #8 of each row of X constitute a Counter which can be decremented by the injection of a "1" in any position. The input to each Counter is under the control of the v bit as usual), → FSR–12

FSR–12: Gate p to v, →FSR–13

FSR–13: Increment Counter J. Advance X Column Output Selector. Advance X Column Input Selector. Advance X Column Complement Selector. Advance e Register Input Ring, →FSR–14

FSR–14: Test Counter J. If $j=9$, turn off FSR FF, → FPS–1. If $j$ is not equal to 9, →FSR–4

FLOATING POINT SHIFT (FPS)

[The value of shifts are in bits 1 through 8 of X]

FPS–1: Set Counter J to zero. Set FF "4" (FIG. 22) to "1". Set X Column Column Output Selector to one, →FPS–2

FPS–2: Gate s to AND unit. Gate a "1" to 0 position of AND Unit. Gate X Column Output to AND Unit. Gate AND Unit to v, →FPS–3

FPS–3: Advance X Column Output Selector. Increment Counter J, →FPS–4

FPS–4: Test Counter J. If on 3, →FPS–5. If not on 3, →FPS–2

FPS–5: Reset X array (rows will be reset where v bits are "1"), →FPS–6

FPS–6: Set Counter J to one. Set Multiple Shift Right Ring to 16. Set X Column Output Selector to 4, →FPS–7

FPS–7: Gate X Column Output to AND Unit. Gate a "1" to 0 position of AND Unit. Gate s to AND Unit. Gate AND Unit to v, →FPS–8

FPS–8: Apply pulse to Multiple Shift Right Unit, →FPS–9

FPS–9: Increment Counter J. Advance X Column Output Selector. Advance Multiple Shift Right Ring, →FPS–10

FPS–10: Test Counter J. If $J=6$ and VRFSM FF is on "1," set FPS FF to "0," set SRFF to "1," and →SR–1. If $J=6$ and FAD FF is "1," turn off FPS FF. (note: if FAD is running, it checks FPS for completion). If J is not equal to 6, →FPS–7. If $J=6$, turn off FF "4" (FIG. 22)

UPPERMOST ONE CLOCK (UMO)

UMO–1: Gate u to AND Unit. Gate a "0" to 0 position of AND Unit. Gate s to AND Unit. Gate AND Unit to v, →LGSM–12

SECTION 7

*Detailed description of system operations*

The following detailed description of the system operations is organized in the same sequence as the Timing Sequence Charts. It should be clearly understood that this sequence is not critical other than the first three or initiating sequences; the Start (STA), Effective Address (EA) and Instruction Fetch (INSTF). These are necessary to initiate operation of the system once data and programs or instructions have been appropriately supplied to the system in a conventional manner.

It will be apparent that there may be many branch points in the system controls depending on the particular operation being performed at any given time. All of the branches and the tests made to ascertain the ultimate control direction are clearly explained subsequently, it being noted that branch points are quite obvious from the Timing Sequence Charts.

A number of the clock routines disclosed in the present appliaction are used in sereval different operation cycles of the overall system such as the Floating Point Shift (FPS). All of the clock sequences necessary to the performance of the present invention are specifically described in this section. Other clock sequences used in the overall system which are clearly indicated in the drawings are described in detail in the previously referenced copending application.

In the subsequent description wherever reference numbers are used, an indication of the drawing or figure number on which the referred-to element is shown is set forth. However, when a number of reference characters are on the same figure, only the first of such group will be specifically related to such figure.

START CLOCK (STA)

The operation of this clock sequence, in effect, initiates operation of the present system. Under control of the Start Clock, all the Control flip-flops are reset to "0." These include all of the flip-flops shown on FIGURE 5 shown connected to the gate circuits G40 and G42 including the VEXPD, VCMPS, VRFSM, VSLG, VSSM, VSTX, VSTY, and also the FAD flip-flop. Also included are the clock sequence initiating flip-flops, the Single Word Fetch flip-flop, the Effective Address flip-flop and the Vector Fetch flip-flop. However, only the VSLG, VSSM and VRFSM flip-flops apply to the present invention and only their operation will be specifically described herein. As will be noticed, the Start Clock is initiated by a manual means, such for example, as a push button. The control could obviously be some sort of conventional signal at the end of the tape input for the system wherein instructions and data are loaded into the system.

The clock stage STA–1 performs the operations just stated, i.e., resetting all of the Control flip-flops, and on turnoff, initiates clock stage STA–2. STA–2 tests for the on condition of the Instruction Clock flip-flops which were just enumerated above whose inputs are shown connected to the gate circuits G40 and G42. If any of these flip-flops are on or set to a "1" condition, an output will appear on the output line from OR circuit R52 which output is inverted and supplied to gate circuit G54 together with the noninverted output from said OR circuit to initiate either clock stage STA–3 (if one of the clocks is still in its "1" state or to INSTF–1 if all are in their "0" state). Clock stage STA–3 is merely a time delay stage which has no output pulse as such but which on turning off reinitiates clock stage STA–2 to allow time for the particular Instruction Clock sequences which have been previously initiated to be completed. Once all such stages have been completed, the system returns to the clock sequence INSTF–1 or the Instruction Fetch sequence which accesses a new series of instruction from memory and continues the operation of the system.

INSTRUCTION FETCH

This operation is largely conventional in nature in that it specifies the means by which the specific system instructions are brought out of memory, placed in the Instruction Register and subsequently executed.

The description of this system will follow the format of the description of the previous clock sequences in that it should be read with reference to that portion of the Timing Sequence Chart entitled Instruction Fetch (INSTF).

Clock step INSTF–1 is initiated by the turnoff of STA–2 (Start Clock). The turnon of this stage is applied to gate G32 which gates the contents of the 18 bit Instruction Counter shown in FIGURE 5 to the Register A2 shown in FIGURE 2. The turnoff INSTF–1 initiates INSTF–2. The turnon of INSTF–2 is applied to OR circuit R28 which sets the Single Word Fetch flip-flop to a 1. This initiates the Single Word Fetch Clock as shown on FIGURE 5. It also sets the Odd Numbered Z Output Ring to 1, FIGURE 1. The last operation is an incrementing of the Instruction Counter Register by 1 which, in effect, places the address of the next instruction word in this register for such time as it is necessary to access same. The turnoff of clock stage INSTF–2 initiates clock stage INSTF–2A. The turnon of INSTF–2A is applied to gate G34 which tests to see if the Single Word Fetch flip-flop is still set to 1. If it is, it initiates clock stage INSTF–2B which is merely a delay stage which returns to INSTF–2A. What this clock stage does is to give the Single Word Fetch Clock time to complete itself at which time the Single Word Fetch flip-flop will be reset to 0. At this time clock stage INSTF–3 will be initiated. The turnon of INSTF–3 gates the contents of Register Z 1, FIGURE 1, to the Instruction Register (this is because the Odd Numbered Z Output Ring had been set to a 1 in clock stage INSTF–2). The contents of the Z Register are gated out through gate G36 on FIGURE 5. The turnoff of INSTF–3 initiates INSTF–4.

INSTF–4 is applied to gate circuit G38 which tests the left-hand bit positions of the operation code. An output from AND circuit A18 indicates that the first two bit positions are "01" thus branching this system to clock stage INSTF–5. An output from AND circuit A20 indicates that the numbers "001" appear in these bit positions and branches the system to clock stage INSTF–5A all shown on FIGURE 5.

The turnon of INSTF–5 initiates the Effective Address Clock by setting the Effective Address flip-flop to a "1." The turnoff of INSTF–5 initiates INSTF–5B.

The turnon of clock stage INSTF–5A is applied to gate circuit G40 which tests for certain outputs from the Decoder as indicated on FIGURE 5. If one of the tested lines is up, the appropriate flip-flop shown also on this figure connected to each of the output lines of gate G40 is set to a 1. The setting of these various flip-flops to a "1" will initiate their respective clock stage sequences as will be apparent from referring to this Timing Sequence Chart for the indicated clock sequence and also from the subsequent description of these particular clock sequences. As indicated, the system is branched depending upon the tests made by this clock stage, therefore, there is no turnoff pulse as such.

The next clock stage is INSTF–5B which, as will be remembered, was initiated during clock stage INSTF–5. The turnon of this clock stage is applied to gate circuit G42 and tests the output of the Decoder of FIGURE 5 for the occurrence of the Search for Largest (VSLG) or Search for Smallest (VSSM), either of which output is applied to OR circuit R34, an output from which is effective to initiate the Search for Largest and Search for Smallest Clock (LGSM). The application of the turnon pulse of INSTF–5B to G34 also tests for the occurrence of an output on the VUMO line from the Decoder on FIGURE 5 which is the test for uppermost one. If this line is up, clock sequence Search for Uppermost One (VUMO) Clock sequence is initiated. If neither of these three lines, i.e., VSSM, VSLG, or VUMO is active, the system will branch to clock stage INSTF–5C. The turnon pulse of INSTF–5B is also applied to gate G42 which sets the appropriate flip-flops, i.e., VSLG, VSSM, or VSTX, or VSTY, to their "1" states thus initiating the appropriate clock sequences.

The turnon of clock stage INSTF–5C is applied to gate circuit G46 which tests the setting of the Effective Address flip-flop. If this flip-flop is set to a "1," INSTF–5D is initiated which enters a delay loop to enable the Effective Address Clock sequence to be completed which completion will result in the setting of the Effective Address flip-flop back to a "0." The occurrence of this latter condition causes the output of G46 to initiate clock stage INSTF–6.

The turnon of INSTF–6 is applied to gate G48 which gates the 4 bit binary number in the I2 field of the Instruction Register as indicated in FIGURE 5 to the Index Address Register shown on FIGURE 2. This clock pulse also sets the Index Register Right flip-flop to a "0" (Read) also on FIGURE 2. The turnoff of INSTF–6 initiates INSTF–7. The turnon pulse of INSTF–7 is applied to gate G50 which gates the contents of the Index Register selected by its associated Decoder to the δ Register also on FIGURE 2.

The turnoff of INSTF–7 initiates INSTF–8

It is the function of this clock stage to test to see if a Vector-Fetch operation is to be performed, i.e., a plurality or 16 numbers to be fetched from or stored in memory. Additionally, this stage tests to see if the addressing is going to be direct or indirect. It will be noted that all of the operations coming out of the Instruction Register Decoder which require a Vector-Fetch are ORed together in OR circuit R36, the output of which is ANDed in the two AND gates A22 and A24, the other inputs to which come from the 12th bit position of the Instruction Register which is set in accordance with whether an address for an operation is to be direct or indirect. As will be apparent, the Direct Fetch Output is from A24 and the Indirect Fetch Output from A22. The same applies to the Vector Store operation which is applied to OR circuit R38 and in turn ANDed in AND circuits A26 and A28, which determine first whether a Vector Store operation is to occur and if so, if it is to be performed as a direct or indirect address. The outputs of the AND circuits A22, A24, A26, and A28 are in turn ANDed with the turnon pulse of INSTF–8. If the operation called for is an Indirect Fetch, Direct Fetch, or Indirect Store, an output from OR circuit R140 initiates the Vector Fetch Clock (VF). If an output from AND circuit A36 had occurred, indicating a Direct Store operation, the system branches to the Store Clock (VDS).

Assuming that clock stage INSTF–8A is initiated, the turnon of this stage sets the Vector Fetch flip-flop to a "1" which initiates the first stage of the Vector Fetch Clock. The turnoff of INSTF–8A initiates INSTF–8B which in turn tests for the completion of the Vector Fetch Clock sequence which will reset the Vector Fetch flip-flop to a "0." The turnon of INSTF–8B branches to INSTF–8C if the Vector Fetch flip-flop is still in the "1" condition. Stage INSTF–8C as with the previously described time delay sequences merely allows time for the Vector Fetch Clock sequence to be completed. As soon as this operation is completed and the Vector Fetch flip-flop is reset to a "0," the initiation of clock stage INSTF–8B will cause the system to branch to clock stage INSTF–9.

The turnon of INSTF–9 tests the Decoder for the Instruction Register. It will be noticed that this pulse is applied to gate circuit G52 which tests for the indicated outputs of the Instruction Register Decoder. If the operation called for is an Unnormalized Floating Add (VUFA) or a Normalized Floating Add (VFAD), OR circuit R42 produces an output which branches the system directly to the Floating Add Clock sequence or FAD–1. If a Normalized or Unnormalized Floating Point Subtract (VFSB, VUFS) is called for, an output from OR circuit R44 occurs which causes the sign bits of all the Z Registers to be inverted and the system then branches to the Floating Add Clock. If the operation called for is a Normalized Floating Add Magnitude or Unnormalized Floating Add Magnitude (VFAM, VUAM), a pulse appears on line R46 which causes the sign bits of the Z Register to be set to a 0 and the system then branches to the Floating Add Clock. And finally, if the operation called for is a Normalized or Unnormalized Subtract Magnitude operation (VFSM, VSUM), an output appears from OR circuit R48 which causes the sign bits of the Z Register to be set to ones and the system then branches to the Floating Add Clock. It will be noted that the outputs of OR gates R42, R44, R46, and R48 are in turn ORed in OR gate R50 to initiate the Floating Add Clock sequence. The output from R50 also causes the FAD flip-flop to be set to a "1" (all on FIGURE 5).

EFFECTIVE ADDRESS CLOCK

The purpose of this clock sequence is to develop an address from information provided in the instruction. It will be noted from the description of the Instruction Fetch Operation, the Effective Address Clock is initiated by the said Instruction Fetch Operation. The turnon of clock stage EA–1 gates the I1 field (4 bits) from the Instruction Register on FIGURE 5 to the Index Address Register of FIGURE 2. This is done by applying the turnon pulse of clock EA–1 to gate G24 on FIGURE 2. Since on FIGURE 2, the turnon pulse of the EA–1 is applied to OR circuit R26, the output of which sets the Index Register Write flip-flop to a "0." This setting indicates that there is to be a recycle in the Index Register. The turnoff of EA–1 initiates clock stage EA–2, the turnon of which gates the contents of the selected position of the Index Register through gate circuit G26 into Adder A. Also, gate the low order 18 bits of the Instruction Register indicated on FIGURE 5 through gate circuit G28 of FIGURE 2 into Adder A. The two inputs to Adder A will automatically be added and the sum will appear in the Register A2 on FIGURE 2. The fall of EA–2 is applied to gate G30 to test the contents of the 13th bit position of the Instruction Register (counting from the left) and if this bit position contains a 1, the control branches through OR circuit R28 and sets the Single Word Fetch flip-flop to a 1 which, as is indicated, initiates clock step SWF–1. If the 13th bit position of the Instruction Register had been set to a 0, an input would be supplied to OR circuit R30, the output of which sets the Effective Address flip-flop to a 0.

Assuming that the 13th bit position contained a 1 and the system branches to the Single Word Fetch Operation, upon the end of this operation clock stage EA–3 is turned on. The turnon pulse from this clock stage is supplied to gate 23 which gates the low order 23 bits from the Odd Numbered Z Register. The fall of EA–3 returns control to EA–1. As will be apparent, this clock sequence will recirculate until a 0 finally appears in said 13th bit position. It will be noted that on each cycle, however, a new number is transferred into the low order 23 bit positions from the odd numbered Z Registers and ultimately, a 0 will, in fact, appear in the particular bit position which will stop the recirculating of this particular clock sequence.

SEARCH FOR LARGEST-SMALLEST CLOCK

This clock sequence performs the search for the largest or smallest number in any 17 member or less vector. The actual clock sequences list in the Timing Sequence Chart, i.e., Largest and Smallest, are combined for these two operations since if all of the numbers of a particular sequence happen to be negative, the one with the smallest absolute value would, for example, be the largest number, and the one with the largest absolute value would be the smallest number. Therefore, the actual clock sequence is the same for both operations, although, as will be noted in the subsequent description of this clock sequence, the Instruction Register Decoder puts out a separate signal on the indicated output lines on FIGURE 5 which are VSLG (Search for Largest) and VSSM (Search for Smallest) which output lines set the VSLG or VSSM flip-flops to a "1," either of which setting initiates clock stage LGSM–1.

The initiation of LGSM–1 sets the v Register Input Ring on FIGURE 11 to a 0 and on turning off, initiates clock stage LGSM–1A. This stage causes a pulse to be gated through gate circuit G66 and OR circuit R72 to set the $v_0$ position of the v Register still on FIGURE 11 to a "1." The LGSM–1A pulse is also applied to gate circuit G80 on FIGURE 20 to gate the contents of the s Register through cable C71 to the v Register on FIGURE 11. What this does is transfer the contents of the s (screen) Register to the v Register in positions $v_1$ through $v_{16}$. This binary combination, in effect, indicates which of the numbers of a particular 17 member vector, which are assumed to be stored in the X Registers, will actually be considered during the comparison operation as was indicated in the previous general description of the Search for Smallest and Search for Largest operations. As will be remembered in this previous description, a 0 in the screen number indicates that a particular member is not to be considered in the search.

Clock stage LGSM–1A on turning off initiates clock stage LGSM–2. The turnon of LGSM–2 is applied to OR circuit R74 on FIGURE 15, the output of this OR gate sets the 0 position of the X Register Output Column Selector. The pulse from LGSM–2 is also applied to gate circuit G82 on FIGURE 5 to determine whether the VSLG or VSSM flip-flops are set to a "1." If VSLG flip-flop is set, the system branches to clock stage LGSM–2A, and if the flip-flop VSSM is set to a "1," the system branches to clock stage LGSM–2B. Assuming the former condition and LGSM–2A is initiated, the turnon of the stage is applied to OR circuit R76 which gates the X Register Column on FIGURE 15, said column being selected by the setting of the Column Output Selector through the gate circuit G84 and thence over cable C72 to the AND Unit on FIGURE 12. As will be understood, the registers shown on FIGURE 15 are necessarily schematic in nature. Referring momentarily to FIGURE 6, it will be seen that the output from the Column Output Ring is applied to gate G86, the output of which is placed on the Column Output line which is shown both on FIGURE 6 and also on FIGURE 15. Next, LGSM–2A is applied to OR circuit R78 which applies a pulse to G88 on FIGURE 11 to gate the contents of the v Register over cable C73 to the AND Unit on FIGURE 12. It will be noted referring to FIGURE 12 and specifically to cable C73 that the "0" lines of this cable are supplied to the OR circuit R80 and the "1" lines are applied to OR circuit R82. The outputs of both of these OR circuits R80 and R82 are applied to the AND Unit. It should be noted that the output of the X Register Column Output lines are inverted by applying the "0" lines to the AND circuits, i.e., A38 of the AND Unit. The other input to these AND gates comes from the OR circuit R82. It should also be noted that the "1" lines of the X Column Output Line C72 are applied to the OR circuits, i.e., R84 of the AND Unit still on FIGURE 12. The other input to these OR circuits comes from OR circuit R80. LGSM–2A is also applied to OR circuit R86 which gates the contents of the AND Unit through gate circuit G90 and over cable C74 to the p Register on FIGURE 9. It will be noted still referring to FIGURE 9, that the output of cable C74 is applied to, for example, OR circuits R88 and R90 to set either the "1" or the "0" side of the individual register stages of the p Register in accordance with the signals appearing on the output from the AND Unit on FIGURE 15. The turnoff of LGSM–2A initiates clock stage LGSM–3.

Assume now that clock step LGSM– 2B had been initiated on clock stage LGSM–2, the turnon of this stage is applied to OR circuit R92, whose output is in turn applied to gate circuit G92, which gates an X Register column over line C75 to the OR circuit R94 and thence to the AND Unit on FIGURE 12. It should perhaps be noted at this time that the function of the gate circuits G84 and G92 and the OR circuit R94 allows, in effect, an inverted output of the X Register Output Column to be transferred to the AND Unit when a Search for Largest operation is being initiated and the non-inverted contents of said X Register Column to be transmitted to said AND Unit when a Search for Smallest operation is being initiated. The pulse from LGSM–2B is also supplied to OR circuit R78, thence to gate G88 to gate the contents of the v Register to the AND Unit on FIGURE 12, and next, the LGSM–2B is supplied to OR circuit R66 and thence to gate G90 to gate the contents of the AND Unit to the p Register on FIGURE 9. The turnoff of LGSM–2B initiates LGSM–3. The turnon pulse of LGSM–3 is supplied to gate G94. It will be noted that the other two inputs to this gate circuit come from OR circuit R96 and also inverter 110, which, as will be apparent from FIGURE 9, provides an output if any position of the p Register contains a "1." If a "1" is present in the p Register, the "*i*" flip-flop on FIGURE 9 will be set to a "1." If on the other hand all of the bits of the p Register are 0, the "*i*" flip-flop will be set to a "0." The turnoff of LGSM–3 initiates clock stage LGSM–4. The turnon of LGSM–4 is applied to gate G96 which is connected to the "1" side of the "*i*" flip-flop. If the "*i*" flip-flop is set to a "1," the output from G96 is applied to OR circuit R98 and thence to gate G98 which gates the entire contents of the p Register over cable C77 to the v Register on FIGURE 11. Thus, the contents of the p Register are copied or transmitted to the v Register. It should be noted at this point that if the "*i*" flip-flop had been set to a "0," there would have been no output from gate circuit G96 and at this point the contents of the p Register would not have been transferred to the v Register. The turnoff of LGSM–4 initiates clock stage LGSM–5.

The turnon of LGSM–5 sets the Counter J on FIGURE 7 to a zero and on turning off, initiates clock stage LGSM–9. The turnon of LGSM–9 is applied to OR circuit R100 which advances the X Column Output Selector by one position. The turnoff of LGSM–9 turns on LGSM–10.

The turnon of LGSM–10 is applied to OR circuit R68 to increment the Counter J and an turnoff, initiates clock stage LGSM–11. LGSM–11 is applied to gate circuit G100 which tests whether or not the Counter J contains a 36 or not. If the number is not 36, the system branches to LGSM–6. If the number equals 36, the system branches to LGSM–12.

Assuming that the system at this particular point branches to clock stage LGSM–6. This state in turning on supplies a pulse to gate circuit G102 which tests the setting of the "*i*" flip-flop. If this flip-flop is set to a "1," the output from gate G102 is fed to OR circuit R92 and the selected column of the X Register is transferred to the AND Unit in its true form as in step LGSM–2B. If on the other hand the "*i*" flip-flop is in its "0" state, the selected column of the X Register is transferred to the AND Unit in its inverted form as in step LGSM–2A. In either of the above instances after the transfer of the selected column of the X Register is transferred, the contents of the v Register are transferred to the AND Unit and the output of the AND Unit is transferred to the p Register as in both steps LGSM–2A and LGSM–2B. The turnoff of LGSM–6 initiates clock stage LGSM–7.

The turnon of LGSM–7 is applied to gate circuit G104. This step tests for the existence of a "1" in the output of OR circuit R96 as was described previously with respect to clock stage LGSM–3. If a "1" is present in this output from OR circuit 96, which, as will be remembered, tests the setting of the p Register, the system branches to clock step LGSM–8. If there is no output from OR circuit R96, the system will branch to clock step LGSM–9.

Assuming that the system now branches to clock stage LGSM–8, this clock pulse is applied to OR circuit R98 and thence to gate circuit G98 which gates the contents of the p Register over cable C77 on FIGURE 9 to the v Register on FIGURE 11. The turnoff of clock stage LGSM–8 also branches to clock stage LGSM–9 as did the turnoff of clock stage LGSM–5.

Going back now to the test made in clock stage LGSM–11, it will now be assumed that the Counter J is set to 36 and the output from gate circuit G100 branches the system to clock stage LGSM–12. Clock stage LGSM–12 tests the condition of the Effective Address flip-flop on FIGURE 5. LGSM–12 is applied to gate circuit G106. If the Effective Address flip-flop is set to a "1," the system branches to LGSM–12A. If the Effective Address flip-flop is set to a "0," the system branches to LGSM–12B. If the Effective Address flip-flop is set to a "1," this means that the Effective Address Clock is currently running and attempting to extract an address which requires that the current clock sequence be held up until the Effective Address sequence is completed. Therefore, LGSM–12A is inserted for the purposes of delay only and upon turning off, re-initiates clock stage LGSM–12 wherein the condition of the Effective Address flip-flop is again tested and this process repeted until a "0" condition of the flip-flop occurs. At this point the system branches to clock stage LGSM–12B.

This clock stage pulse is applied to OR circuit R102 and thence the gate circuit G24 all on FIGURE 2 to gate the contents of the I1 field of the Instruction Register on FIGURE 5 into the Index Address Register on FIGURE 2 through said gate circuit G24. Pulse LGSM–12B is also applied to set the Index Register Right flip-flop to a "1" which, as will be apparent from the drawing (FIGURE 2), provides a write instruction to the Index Register. The turnoff of LGSM–12B initiates clock stage LGSM–12C.

The turnon of LGSM–12C causes the contents of the $A_2$ Register on FIGURE 2 to be gated into the appropriate position of the Index Register through gate circuit G108. The register position into which this latter number will be entered is determined by the address just gated into the Index Address Register during clock stage LGSM–12B.

Referring now to FIGURE 11, the clock pulse LGSM–12C is applied to gate circuit G110 which will test the position $v_0$ to determine the setting thereof. If the $v_0$ position of the v Register is set to a "1," an output pulse is applied from the gate circuit G110 on FIGURE 11 to OR circuits R104 and R106 on FIGURE 5 to set the VSLG and VSSM flip-flops to a "0" depending upon which of these flip-flops was previously on. If, on the other hand, the $v_0$ flip-flop is set to a 0, the output of gate circuit G110 causes the system to branch to clock stage LGSM–13.

The turnon of LGSM–13 is applied to OR circuit R26 on FIGURE 2 which sets the Index Register Right flip-flop to a "0" or its read state. LGSM–13 also sets the v Index Register on FIGURE 14 to 0. The turnoff of clock stage LGSM–13 initiates clock stage LGSM–13A.

The turnon of clock stage LGSM–13A is applied directly to AND circuits A40 and A42 which initiate a test for the uppermost "1" stored in the v Register. It will be noted that the v Register is shown on FIGURE 11 and in block form a block is shown labeled "Upper Most Circuits." This block is shown in FIGURE 14 in the right-hand section thereof which contains the two AND circuits A40 and A42. It will be apparent to a person skilled in the art that depending upon the first of the horizontal lines feeding the AND circuits directly below AND circuit A40, and A42, which receives a "1" pulse from the associated position of the v Register, will cause a series of pulses to be applied to the large vertical OR gates R108 through R114 to receive a series of pulses which will set the flip-flops in the v Index Register at the bottom of the right-hand portion of FIGURE 14 to automatically store the address of the position of the v Register which contains said "1."

The turnoff of clock stage LGSM–13A initiates clock stage LGSM–13B. The turnon of LGSM–13B is applied to gate circuit G112 which gates the contents of the v Index Register on FIGURE 14 to cable C78 to Adder A on FIGURE 2. Still referring to FIGURE 2, clock pulse LGSM-13B is also applied to gate circuit G26 which gates the currently selected position of the Index Register and transfers same to the Adder A still on FIGURE 2. It should be noted this time that the sum of these two numbers will appear in the Register $A_2$. The turnoff of LGSM-13B initiates clock stage LGSM-13C.

The turnon of LGSM-13C causes the contents of the I2 field of the Instruction Register shown on FIGURE 5 to be transmitted through gate circuit G48 on FIGURE 2 to the Index Address Register on FIGURE 2. Clock stage LGSM-13C is also applied to the Instruction Register Right flip-flop on FIGURE 2 to set same to a "1" or Write command. The turnoff of LGSM-13C initiates clock stage LGSM-13D.

Clock stage LGSM-13D gates the contents of Register $A_2$ to be gated to the Index Register on FIGURE 2 specified by the address currently stored in the Index Address Register. The turnoff of clock stage LGSM-13D is applied to OR circuits R104 and R106 to reset the VSSG and VSSM flip-flops to a "0." The turnoff of these flip-flops, whichever one was previously set to a "1," will subsequently cause the system to branch back into the Start Clock, and more specifically, to Start Clock stage STA-2, which clock stage will cause the system in turn to branch to the Instruction Fetch Clock INSTF-1.

The logic circuitry for performing these tests is shown on FIGURE 5 and was described previously with reference to the description of both the Start Clock sequences and also the Instruction Fetch Clock sequences (STA and INSTF).

The Instruction Fetch is a special Fetching operation which includes the Single Word Fetch whereby, instead of a conventional address being supplied to the A Registers, the content of the Instruction Counter is utilized to develop the desired instruction address and the particular word is transferred from memory temporarily into the $\underline{Z}$ Register, and then is subsequently transferred into the Instruction Register, from which point the actual instruction will be carried out or performed by the system. Only this fetching or memory accessing operation is included herein since it is a part of the Instruction Fetching cycle. The other possible fetching and addressing operations are adequately disclosed in the above referenced copending application and form no part of the present invention.

It will, of course, be assumed in the subsequent description that the Start Clock operation or sequence has been completed before entering into this particular operation.

It will be assumed that the address of the desired data is in Register $A_2$ of the FIGURE 2. It will be remembered that in this operation it is desired to ultimately transfer the data whose address is in Register $A_2$ into Register $\underline{Z}_1$ of FIGURE 1.

It will be noted that in the Single Word Fetch operation it is desired to extract a single word from memory utilizing a single address provided from the instruction.

SINGLE WORD FETCH CLOCK (SWF)

Referring now to the Timing Sequence Chart indicated as the Single Word Fetch, it will be noted that all of the clock steps have the prefix SWF. The turnon of stage clock SWF-1 sets the A Input Ring on FIGURE 2 to a 1 at the indicated reset point, sets the A Output Ring to a 1, and it also sets the Odd Numbered $\underline{Z}$ Input Ring on FIGURE 1 to a 1 again by the indicated input line. The turnoff of SWF-1 initiates SWF-1A. The turnon of this clock stage causes the transfer of the contents of Register $A_2$ to Register $A_3$ through the gate circuit G10. The turnoff of this clock stage proceeds to SWF-2.

This next clock stage tests whether or not the particular Memory Box from which the desired data is to be extracted is currently busy, i.e., performing an operation from some other portion of the program. This is done by means of testing a busy flip-flop one of which is associated with every Memory Box of which the Memory Box shown in FIGURE 3 is exemplary. The busy flip-flop is labelled as such on this figure and the output line from the one side thereof is shown entering the top line of the series of AND gates on FIGURE 23, which figure is labelled "test for busy." It will be noted that there is a line from each busy flip-flop on each Memory Box proceeding into this series of AND circuits as indicated. It will be noted that there is a series of two AND circuit matrices at the top of FIGURE 23, one of which proceeds from Register $A_3$ and the other from $A_1$. The reason for having such series of circuits is that during certain operations, i.e., Vector Fetch or Store addresses are generated two at a time and the provision of these two AND circuit matrices allow a test for busy to be made two at a time. The particular way in which the test for busy is made is that one of the 16 lines coming out of the $A_1$ or $A_3$ Registers is actuated depending upon the particular Memory Box in which a desired piece of information is stored. Thus, if a particular Memory Box is called for, producing an input to one of the AND gates and concurrently therewith an input is received from the particular busy flip-flop line, a signal will be produced from one of the OR circuits R10 or R12. Thus, no output from either of these OR circuits indicates that the particularly addressed memory is not currently busy and a Fetch operation may proceed.

It should also be noted that in the Addressing scheme used with the present system that the last four bits of any address indicate the particular Memory Box in which the desired segment of data is stored, and the first 14 bits of any address represent the actual *x-y* coordinate storage location in the particular Memory Box.

Continuing now with the description of the SWF Clock, on clock stage SWF-2 the turnon of SWF-2 is applied to OR circuit R14 and gate circuit G12 on FIGURE 23 which, depending upon whether or not there is an output from R10, flip-flop F10 will be set to a "1" or a "0." The fall of SWF-2 is applied to gate circuit G14 which branches the system to SWF-3 if the Memory Box were busy and SWF-4 if the Memory Box were not busy. Assuming that the Memory Box was busy and the system branches to SWF-3, this clock stage is merely for purposes of delay and does not have an actuating turnon pulse, but merely after a predetermined period of time produces a pulse on turnoff which is again applied to SWF-2. This cycle will continue until it is determined that the desired memory location is not busy thus actuating the "0" side of F10 to initiate clock stage SWF-4. The turnon of SWF-4 is applied to OR circuit R16 and gate circuit G16 which gates all 18 bits in the Register $A_3$ of FIGURE 2 onto the MAR-A Transfer line. The low four bit portion indicated in FIGURE 2 is transferred into the particular position of the A Matrix specified by the setting of the A Input Ring. In this particular instance it will be remembered that this Input Ring was previously set to a 1. Concurrently, these four bits are placed in the A Address Decoder which selects the particular Memory Box to which the particular address specified by the high 14 bits of the address are to be gated. The A Matrix and the Transfer lines are all shown on FIGURE 2. Referring now to FIGURE 3, the turnon pulse of SWF-4 is applied to OR circuit R18 which in turn causes one input to AND circuit A10. The other input to AND circuit A10 comes from the particular output from the A Address Decoder which is applied to single shot S10, the output of which provides a second input to A10 upon turnon of the single shot. It will be noticed that a second output from the single shot S10 is shown. The function of this is to maintain this line active throughout the memory cycle which as will be seen subsequently allows the various memory operations to be performed. It will be noted that this line is applied to OR circuit 20, one output of which is applied to the busy flip-flop to set same to a "1." This, as will be remembered from the previous description, indicates that this particular Memory Box is now being utilized and any subsequent operations on same must be held up until such operation ceases. Referring back to AND circuit A10, it will be noted that the output is applied to gate G18 which now gates the 14 bit address from the MAR–A Transfer line to the MAR (Memory Address Register) for the memory. The turnon pulse of SWF–4 is also supplied to OR circuit R22, the output of which is supplied to AND circuit A122 whose output is supplied to the Read Access Input to the memory thus indicating that the present cycle is a Read cycle. Still another output of OR circuit R22 is supplied through AND gate A14 which is ANDed with the appropriate line from the A Data Decoder in FIGURE 2 the appropriate output line of which is determined by the address in the first storage location of the A Matrix wherein the address has just been stored. It will be noted that the A Output Ring is sitting on the 1 position to which it was set at the beginning of this Clock, thus, gating the particular address stored in the position A1 of the A Input Ring. The contents are gated into the A Data Decoder through gate circuit G20 as the turnon pulse from SWF–4 is also applied to this gate. The output of A14 is applied to gate G22 which opens a path for transferring data from the MDR to the MDR A Transfer line, which line will subsequently be connected to the $\underline{Z}$ Register to which it is desired to transfer the data.

Referring now to FIGURE 5, the "1" output of the Effective Address flip-flop is ANDed in AND circuit A71 with the turnon pulse of SWF–4. The output of this AND circuit sets the Odd Numbered $\underline{Z}$ Output Ring to 1. The setting of the Effective Address flip-flop is described in the description of the Effective Address Clock sequence. It will be noted that if the Effective Address flip-flop had been set to a "0," the Odd Numbered $\underline{Z}$ Output Ring would not have been reset to a "1."

SWF–4 on turning off initiates SWF–5. It should be noted that data was actually transferred during the latter portion of SWF–4 and is placed in the $\underline{Z}$ Register at the position indicated by the Odd Numbered Input Ring which was set during clock step SWF–1. The fall of SWF–5 goes to OR circuit R24 which resets the Single Word Fetch flip-flop to a 0. This pulse is also ANDed with the "1" setting of the Effective Address flip-flop in AND gate A16, the output of which initiates clock pulse EA–3.

SUM REDUCTION CLOCK

This clock sequence is entered upon the completion of the Floating Point Shift Clock sequence and as will be remembered, 16 numbers are assumed to be stored in the $\underline{X}$ Register as a result of previous operations and an additional 17th number stored in the $\underline{w}$ Register. As further will be remembered, the sign bit is stored in the first or 0 column and since all of the numbers now have a common exponent, the columns 1–8 will be ignored since this exponent is stored in the $\underline{e}$ Register. The significant figures are stored in locations 9–35 of the $\underline{X}$ Register and the $\underline{w}$ Register. It should be noted that the 17 number may have a different sign bit, therefore, the first operation accomplished by this clock sequence is to complement all of the negative numbers so that on subsequent operations, they may be merely added with the other positive numbers without regard to sign as is well understood in the numerical theory of computers. The second portion of the operation accomplished by this clock sequence is the actual parallel addition of all 17 numbers concurrently.

Returning now to a specific description of the Sum Reduction Clock, it will be assumed that the Floating Point Shift operation has been completed and clock stage SR–1 has been initiated.

The turnon of this clock stage is applied to R138 on FIGURE 20, thence to gate G80 to shift the contents of the $\underline{s}$ Register over cable C71 to the $\underline{v}$ Register in positions 1–16. This pulse is also applied to OR circuit R72 to set position $\underline{v}_0$ to a "1." The turnoff of SR–1 initiates SR–2.

The turnon of SR–2 is applied to OR circuit R144 to set positions 1–8 of the $\underline{X}$ Column Reset Selector to a "1." The turnoff of SR–2 turns on SR–3.

The turnon of SR–3 is applied to R146 (FIGURE 15) to the $\underline{X}$ Column Reset line to reset those columns selected by the $\underline{X}$ Column Reset Selector to "0's." Referring briefly to FIGURE 6, this is done by applying the two pulses from the $\underline{X}$ Column Reset Selector and also from the $\underline{X}$ Column Reset line which are applied to AND circuit A56, the output of which is applied to OR gate R56 and thence to gate circuit G60, the other input to which comes from $\underline{v}$ Register in position $\underline{v}_k$. This latter operation requires an input from the $\underline{v}$ Register since that this operation, as all of the vector operations, the $\underline{v}$ Register will contain a mask which will determine which register positions of the $\underline{X}$ Register will be utilized in the various operations.

The turnoff of clock stage SR–3 initiates clock stage SR–6, the turnon of which is applied to OR circuit R74 to set the $\underline{X}$ Column Output Selector to 0 and on turning off, initiates clock stage SR–7.

The turnon of SR–7 is applied to OR circuit R128 and thence to gate circuit G114 to transfer the contents of the $\underline{s}$ Register over cable C79 to the AND Unit on FIGURE 12. On the same figure, the SR–7 pulse is applied to R82 whose output sets the 0 position of the AND Unit to "1." SR–7 is also applied to OR circuit R92 and thence to gate circuit G92 which gates the contents of the selected column (i.e., column 0 from step SR–6) over cable C75 to the AND Unit on FIGURE 12 where it is ANDed with the contents of the $\underline{s}$ Register. The output of the AND Unit is now gated by applying SR–7 to R122 and gate circuit G116 to transfer the output of the AND unit to the $\underline{v}$ Register. SR–7 is applied to set positions 1–35 of the $\underline{X}$ Column Complement Selector to "1's." The turnoff of SR–7 initiates SR–8.

It will be noted at the completion of clock step SR–7, the $\underline{v}$ Register will contain "1's" in every position where it is necessary to complement the number in the associated position of the $\underline{X}$ Register. In other words, it has tested the contents of the 0 column to determine which numbers are negative and at the same time, ANDed this with the mask or screen number stored initially in the $\underline{s}$ Register which indicates those numbers which are to be included in the current Sum Reduction operation. The next operation necessary is the actual complementing of all of the negative numbers which have just been located. This operation is performed beginning with clock sequence SR–8.

The turnon of SR–8 is applied to the OR circuit R148 which in turn activates the $\underline{X}$ Column Complement line on FIGURE 15. The detail of this operation is indicated on FIGURE 6. It will be noted that the Column Complement Selector line for column *i* is applied to AND gate A54. The other input to this AND gate is the Column Complement line indicated on the figure. The output of AND gate A54 is applied to OR circuit R142 which in turn is applied to gate circuit G60. It will now be noted that G60 is enabled from position $\underline{v}_k$ from the $\underline{v}$ Register which as will be remembered contains a 1 in all associated bit positions for those numbers of the $\underline{X}$ Registers which are to be complemented. The Complement Output line from the gate circuit G60 then causes the Storage flip-flop $\underline{X}_i^k$ to be complemented. SR–8 also sets the Accumulator to zero. It will be noted that a Complementing Input to a flip-flop means that if the flip-flop has been previously set to a "1," it will be reset to a "0" and vice versa. At the end of this operation, i.e., SR–8, all of those numbers stored in the $\underline{X}$ Register having an associated "1" bit in the $\underline{v}$ Register will have been complemented. At this point, clock stage SR–8 is terminated, thus, initiating clock step SR–9.

The turnon pulse of SR–9 is applied to OR circuit R150 which initiates the Counting Network shown on FIGURE 14. The output of this Counting Network which, as will be apparent from the drawing, has its input shown on the horizontal lines from the $\underline{v}$ Register comes out the bottom of the Network shown on FIGURE 14 on one of the Unary Output lines numbered from 0 to 16. Referring now to FIGURE 11, these lines feed into the Unary to Binary Encoder which causes a 5 bit binary code to be transferred to the Accumulator. What clock stage SR–9 accomplishes is that it counts the number of negative numbers included in the current operation by counting "1's" as stored in the $\underline{v}$ Register and saves this number in the Accumulator Register shown at the bottom of the Counting Network which number will be used subsequently. At this point it should be noted that the Counting Network is a somewhat conventional Adding Tree wherein a multiple bit binary code is fed in along the horizontal lines as described previously, and a single line is caused to be actuated at the bottom of the Network, said line being indicative of a number of which the binary input code is representative. Such Counting Networks are well known in the computing arts.

The completion of clock step SR–9 initiates clock stages SR–10 which applies its turnon pulse to set the $\underline{X}$ Column Output Selector on FIGURE 15 to 35. SR–10 also sets Counter J on FIGURE 7 to 35 and on turning off, initiates clock stage SR–11.

The turnon of SR–11 is applied to OR circuit R120 and thence to gate G114 which transfers the contents of the $\underline{s}$ Register over cable C79 to positions 0–16 of the AND Unit on FIGURE 12. A "1" is gated into the 0 position of the AND Unit by gating SR–11 into OR circuit R82. Clock pulse SR–11 to OR circuit R92 and thence to gate G92 which transfers the contents of the selected column of the $\underline{X}$ Register over cable C75 to the AND Unit on FIGURE 12. SR–11 is also applied to R122 and thence to gate G116 to gate the output from the AND Unit on FIGURE 12 to the $\underline{v}$ Register on FIGURE 11. The turnoff of SR–11 initiates SR–12.

The turnon of SR–12 supplies a pulse to OR circuit R150 at the top of the Counting Network on FIGURE 14, thus, initiating a Counting Cycle. As in stage SR–9 above, the output of the Counting Network is again applied to the Unary to Binary Encoder on FIGURE 11 and thence to the Tree Accumulator. This effects the addition of the new number gated into the Tree Accumulator with whatever number is currently stored therein. If the number currently in the Tree Accumulator happens to be all 0's, a new number will obviously be retained and stored therein in its original form. The turnoff of clock stage SR–12 initiates clock stage SR–13.

The turnon of SR–13 is applied to the Shift Right line going into the Tree Accumulator on FIGURE 11. This causes the Tree Accumulator to shift right one position and thus shift the right most bit into the $\underline{w}$ Register shown in block form on FIGURE 11. Refer now to FIGURE 24, wherein the $\underline{w}$ Register is shown in detail. The output of the Tree Accumulator is brought in on the two lines so indicated in FIGURE 24 and the number brought in is applied to the position of the $\underline{w}$ Register selected by the $\underline{X}$ Column Output Selector which is shown on FIGURE 24 in dotted lines. This is because the details of the $\underline{X}$ Column Output Selector are shown in FIGURE 15. The mechanism whereby the $\underline{X}$ Column Output Selector controls the gating of the Tree Accumulator into the $\underline{w}$ Register is by means of initiating one of the gate circuits G136. At this point stage SR–13 turns off and initiates clock stage SR–14.

The turnon of SR–14 is applied directly to the Decrement line of the Counter J. At the same time an SR–14 pulse is applied to the Decrement line of the $\underline{X}$ Column Output Selector. The turnoff of SR–14 initiates SR–15.

The turnon of SR–15 is applied to gate circut G138 which tests the contents of the Counter J on FIGURE 7. If the line marked "0 Or Greater" is energized, the system will branch to clock stage SR–11. If the line marked "Negative" is energized the system will branch to clock stage SR–16. The Negative Output will appear if the Counter J has been decremented after being previously set to 0. The loop defined by clock sequences SR–11 through SR–15 constitute a loop whereby each successive column of the $\underline{X}$ Register is added and shifted from the Accumulator into the $\underline{w}$ Register under control of the $\underline{X}$ Column Output Selector.

Assuming now that the test made in clock stage SR–15 branches to clock stage SR–16, the turnon of this clock stage causes a test of the $\underline{w}$ Register in the 0 ($\underline{w}_0$) position. This is done by applying clock pulse SR–16 to gate circuit G140 on FIGURE 24. If a "1" is stored in the position $\underline{w}_0$, it indicates a negative number and the system branches to clock stage SR–17. If a "0" is stored in position $\underline{w}_0$, it indicates a positive number and the system will branch to clock stage SR–19. Assuming the first condition and the initiation of clock stage SR–17, this pulse is applied to the Complement line on FIGURE 24 to register positions $\underline{w}_1$ through $\underline{w}_{35}$ which complements the particular number previously stored therein, i.e., changes "1's" to "0's" and vice versa. The turnoff of clock stage SR–17 initiates clock stage SR–18.

The turnon of SR–18 is applied to the Increment line on FIGURE 24 to increment the $\underline{w}$ Register. The turnoff of SR–18 initiates SR–19.

It should perhaps be noted at this point that the Sum Reduction operation is in the following status. The desired exponent is currently stored in the $\underline{e}$ Register and the sign and magnitude of the fraction are stored in the $\underline{w}$ Register. The remaining operations which must be completed in this clock sequence are the normalization of this number. There are three possible conditions which must be checked for at this point, the first is Overflow which means that there may be 1's stored in positions 1–8 of the $\underline{w}$ Register. This would require shifting $\underline{w}$ Register to the right to properly align the first 1 in the 9th bit position. The second condition would be Underflow wherein there is a 0 in the 9th bit position of the $\underline{w}$ Register. In this case it is necessary to shift 1 position to the left and reexamine this 9th bit position until a 1 is present therein. The third case is if the fraction is identical to 0, in other words, all bit positions are 0. In this case it is necessary to set the exponent to 0 and the operation is completed.

Assuming now that clock stage SR–19 has been initiated, the pulse SR–19 is applied to gate circuit G142. This gate circuit tests for an output from OR circuit R152. As will be noted in FIGURE 24, OR circuit R152 is connected to bit positions $\underline{w}_1$ through $\underline{w}_8$ and tests for the occurrence of a "1" in any of these register positions. If the OR circuit has an output, the system branches to clock stage SR–20 and if it does not have an output, i.e., a pulse out of inverter I12, the system branches to clock step SR–21.

Assuming that a 1 is present in positions 1–8 of the $\underline{w}$ Register and an output from OR circuit R152, clock step SR–20 is initiated which applies a pulse to the Shift Right line on the $\underline{w}$ Register on FIGURE 24. The SR–20 pulse is also applied to the Increment line associated with the $\underline{e}$ Register on FIGURE 19. The turnoff of SR–20 initiates SR–19 again wherein the output of OR circuit R152 is again tested for 0's or 1's.

Assuming finally that all "1's" are transferred out of positions 1–8, the system now branches to clock sequence SR–21. The turnon of this clock applied a pulse to gate G144 on FIGURE 19 which causes the contents of the $\underline{e}$ Register to be transferred over cable C93 through OR circuit R154 into the bit positions $\underline{w}_1$ through $\underline{w}_8$ of the $\underline{w}$ Register on FIGURE 24. The turnoff of SR–21 initiates SR–22.

The turnon of SR–22 is applied to gate circuit G146. This gate circuit tests the output of OR circuit R156 which will produce a pulse if any of bit positions $\underline{w}_9$ through $\underline{w}_{35}$ contain a "1." If the output of the OR circuit R156 is 0, a pulse will be produced from inverter I14 to initiate clock sequence SR-23. If the output from OR circuit R156 is not 0, the clock sequence SR-24 will be initiated.

Assuming the former condition, i.e., 0 output from R156, clock stage SR-23 will be initiated. This condition will exist if all of these bit positions contain 0 which indicates that a true 0 exists in the system at this point and that the exponent bits in positions $\underline{w}_1$ through $\underline{w}_8$ must be set to 0's to indicate a correct answer in the system.

Therefore, the turnon of clock stage SR-23 applies a pulse to the Zero Register on FIGURE 24 which causes a 0 to be gated through OR circuit R154 and into positions $\underline{w}_1$ through $\underline{w}_8$ of the $\underline{w}$ Register. SR-23 is also applied to OR circuit R158, the output of which resets the VRFSM to "0," and resets the SR flip-flop to "0." Finally, the turnoff of clock step SR-23 initiates a clock step STA-2.

Assuming now that clock stage SR-22 had branched to clock stage SR-24, the initiation of SR-24 tests bit position 9 of the $\underline{w}$ Register. As will be appreciated, this bit position must contain a "1" if the final result is to be in proper normalized form, therefore, as explained previously, the 9 position is tested and appropriate shifting and modification of exponent must be effected. Therefore, if position 9 is found to contain a 1 by applying SR-24 to gate circuit G148, the system branches to clock step SR-26. If the position $\underline{w}_9$ is found to contain a 0, the system branches to clock stage SR-25.

Assuming that a 0 exists in the $\underline{w}_9$ position of the $\underline{w}$ Register which means that the condition of Underflow exists, the pulse SR-25 is applied to the Shift Left line of the $\underline{w}$ Register on FIGURE 24. This shifts all of the $\underline{w}$ Register bit positions to the left by one bit position. Clock pulse SR-25 is also applied to the Decrement line of the $\underline{e}$ Register on FIGURE 19. The system now branches again back to clock step SR-24 where the test of bit position $\underline{w}_9$ is again made. Assuming this time that a 1 is encountered, the system branches to clock stage SR-26.

The turnon of SR-26 is applied to OR circuit R160 and thence to gate circuit G144 which causes the contents of the $\underline{e}$ Register on FIGURE 19 to be transferred over cable C93 to bit positions $\underline{w}_1$ through $\underline{w}_8$ of the $\underline{w}$ Register. This last operation transferred the currently correct exponent from the $\underline{e}$ Register into the exponent position of the $\underline{w}$ Register. Clock pulse SR-26 is applied to OR circuit R162 to set the SR flip-flop to "0," is applied to OR circuit R158 which applies a pulse through OR circuit R164 to reset the VRFSM flip-flop to a "0" and finally, initiates clock stage STA-2. This completes the end of the Sum Reduction Operation and the answer or final number resulting from the Sum Reduction Operation is currently stored in the $\underline{w}$ Register and the next instruction to be found in the Instruction Register will be now performed.

FLOATING SUM REDUCTION (FSR)

This clock sequence forms a part of the system operations necessary to perform a Vector Sum Reduction as was described generally in the previous example of operations performable by the present system. This part of the clock sequence is concerned only with determining the largest exponent in a particular vector of numbers as stored in the $\underline{X}$ Register and the $\underline{w}$ Register. From this number the amount of shift necessary to align all of the exponents on the vector is determined and the result of the subtraction is stored in the exponent portion previously existing with the number in the $\underline{X}$ Register, i.e., positions 1–8, inclusive. The actual Shifting operations occur during the Floating Point Shift Clock Sequence described elsewhere in this section.

This clock sequence is initiated when a system operation code is encountered in the Instruction Register which is shown in the drawings of FIGURE 5 as setting the VRFSM flip-flop. Actually the clock sequence is entered after clock sequence INSTF-5A has been executed. Thus, referring to FIGURE 5, the application of clockpulse INSTF-5A to gate circuit G40 initiates clock step FSR-1 and also sets the VRFSM flip-flop to a "1." The turnon of FSR-1 is applied to OR circuit R138 and thence to gate circuit G80 which gates the contents of the $\underline{s}$ Register to the $\underline{v}$ Register via cable C71 (all on FIGURE 20). Cable C71 feeds into the vector of OR circuits R60 on FIGURE 11 to set the $\underline{v}$ Register flip-flops appropriately. Register stage $\underline{v}_0$ is set to a 1 by applying FSR-1 to OR circuit R72. The turnoff of FSR-1 turns on FSR-2.

The turnon of FSR-2 is applied to the "Reset to 0" line on FIGURE 19 to set the $\underline{e}$ Register to 0. FSR-2 is also applied to OR circuit R140, the output of which is entitled, "$\underline{Y}$ Row Reset" line, on FIGURE 15. This pulse is ANDed with the contents of the appropriate positions $\underline{v}_i$ of the $\underline{v}$ Register in the same manner that the $\underline{X}$ Register was reset in accordance with ANDing from the $\underline{v}$ Register in the Vector Expand operation described elsewhere. The turnoff of FSR-2 initiates FSR-3.

The turnon of FSR-3 is applied to the $\underline{X}$ Column Input Selector on FIGURE 15 to 0. The same pulse sets the $\underline{X}$ Column Complement Selector to a 1. The same pulse sets the $\underline{e}$ Register Ring on FIGURE 19 to a 0. FSR-3 also sets the Counter J to a 1 through OR circuit R62 and finally, sets the $\underline{X}$ Column Output Selector on FIGURE 15 to 1 and on turning off, initiates clock stage FSR-4.

The turnon of FSR-4 is applied to OR circuit R92 and thence to gate G92 to place the contents of the column selected by the Column Output Selector on cable C75 (all on FIGURE 15). The contents of this column of the $\underline{X}$ Register are transferred over this cable to the AND unit on FIGURE 12. FSR-4 is also applied to OR circuit R78 and thence gate circuit G88 to gate the contents of the $\underline{v}$ Register via cable C73 on FIGURE 11 to the AND Unit on FIGURE 12. FSR-4 is also applied to OR circuit R86 and gate circuit G90 to gate the output of the AND Unit to the $\underline{p}$ Register via cable C74. The turnoff of FSR-4 initiates clock stage FSR-5.

The turnon of clock stage FSR-5 is applied to gate circuit G126 which tests for the existence of a 1 in any register position of the $\underline{v}$ Register. This is done by bringing all of the "1" sides of the $\underline{p}$ Register flip-flops to OR circuit R96 and thence both directly to the gate circuit G124 and also through the inverter I10 and the system thus branches so that if the $\underline{p}$ Register contains a 1, the system branches to clock step FSR-6. If on the other hand an output is produced from the inverter I10, the system branches to clock step FSR-9.

Assuming a "1" in the $\underline{p}$ Register, clock stage FSR-6 is initiated, the turnon of which is applied to OR circuit R138 on FIGURE 20 and gate circuit G80 to gate the contents of the $\underline{s}$ Register over cable C71 to the $\underline{v}$ Register on FIGURE 11, again through the vector OR gates R60 and R61. FSR-6 is also applied to OR gate R72 to set $\underline{v}_0$ to a "1." The turnoff of FSR-6 initiates FSR-7. The turnon of FSR-7 is applied to the Column Complement line on FIGURE 15 so that the particular column selected by the current setting of the Column Complement Selector is complemented. The Column Complement line input is detailed on FIGURE 6. On this figure, the $\underline{X}$ Column Complement Selector is gated to AND circuit A54 and ANDed in this circuit with the Column Complement line. Thus, the output from AND circuit A54, produces a signal to OR circuit R142 which in turn is applied to the "0" side of gate circuit G60. The $\underline{X}_i^k$ flip-flop is accordingly reset to a "0" if the corresponding bit position in the $\underline{v}$ Register, i.e., position $\underline{v}_k$, is a "1." It will be noted referring to FIGURE 11 that the "1" side of the $\underline{v}$ Register in positions $\underline{v}_0$ through $\underline{v}_{16}$ are all connected directly through a common line to this series of gate circuits in the corresponding rows of the $\underline{X}$ Register. The turnoff of FSR–7 initiates clock stage FSR–8.

The turnon of FSR–8 is applied to the register gate circuits G128 on FIGURE 19 associated with the $\underline{e}$ Register. This gates a "1" into that stage of the $\underline{e}$ Register selected by the associated Input Ring. The turnoff of FSR–8 initiates FSR–9.

The turnon of FSR–9 is applied to gate circuit G130 on FIGURE 11 which gates the contents of the $\underline{v}$ Register over cable C81 to the $\underline{p}$ Register on FIGURE 9. The turnoff of FSR–9 initiates FSR–10. It should perhaps be noted that if the tests made in FSR–5 had indicated all 0's in the $\underline{p}$ Register, that the system would have branched directly into FSR–9.

The turnon of FSR–10 is applied to OR circuit R138 and thence to gate circuit G80 which gates the contents of the $\underline{s}$ Register to the $\underline{v}$ Register and also sets the $\underline{v}$ Register position $\underline{v}_0$ to a "1." The particular circuit elements actuated in this case are identical with clock sequence FSR–6 above and need not be repeated here. The turnoff of FSR–10 initiates FSR–11.

The turnon of FSR–11 is applied to gate circuit G132 which reads the selected $\underline{X}$ Register column directly into the $\underline{X}$ Column Input line on the opposite side of the $\underline{X}$ Register on FIGURE 15. It should be noted at this point that the bit positions 1–8 in each row of the $\underline{X}$ Register constitute what might, in effect, be called a counter, which may be decremented by the injection of a "1" or "0" into any order. The input to each Counter is under control of the $\underline{v}$ Register bit. The turnoff of FSR–11 initiates clock stage FSR–12.

The turnon of FSR–12 is applied to OR circuit R98 and thence to gate circuit G98 which gates the contents of the $\underline{p}$ Register over cable C77 to the $\underline{v}$ Register. The turnoff of FSR–12 initiates FSR–13. The turnon of FSR–13 is applied to OR circuit R68 on FIGURE 7 to increment the Counter J. This pulse is similarly applied to advance the $\underline{X}$ Column Output Selector on FIGURE 15; advances the $\underline{X}$ Register Column Input Selector; advances the $\underline{X}$ Column Complement (all on FIGURE 15); and finally, advances the $\underline{e}$ Register Input Ring on FIGURE 19 and on turning off, initiates clock stage FSR–14.

The turnon of FSR–14 effects a test of the setting of the Counter J. This is shown on FIGURE 7 wherein FSR–14 is applied to gate circuit G134. The input to G134 is indicated as 9 and not 9. If the not 9 line is up, the system branches back to clock stage FSR–4, and conversely, if the 9 line is up, the system branches to the Floating Point Shift Clock (FPS–1), resets the FSR flip-flop to a "0" and sets the FPS flip-flop to a "1." It is the turnon of the FPS flip-flop which initiates clock stage FPS–1.

At the termination of the Floating Sum Reduction Clock sequence it should be noted that the largest exponent will have been selected and placed in the $\underline{e}$ Register and the $\underline{X}$ Register positions 1–8 loaded with the numbers representative of the magnitude of the shift which their associated numerical quantities or fraction bits must be shifted to properly align the binary points during the actual Shifting operations prior to a Summing operation. It should be noted that one of these register positions will contain the number 0 since it is, in effect, the largest of the group and thus, does not need to be shifted at all. Having once completed this clock sequence, the system is ready to proceed to the actual shifting operation performed during the Floating Point Shift sequence.

FLOATING POINT SHIFT CLOCK

Under control of the present clock up to 17 numbers in a particular vector may be shifted in a single operation to, in effect, align the radix point of the normalized numbers. Although in actuality since one of the numbers, i.e., the one having the largest exponent, will control the subsequent shifts and this number itself will not be shifted, therefore, the number of actual shifts will be reduced by at least one.

It will also be noted that the largest exponent will have been previously determined by a Search for Largest operation and this number stored in a suitable register as has been explained previously whereby the actual degree of the shifts of the subsequent numbers will be controlled by the value of said largest exponent.

Proceeding now with the description of this particular clock sequence, the first stage of this clock FPS–1 is initiated either from the Floating Point Add Clock, FAD–7 or from the Floating Sum Reduction Clock, FSR–14. Either of these other sequences will initiate this particular operation since they both require such Foating Point Shift. The turnon of FPS–1 is applied to OR gate R116 and this to the Counter J to reset same to 0 (FIGURE 7). This pulse is also applied to OR circuit R118 to set the $\underline{X}$ Register Column Output Selector to 1 and on turning off initiates FPS–2. The turnon of FPS–2 is applied to OR gate R120 on FIGURE 20 and thence to gate G114 to gate the contents of the $\underline{s}$ Register over cable C79 to the AND Unit on FIGURE 12. FPS–2 is applied to OR circuit R82 to supply a single input to the AND gate A38 in the 0 position of the AND Unit. FPS–2 is likewise applied to OR gate R92 and thence to gate G92 to gate the $\underline{X}$ Register column currently selected to the AND unit. FPS–2 is applied to OR circuit R122 and thence to gate circuit G116 to gate the output of the AND Unit over cable C80 to the $\underline{v}$ Register on FIGURE 11. It will be noted that the AND Unit and its associated controls is shown on FIGURE 12. The turnoff of FPS–2 initiates FPS–3.

The pulse from FPS–3 is applied to OR circuit R100 to advance the $\underline{X}$ Column Output Selector on FIGURE 15 and is also applied to OR circuit R68 on FIGURE 7 to increment the Counter J and on turnoff, this clock stage initiates FPS–4.

The turnon of FPS–4 is applied to gate circuit G118 which tests the Counter J to see if it is set to a 3. If the Counter is set to a 3, it will be noted that the system branches to FPS–5 and if not on a 3, it branches back to FPS–2. Again the Counter J and this associated testing circuit is shown on FIGURE 7. Assuming that the Counter J is on 3, clock stage FPS–5 is initiated. The turnon of which (the previous description of FPS–1, set the Counter J to a 1 and not a 0) is applied to OR circuit R124 on FIGURE 15 and thus to the Row Reset Cable for the $\underline{X}$ Register. Referring now to FIGURE 6, this line comes into a particular bit position $\underline{X}_i^k$ and is applied to OR circuit R56 and then to gate circuit G60 wherein it is ANDed with the particular $k$ bit position of the $\underline{v}$ Register whereby this particular bit position will be reset only if a "1" is stored in the associated position of the $\underline{v}$ Register. The turnoff of FPS–5 initiates FPS–6. It will be noted at the completion of FPS–5 that the system has determined which of these numbers are capable of being shifted by the present system with the size registers available to save significant figures and similarly, determines which numbers it is desired to actually utilize in subsequent Floating Point operations under control of the screen number which is stored in the $\underline{v}$ Register. Thus, having made this determination, the turnon of FPS–6 sets the Counter J on FIGURE 7 to a 1 by applying a pulse to OR circuit R62. FPS–6 is also applied to set the Column Output Ring to a 4. FPS–6 also sets the Multiple Shift Right Ring on FIGURE 18 to 16. The turnoff of FPS–6 initiates FPS–7.

The turnon of FPS–7 is applied to OR circuit R120 and gate G114 which gate the contents of the $\underline{s}$ Register over line C79 on FIGURE 20 to the AND Unit on FIGURE 12. FPS–7 is also applied to OR circuit R82 which provides one input to the AND A38 of the 0 position of the AND Unit. Finally, FPS–7, provides a pulse to OR circuit R92 and thus, gate circuit G92 to gate the contents of the selected column of the X Register over cable C75 (all on FIGURE 15) to the AND Unit on FIGURE 12. The FPS–7 pulse is applied to OR circuit R122 and gate G116 on FIGURE 12 to gate the output of the AND Unit over cable C80 to the v Register on FIGURE 11. The turnoff of FRS–7 initiates FPS–8.

The turnon of FPS–8 is applied to the Multiple Shift Right Unit on FIGURE 18. This turnon pulse will cause a number of shifts which is determined by the particular setting of the Multiple Shift Right Ring of all of the numbers in the X and Y Registers, which, as stated previously, make up the 54 bit register complex for purposes of the Shifting operations and wherein said shift is also limited to those numbers in said Shift Registers wherein the corresponding bit position in the v Register is equal to 1. It will be remembered that in the previous description of FPS–6, the Multiple Shift Right Ring was set to 16. Hence, for every number stored in the Shift Registers having a 1 appearing in the particular X Column, a 16 bit shift of this number will occur. The details of such a shift will be described subsequent to FPS–10. In this description, the situation wherein the Multiple Shift Right Ring is set to 1 will be described since this is a generic case to all shifts and in addition has several criteria which must be satisfied on this last shift position. On the turnoff of FPS–8 clock stage FPS–9 is initiated.

The turnon of FPS–9 is applied to OR circuit R68 on FIGURE 7 to increment the Counter J. The pulse is also applied to OR circuit R100 to advance the X Column Output Selector on FIGURE 15. It is also applied to advance the Multiple Shift Right Ring on FIGURE 18. The turnoff of FPS–9 initiates FPS–10.

The turnon of FPS–10 is applied to gate circuit G120 to test the setting of the Counter J. If the Counter is not set on a 6, the system loops back to step FPS–7 and an additional Shift operation occurs and this loop is continued until the Counter J is equal to 6. At this point, an output from gate G120 on FIGURE 7 is applied to AND circuit A44 and A46. If the FAD flip-flop is set to a "1," the other side of the A44 has an input which causes an input to OR circuit R126 which, in turn, sets the FPS flip-flop to a "0." This indicates to the Floating Point Add Clock (FAD) that the Floating Point Shift is complete and subsequent steps in the Floating Point Add routine may be continued. If the VRFSM flip-flop had been set to a "1" rather than the FAD flip-flop, a second enabling input would be received at AND circuit A46 thus providing an output to also turn off FPS flip-flop and also set the SR flip-flop to a "1" and initiate clock step sequence SR–1.

This last test made under clock sequence FPS–10 when the Counter J is set to a 6 completes the Floating Point Shift Clock sequence.

A brief description of a Shift Right operation referring principally to FIGURE 18 but also referring to FIGURES 22 and 6 will follow. Referring first to FIGURE 22, it will be assumed that the flip-flop "4" has been set to a "1" by previous clock sequences as will be explained. With this flip-flop set to a "1," one input is provided to gate circuit G122 which is any gate circuit in row K in the 35th column of the X Register. The other input to the gate circuit will either be from the "1" or the "0" line of the *k*th bit position of the 35th column of the X Register, it being understood that there are 17 such gates per column. What this circuit does, in effect, is set up a path for transfer of data from the 35th column of the X Register to the 9th column of the Y Register.

It should be noted that the setting of the flip-flops "1," "2" and "3" on FIGURE 22 to a "0" prevents the shifting of any of the bits in columns 0–8 of both the X Register and Y Register. It will be noted that the Shift Right line on FIGURE 22 is shown as having one output designated "to shift right gate X Registers Columns 9–35." Such shift right gate is designated in FIGURE 6 as gate G124. It is, of course, again understood that FIGURE 6 is but exemplary of a single bit position in a particular column and particular row in the X Registers. It will also be noted that the Shift Right line is ANDed in AND circuit A48 with an output from OR circuit R128 from the Shift Right gate of the Y Register. These gates would be identical to the Gate G124 of the X Register illustrated in FIGURE 6.

Returning now to FIGURE 18, the clock pulse FPS–8 is applied to the AND gate A50 in addition to the Multiple Shift Right Unit. Since it is now being assumed that the Multiple Shift Right Ring is set to a 1, the other input to the AND gate A50 is thereby provided and an output is obtained on the Shift Right common line from this AND circuit. This line applies a pulse to a series of 17 OR circuits typified by R130 whose output is applied to flip-flop F12 and single shot S12. The output of S12 is applied to OR circuit R132 to a given output to the Shift Intermediate Store line. Such line is illustrated on FIGURE 6 as being applied to gate circuit G72. It will, of course, be understood that this is a common line applied to the entire row of the X Register of which the bit position illustrated in FIGURE 6 is but exemplary. The turnoff of single shot S12 is applied to AND circuit A52 and is ANDed with the "1" side of the flip-flop F10 to produce a pulse on the Shift Right line coming out of AND circuit A52. It will be noted that the turnoff pulse of FPS–8 is supplied as one input to OR circuit R134 whose output, in turn, shuts off the Column Shift flip-flops such as, F12.

It should perhaps be noted that the gate circuit G124 shown on FIGURE 6 provides a direct connection to the next immediate storage bit position to effect a 1 bit position shift. For the 2, 4, 8 and 16 position shifts, separate gate circuits would be provided for each bit storage locations which would be connected directly to the second, fourth, eighth, and sixteenth bit storage locations displaced to the right of the subject bit storage location. However, ot avoid undue complication of the drawing, only the single Shift Right gate is illustrated in FIGURE 6 as it is believed to be within the knowledge of a person skilled in the art appropriately connecting such gates in an obvious manner.

SEARCH FOR UPPERMOST ONE (UMO)

During this clock sequence, it will be desired to determine the index or register number in the X Register which contains an uppermost 1 in the 17 bit binary number stored in the u Register on FIGURE 8. It was further desired to make the address or register position number available to the system subsequent to this test. This operation is performed by applying the UMO–1 pulse to gate circuit G150 on FIGURE 8 which transfers the contents of the u Register over cable C82 to the AND Unit on FIGURE 12. UMO–1 is applied to OR circuit R166 on FIGURE 12 to set bit position 0 of the AND Unit to a "0." UMO–1 is also applied to OR circuit R120 on FIGURE 20 and thence to gate G114 to transfer the contents of the s Register over cable C79 to the AND Unit on FIGURE 12. The output of the AND Unit is then gated over cable C80 through gate circuit G116 energized by UMO–1 to the v Register on FIGURE 11. The turnoff of UMO–1 then transfers to clock step LGSM–12 in the Search for Largest Smallest Clock. This clock sequence then proceeds to actually search for the proper number and up-dates the appropriate Index Registers, i.e., on FIGURE 2.

SECTION 8

*Summary*

The above description of the detailed operation of the presently disclosed multiprocessing system indicates the type of multiword special problems which the disclosed system is capable of performing in the unique word-parallel bit-serial operating mode.

While the search for largest and smallest and sum reduction operations have been specifically disclosed and described in detail, other closely related operations may be performed by essentially the same hardware using iterations of said operations. These include such operations as searches based on equality, inequality, greater than, elss than, nearest to, between limits and ordering with respect to specified criterial are but a few of additional operations which may be performed by such iterations. All of the above operations are optionally performed in the word-parallel bit-serial mode of operation disclosed herein. The particular branching and testing steps necessary to perform particular operations in addition to those disclosed would be apparent to a skilled system design engineer.

It will be appreciated that all of the basic functional blocks shown in the figures are well known computer building blocks and are readily available in the computer arts which may be embodied in tube circuitry, conventional transistor circuitry or in integrated circuit technology without departing from the spirit and scope of the disclosed system concepts.

The particular multiple Access Memory shown comprises 16 separate Memory Boxes each of which is a substantially conventional random access magnetic memory such as used in the IBM 7090 computer and could be replaced by a single memory wherein up to 16 different word locations could be addressed simultaneously.

For example, if the memory were arranged so that an entire $\underline{X}$ row or selected parts thereof could be addressed in parallel, data would have to be stored in such memory so that related vectors of such data followed in a predetermined organization along such $\underline{X}$ row or partial $\underline{X}$ row. Also, while the general type of memory currently available in the computer arts is the core memory, it is understood that thin film memories could equally well be used in the system assuming, of course, that they incorporate the same type of memory organization, i.e., random access. The particular Arithmetic Units shown and described in the present embodiment could similarly be varied without changing the more general concepts of the present system, i.e., having a separate controllable Arithmetic Unit for simultaneously performing a given individual operation in the vector problem. Obviously, different algorithms could be incorporated for doing the addition of two numbers having different signs, i.e., subtraction wherein different complementing and carrying facilities could be used.

As stated previously, a number of different methods are available for generating the addresses from a base address plus an increment. In the system disclosed and described, it is apparent that up to 16 addresses could be generated simultaneously if it were desired to provide sufficient Holding Registers and circuitry to accomplish same.

While data word lengths of 36 bits, i.e., 1 sign bit, 8 exponent bits and 27 fraction bits, have been illustrated in the present embodiment, it will be clearly understood that more or less bits could easily be provided in the system depending on the degree of precision desired within the system. Similarly, instruction word bits have also been shown as being 36 bits long. It will again be appreciated that the instruction word could also be varied depending on the amount of control it is desired to place in a particular instruction word.

Similarly, the system timing has been illustrated by the use of many separate clock sequences each of which sequences comprises a plurality of single shot multivibrators which produce a discrete turnon pulse and a subsequent turnoff pulse, said pulses being displaced from each other a sufficient time to allow the performance of the particular operation required. It will be apparent that other timing schemes either synchronous or asynchronous could readily be provided if so desired. This particular timing scheme was selected for purposes of describing the broad concepts of the invention because of the clarity of the presentation and the discrete manner in which each step may be shown and described. It should be understood that it is not intended that the system be limited to the particular timing controls illustrated in the present embodiment.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A computer system process unit capable of providing N multibyte data words wherein N is an integer greater than two upon which a common operation is to be formed which comprises:

storage means for concurrently storing all of said data words, means for concurrently accessing common bits in each of said data words, means for concurrently evaluating all of the bytes accessed in a single access cycle, means for continuing the access of the bits of said words until all of said bits are accessed, means responsive to said evaluating means for accumulating successive evaluations wherein prior evaluations may affect subsequent evaluations, mask means for inhibiting the processing of selective data words by said evaluating means during any desired access cycle, means responsive to the output of said accumulating means for providing a single data word as a result of said operation, said storage means comprising a multiword storage register including:

means for concurrently accessing any common bit position in each word storage location whereby data words may be accessed from said register in a word parallel bit serial manner, and means for individually shifting words stored in said register to the right or left to effect radix point alignment.

2. A system as set forth in claim 1 wherein said means for evaluating the data words comprises:

an adder array for concurrently receiving all of the bits accessed, means connected to the output of said adder array for accumulating the result of each successive group of bits evaluated, and output register means for receiving the output of the accumulating means subsequent to the accessing of the last bit position of said data words.

3. A computing system as set forth in claim 2 wherein said adder array comprises:

a pyramidal tree of AND gates having as many (N) output lines as possible binary input bits wherein the output of said adder tree is expressed as a unary coded result so that a single one of said N output lines will be activated depending upon the binary input to the tree.

4. A computing system as set forth in claim 2 wherein the output of said adder array is expressed as a unary coded result on unary to binary converter means connected between the output of said adder array and the input of said accumulating means, said accumulator being adapted to operate on binary input data.

5. A computing system as set forth in claim 4 wherein said accumulator means includes:

means for gating the output from said unary to binary converter into the proper input positions of said accumulator as successive bit positions of said data words are evaluated and fed to said converter means.

6. A computing system as set forth in claim 5 wherein said data words have an exponent, a characteristic portion and a understood radix point, means for aligning the radix points of all of said data words when it is determined that the said data words have different exponents comprising:

means for selecting a common exponent for all of said words, and means for shifting the characteristic portion of each of said words in accordance with the current exponent of a given word and the selected common exponent whereby said radix points will be aligned.

7. A computing system as set forth in claim 1 wherein said evaluating means comprises:

means for selecting a magnitude extreme in said group of data words, said means including:

means for transferring a binary value to said evaluation means for each bit position of said data words in accordance with the particular extreme being sought, and means for successively transferring the bits of said data words to said evaluating means in the order of diminishing weight until all of said bits are evaluated.

8. A computing system as set forth in claim 7 wherein said accumulating means comprises:

means for storing as many bits as there are data words, means for storing a binary "1" at a bit position in said storage accumulating means corresponding to each word containing a binary "1" in a previously accessed bit position together with a "1" in a currently accessed bit position, and means to return the current bits stored in said storage accumulating means when all of the bits currently being accessed corresponding to those words previously containing "1's" are "0's".

9. A computing system as set forth in claim 8 wherein said evaluating means comprises:

N coincidence gates, one for each possible word to be included in said operation, means for transferring the current contents of said storage accumulating means as one input to said coincidence gate means, means for transferring the bits of a new bit position in said data words to said coincidence gate means as a second input, and means for resetting the accumulating storage means in accordance with the output of said coincidence gates.

10. A computing system as set forth in claim 8 including:

means for deriving and storing the relative address of a single word of data words representing the magnitude extreme desired.

11. A computing system as set forth in claim 10 wherein said deriving means comprises:

a decoder which is connected to said storage accumulating means after all of the bit positions of said data words have been evaluated, said decoder being effective to provide the relative address of the first "1" bit in said storage accumulating means which corresponds to a particular data word.

12. A computing system as set forth in claim 11 wherein the magnitude extreme being sought is the largest number of said group of data words including:

means for transferring the bits of said data words to said evaluating means in unaltered form.

13. A computing system as set forth in claim 12 wherein the magnitude extreme being sought is the smallest member of said group of data words including:

means for transferring the bits of said data words to said evaluating means in 1's complement form.

14. A computing system as set forth in claim 11 wherein said data words have an exponent, a characteristic portion and an understood radix point, means for aligning the radix points of all of said data words when it is determined that the said data words have different exponents comprising:

means for selecting a common exponent for all of said words, and means for shifting the characteristic portion of each of said words in accordance with the current exponent of a given word and the selected common exponent whereby said radix points will be aligned.

References Cited

UNITED STATES PATENTS

| | | | |
|---|---|---|---|
| 3,277,449 | 10/1966 | Shooman | 340—172.5 |
| 3,287,702 | 11/1966 | Borck et al. | 340—172.5 |
| 3,287,703 | 11/1966 | Slotnick | 340—172.5 |
| 3,308,436 | 3/1967 | Borck et al. | 340—172.5 |
| 3,312,943 | 4/1967 | McKindles et al. | 340—172.5 |

PAUL J. HENON, *Primary Examiner.*

U.S. Cl. X.R.

235—156